(12) United States Patent
Capanema et al.

(10) Patent No.: US 10,059,730 B2
(45) Date of Patent: Aug. 28, 2018

(54) HIGH PURITY LIGNIN, LIGNIN COMPOSITIONS, AND HIGHER STRUCTURED LIGNIN

(71) Applicant: Renmatix, Inc., King of Prussia, PA (US)

(72) Inventors: Ewellyn A. Capanema, Wayne, PA (US); Mikhail Y. Balakshin, Wayne, PA (US)

(73) Assignee: Renmatix, Inc., King of Prussia, PA (US)

( * ) Notice: Subject to any disclaimer, the term of this patent is extended or adjusted under 35 U.S.C. 154(b) by 536 days.

(21) Appl. No.: 14/213,680

(22) Filed: Mar. 14, 2014

(65) Prior Publication Data

US 2014/0275501 A1    Sep. 18, 2014

Related U.S. Application Data

(60) Provisional application No. 61/802,087, filed on Mar. 15, 2013.

(51) Int. Cl.
*C07G 1/00*    (2011.01)

(52) U.S. Cl.
CPC ..................... *C07G 1/00* (2013.01)

(58) Field of Classification Search
CPC ........................................................ C07G 1/00
See application file for complete search history.

(56) References Cited

U.S. PATENT DOCUMENTS

| | | | |
|---|---|---|---|
| 4,493,797 A | 1/1985 | Avedesian | 530/507 |
| 4,644,060 A | 2/1987 | Chou | 536/30 |
| 4,946,946 A | 8/1990 | Fields | 530/500 |
| 4,964,995 A | 10/1990 | Chum | 210/634 |
| 5,041,192 A | 8/1991 | Sunol | 162/63 |
| 5,169,687 A | 12/1992 | Sunol | 427/297 |
| 5,196,460 A | 3/1993 | Lora | 524/76 |
| 5,213,660 A | 5/1993 | Hossain | 162/5 |
| 5,338,366 A | 8/1994 | Grace | 127/37 |
| 5,424,417 A | 6/1995 | Torget | 536/56 |
| 5,503,996 A | 4/1996 | Torget | 435/105 |
| 5,705,369 A | 1/1998 | Torget | 435/105 |
| 5,811,527 A | 9/1998 | Ishitoku | 530/506 |
| 6,025,452 A | 2/2000 | Kurple | 527/301 |
| 7,259,231 B2 | 8/2007 | Cornish | 528/483 |
| 7,465,791 B1 * | 12/2008 | Hallberg et al. | 530/500 |
| 7,955,508 B2 | 6/2011 | Allan | 210/749 |

(Continued)

FOREIGN PATENT DOCUMENTS

| | | |
|---|---|---|
| CN | 101586136 | 11/2009 |
| CN | 101613377 | 12/2009 |

(Continued)

OTHER PUBLICATIONS

Balakshin et al., Characterization of Lignocellulosic Mateirals, Chapter 9, Blackwell Publishing, 2008.*

(Continued)

*Primary Examiner* — Liam J Heincer
(74) *Attorney, Agent, or Firm* — Ballard Spahr LLP

(57) ABSTRACT

Disclosed are lignins and lignin compositions having high purity. Also disclosed are lignins having unique structural characteristics, including less structural degradation than conventional lignins.

32 Claims, 15 Drawing Sheets

(56) References Cited

U.S. PATENT DOCUMENTS

| | | | | |
|---|---|---|---|---|
| 8,288,460 B2* | 10/2012 | Balakshin et al. | | 524/13 |
| 8,317,928 B1 | 11/2012 | Iyer | | 127/34 |
| 8,378,020 B1* | 2/2013 | Balakshin et al. | | 524/735 |
| 8,404,051 B2 | 3/2013 | Iyer | | 127/57 |
| 2002/0061583 A1 | 5/2002 | Kawamura | | 523/124 |
| 2003/0156970 A1 | 8/2003 | Oberkofler | | 422/28 |
| 2003/0221361 A1 | 12/2003 | Russell | | 44/605 |
| 2007/0161095 A1 | 7/2007 | Gurin | | 424/94.6 |
| 2007/0267008 A1 | 11/2007 | Funazukuri | | 536/30 |
| 2008/0015336 A1 | 1/2008 | Cornish | | 528/498 |
| 2008/0051566 A1 | 2/2008 | Ohman | | 162/16 |
| 2009/0056201 A1 | 3/2009 | Morgan | | 44/308 |
| 2009/0069550 A1* | 3/2009 | Belanger et al. | | 530/507 |
| 2009/0288788 A1 | 11/2009 | Castor | | 162/14 |
| 2010/0043782 A1 | 2/2010 | Kilambi | | 127/1 |
| 2010/0063271 A1 | 3/2010 | Allan | | 210/749 |
| 2010/0069626 A1 | 3/2010 | Kilambi | | 536/124 |
| 2010/0081798 A1 | 4/2010 | Balensiefer | | 530/500 |
| 2010/0136642 A1 | 6/2010 | Belanger | | 530/502 |
| 2010/0152509 A1 | 6/2010 | Ekman | | 585/240 |
| 2010/0305242 A1 | 12/2010 | Balakshin | | 524/13 |
| 2010/0305243 A1* | 12/2010 | Balakshin et al. | | 524/76 |
| 2010/0305244 A1* | 12/2010 | Balakshin et al. | | 524/76 |
| 2010/0329938 A1 | 12/2010 | Allan | | 210/177 |
| 2010/0330638 A1 | 12/2010 | Aita | | 435/161 |
| 2011/0021743 A1 | 1/2011 | Cornish | | 528/498 |
| 2011/0100359 A1 | 5/2011 | North | | 127/37 |
| 2011/0137085 A1 | 6/2011 | Trahanovsky | | 568/386 |
| 2011/0151516 A1 | 6/2011 | Van Der Heide | | 435/72 |
| 2011/0232160 A1 | 9/2011 | Siskin | | 208/100 |
| 2011/0253326 A1 | 10/2011 | Sherman | | 162/55 |
| 2011/0287502 A1 | 11/2011 | Castor | | 162/14 |
| 2011/0294991 A1 | 12/2011 | Lake | | 530/500 |
| 2012/0108798 A1 | 5/2012 | Wenger | | 530/500 |
| 2012/0116063 A1 | 5/2012 | Jansen | | 428/535 |
| 2012/0136097 A1* | 5/2012 | Berlin | | 524/13 |
| 2012/0145094 A1 | 6/2012 | Simard | | 122/2 |
| 2012/0184788 A1 | 7/2012 | Loop | | 264/37.18 |
| 2012/0247617 A1* | 10/2012 | Berlin et al. | | 144/344 |
| 2012/0291774 A1 | 11/2012 | Kilambi | | 127/44 |
| 2013/0172540 A1 | 7/2013 | Kilambi | | 530/500 |
| 2013/0178563 A1* | 7/2013 | Balakshin et al. | | 524/72 |
| 2013/0211056 A1* | 8/2013 | Berlin | | 530/500 |
| 2013/0239954 A1 | 9/2013 | Kilambi | | 127/44 |
| 2013/0252292 A1* | 9/2013 | Berlin et al. | | 435/135 |
| 2014/0030524 A1 | 1/2014 | Kadam | | 428/402 |
| 2014/0046041 A1* | 2/2014 | South et al. | | 530/507 |
| 2014/0243511 A1* | 8/2014 | Tamminen et al. | | 530/500 |

FOREIGN PATENT DOCUMENTS

| | | |
|---|---|---|
| JP | 2006-255676 | 9/2006 |
| JP | 2010-042604 | 2/2010 |
| NZ | 616924 | 10/2013 |
| WO | WO 1997/014747 | 4/1997 |
| WO | WO 2010/009343 | 1/2010 |
| WO | WO 2010/034055 | 4/2010 |
| WO | WO 2010/045576 | 4/2010 |
| WO | WO 2011/091044 | 7/2011 |
| WO | WO 2012/151509 | 11/2012 |

OTHER PUBLICATIONS

U.S. Appl. No. 61/802,087, filed Mar. 15, 2013, Ewellyn A. Capanema (Renmatix).
PCT/US2014/029284 (WO 2014/144746), Mar. 14, 2014 (Sep. 18, 2014), Ewellyn Capanema (Renmatix).
Adler, E. 1977. "Lignin chemistry—Past, present and future," Wood Sci. Technol. 11, 169-218.
Adler, E., et al. 1987. "Investigation of the acid-catalyzed alkylation of lignins by means of NMR spectroscopic methods," Holzforschung, 41, 199-207.
Akiyama, T., et al. 2005. "Erythro/threo ratio of β-O-4 structures as an important structural characteristic of lignin. Part IV. Variatioin in erythro/threo ratio in softwood and hardwood lignins and its relation to syringyl/guaiacyl ratio," Holzforschung, 59, 276-281.
Argyropoulos, D. 2010. "Heteronuclear NMR spectroscopy of lignins." In: *Lignin and Lignans: Advances in Chemistry*. Heitner, C., Dimmel, D. & Schmidt, J. Eds., CRC Press, Boca Raton, London, New York, 245-265.
Balakshin, M., et al. 2008. "Recent advances in isolation and analysis of lignins and lignin-carbohydrate complexes." In: *Characterization of Lignocellulosic Materials*, Hu, T. Q., Ed., Blackwell, Oxford, UK, 148-170.
Balakshin, M., et al. 2011. "Quantification of lignin-carbohydrate linkages with high-resolution NMR spectroscopy," Planta, 233, 1097-1110.
Balakshin, M., et al. 2003. "Elucidation of the structures of residual and dissolved pine kraft lignins using an HMQC technique," J. Agric. Food Chem., 51, 6116-6127.
Balakshin, M., et al. 2007. "MWL fraction with a high concentration of lignin-carbohydrate linkages: Isolation and 2D NMR spectroscopic analysis," Holzforschung, 61, 1-7.
Baumberger, S., et al. 2007. "Molar mass determination of lignins by size-exclusion chromatography: towards standardisation of the method," Holzforschung, 61, 459-468.
Beauchet, R., et al. 2012. "Conversion of lignin to aromatic-based chemical (L-chems) and biofuels (L-fuels)," Bioresource Technology, 121, 328-334.
Berlin, A., et al. 2014. "Industrial lignins: Analysis, properties and applications." In: *Bioenergy Research: Advances and Applications*. Gupta V. K., Kubicek, C. P., Saddler, J., Xu, F. & Tuohy, M., Eds., Elsevier, 315-336.
Berlin, A., et al. 2006. "Inhibition of cellulase, xylanase and β-glucosidase activities by softwood lignin preparations," Journal of Biotechnology, 125,198-209.
Capanema, E., et al. 2005. "Quantitative characterization of a hardwood milled wood lignin by NMR spectroscopy," J. Agric. Food Chem., 53, 9639-9649.
Capanema, E., et al. 2004. "A comprehensive approach for quantitative lignin characterization by NMR spectroscopy," J. Agric. Food Chem., 52, 1850-1860.
Capanema, E., et al. 2015. "How well do MWL and CEL preparations represent the whole hardwood lignin?" Journal of Wood Chemistry & Technology, 35, 17-26.
Capanema, E., et al. 2005. "Isolation and characterization of residual lignins from hardwood pulps: Method improvements," Proc. 13th ISWFPC, Auckland, New Zealand, v.III, 57-64.
Capanema, E., et al. 2008. "Quantitative analysis of technical lignins by a combination of $^1H$-$^{13}C$ HMQC and $^{13}C$ NMR methods," Proceedings of International Conference on Pulping, Papermaking and Biotechnology, 647-651.
Capanema, E., et al. 2004. "An improved procedure for isolation of residual lignins from hardwood kraft pulps," Holzforschung, 58, 464-472.
Capanema, E., et al. 2001. "Structural analysis of residual and technical lignins by $^1H$-$^{13}C$ correlation 2D NMR-spectroscopy," Holzforschung, 55(3), 302-308.
Cateto, C., et al. 2008. "Lignins as macromonomers for polyurethane synthesis: A comparative study on hydroxyl group determination," Journal of Applied Polymer Science, 109(5), 3008-3017.
Ehara, K., et al. 2002. "Characterization of the lignin-derived products from wood as treated in supercritical water," J. Wood Sci, 48, 320-325.
Ehara, K., et al. 2005. "Decomposition behavior of cellulose in supercritical water, subcritical water, and their combined treatments," The Japan Wood Research Society, 51, 148-153.
Evtuguin, D. V., et al. 2001. "Comprehensive study on the chemical structure of dioxane lignin from plantation *Eucalyptus globulus* wood," J. Agric. Food Chem. 49, 4252-4261.
Faix, O., et al. 1994. "Determination of hydroxyl groups in lignins. Evaluation of $^1H$-, $^{13}C$-, $^{31}P$-NMR, FTIR and wet chemistry methods," Holzforschung 48, 387-394.
Fujimoto, A., et al. 2005. "Quantitative evaluation of milling effects on lignin structure during the isolation process of milled wood lignin," J. Wood Sci., 51, 89-91.

(56) References Cited

OTHER PUBLICATIONS

Gellerstedt, G. 1996. "Chemical structure of pulp components." In: *Pulp Bleaching: Principles and Practice*, Dence, C. W. & Reeve, D. W. Eds., Tappi, 91-111.

Gellerstedt, G. & Robert, D. 1987. "Quantitative $^{13}$C NMR analysis of kraft lignins," Acta Chemica Scandinavica B41, 541-546.

Gierer, J. 1980. "Chemical aspects of kraft pulping," Wood Sci. Technol. 14, 241-266.

Glasser, et al. 1983. "The chemistry of several novel bioconversion lignins," J. Agric. Food Chem., 31, 921-930.

Glasser, W. 2000. "Classification of lignin according to chemical and molecular structure." In: *Lignin: Historical, Biological, and Materials Perspectives*. W. Glasser, R. Northey & T., Eds., Schultz. Washington, DC, 216-238.

Gosselink, R., et al. 2004. "Co-ordination network for lignin-standardisation, production, and applications adapted to market requirements (EUROLIGNIN)," Industrial Crops and Products, 20, 121-129.

Gosselink, R., et al. 2010. "Fractionation, analysis, and PCA modeling of properties of four technical lignins for prediction of their application potential in binders," Holzforschung 64(2), 193-200.

Granata, A. & D. Argyropoulos. 1995. "2-Chloro-4,4,5,5-tetramethyl-1,3,2-dioxaphospholane, a reagent for the accurate determination of the uncondensed and condensed phenolic moieties in lignins," Journal of Agricultural and Food Chemistry 43(6), 1538-1544.

Guerra, A. et al. 2006. "Comparative evaluation of three lignin isolation protocols for various wood species," J. Agric. Food Chem. 54, 9696-9705.

Helm, R. F. 2000. "Lignin-polysaccharide interactions in woody plants." In: *Lignin: Historical, Biological, and Materials Perspectives*, Glasser, W., Northey, R., Schultz, T., Eds., ACS Symp. Series 742, Washington, DC, 161-171.

Holladay, J. E., et al. 2007. *Top Value-Added Chemicals from Biomass: Volume II Results of Screening for Potential Candidates from Biorefinery Lignin*. Pacific Northwest National Laboratory (PNNL) and the National Renewable Energy Laboratory (NREL).

Holtman, et al. 2006. "Quantitative $^{13}$C NMR characterization of milled wood lignins isolated by different milling techniques," Journal of Wood Chemistry and Technology, 26(1), 21-34.

Kassner, M. 2008. *Novel Sustainable Solvents for Bioprocessing Applications*, Thesis, Georgia Institute of Technology, 1-307.

Koshijima, T., et al. 2003. *Association between lignin and carbohydrates in wood and other plant tissues*. Springer-Verlag, Berlin/Heidelberg/New York.

Kostukevich, N., et al. 1993. "Determination of the hydroxyl containing functional groups of the oxygen-acetic lignins by $^{31}$P NMR spectroscopy," Proceedings of the 7th International Symposium on Wood and Pulping Chemistry, Beijing, China, 503-507.

Lawoko, M., et al. 2005. "Structural differences between the lignin-carbohydrate complexes in wood and in chemical pulps," Biomacromolecules, 6, 3467-3473.

Li, L., et al. 1988. "Interaction of supercritical fluids with lignocellulosic materials," Industrial and Engineering Chemistry Research, 27(7), 1301-1312.

Li, J., et al. 2009. "Steam explosion lignins; their extraction, structure and potential as feedstock for biodiesel and chemicals," Bioresource Tech., 100, 2556-2561.

Liitia, T. M., et al. 2003. "Analysis of technical lignins by two- and three-dimensional NMR spectroscopy," J. Agric Food Chem., 51, 2136-2143.

Lin, S. & C. Dence. 1992. *Methods of Lignin Chemistry*. Springer-Verlag, Heidelberg/Berlin/New York.

Lora, J. 2008. "Industrial commercial lignins: Sources, properties and applications." In: *Monomers, Polymers and Composites from Renewable Resources*, Belgacem, M., and Gandini, A. Eds., Elsevier, Oxford, UK, 225-241.

Lora, J. H. & Glasser, W.G. 2002. "Recent industrial applications of lignin: A sustainable alternative to nonrenewable materials," Journal of Polymers and the Environment, 10, 39-48.

Lu, X., et al. 2009. "Two-step hydrolysis of Japanese beech as treated by semi-flow hot-compressed water," J. Wood Sci., 55, 367-375.

Mansouri, N., et al. 2006. "Structural characterization of technical lignins for the production of adhesives: Application to lignosulfonate, kraft, soda-anthraquinone, organosolv and ethanol process lignins," Industrial Crops and Products, 24(1), 8-16.

Mao, J. Z., et al. 2012. "Fractional and structural characterization of alkaline lignins from *carex meyeriana* Kunth," Cellulose Chemistry and Technology, 46(3), 193-205.

Marton, J. 1971. "Reaction in alkaline pulping." In: *Lignins: Occurrence, formation, structure and reactions*. Sarkanen, K. V. & Ludvig C. H., Eds., Wiley—Interscience, New York, 639-694.

Milne, T., et al. 1992. "Standardized analytical methods," Biomass & Bioenergy 2(1-6), 341-366.

Mörck, R., et al. 1986. "Fractionation of kraft lignin by successive extraction with organic solvents. I. Functional groups, $^{13}$C-NMR-spectra and molecular weight distributions," Holzforschung, 40, 51-60.

Nunn, T. et al. 1985. "Product compositions and kinetics in the rapid pyrolysis of milled wood lignin," Ind. Eng. Chem. Process Des. Dev., 24, 844-852.

Ohra-aho, T., et al. 2013. "S/G ratio and lignin structure among Eucalyptus hybrids determined by Py-GC/MS and nitrobenzene oxidation," Journal of Analytical and Applied Pyrolysis, 101, 166-171.

Pan, X., et al. 1999. "Atmospheric acetic acid pulping of rice straw IV: Physico-chemical characterization of acetic acid lignins from rice straw and woods, Part 1. Physical characteristics," Holzforschung, 53(5), 511-518.

Pérez, J., et al. 2008. "Optimizing liquid hot water pretreatment conditions to enhance sugar recovery from wheat straw for fuel-ethanol production," Fuel 87, 3640-3647.

Pu, Y., et al. 2011. "Application of quantitative $^{31}$P NMR in biomass lignin and biofuel precursors characterization," Energy & Environmental Science, 4, 3154-3166.

Ragauskas, A., et al. 2014. "Lignin valorization: Improving lignin processing in the biorefinery," Science, 344 (6185), 1246843.

Ralph, J., et al. 2004. "Lignins: natural polymers from oxidative coupling of 4-hydroxyphenylpropanoids," Phytochem. Rev. 3, 29-60.

Robert, D., et al. 1988. "Structural changes in aspen lignin during steam explosion treatment," Cellulose Chem. Techn., 22, 221-230.

Sakakibara, A. 2001. "Chemistry of lignin." In: *Wood and Cellulose Chemistry*. Hon, D.N.-S., Shiraishi, N., Eds., Marcel Dekker Inc., New York, 109-173.

Santos, R., et al. 2012. "Lignin structural variations in hardwood species," J. Agric. Food Chem., 60, 4923-4930.

Schacht, C. et al. 2008. "From plant materials to ethanol by means of supercritical fluid technology," The Journal of Supercritical Fluids, 46, 299-321.

Smit, R., et al. 1997. "A new method for the quantification of condensed and uncondensed softwood lignin structures," Proc. 9th Intern. Symp. Wood Pulping Chem., Montreal, Canada., L4-1-L4-6.

Sun, S., et al. 2012. "Sequential extractions and structural characterization of lignin with ethanol and alkali from bamboo (*Neosinocalamus affinis*)," Industrial Crops and Products, 37(1), 51-60.

Sun, X., et al. 2005. "Physicochemical characterization of lignin isolated with high yield and purity from wheat straw," International Journal of Polymer Analysis and Characterization, 9, 317-337.

Vanderlaan, M. & R. Thring. 1998. "Polyurethanes from Alcell lignin fractions obtained by sequential solvent extraction," Biomass & Bioenergy, 14, 525-531.

Wallis, A. F. A. 1971. "Solvolysis by acids and bases." In: *Lignins: Occurrence, formation, structure and reactions*. Sarkanen, K.V., et al., Eds., 345-372.

(56) References Cited

OTHER PUBLICATIONS

Wörmeyer, K., et al. 2011. "Comparison of different pretreatment methods for lignocellulisic materials. Part II: Influence of pretreatment on the properties of rye straw lignin," Bioresource Technology, 102, 4157-4164.
Xia, Z., et al. 2001. "Quantitative $^{13}$C NMR of lignins with internal standards," Journal of Agricultural and Food Chemistry, 49, 3573-3578.
Yan, Z., et al. 2007. "Supercritical/subcritical technology for pretreatment and hydrolyzation of stalks," Progress in Chemistry, 19(11), 13/45-19/45.
Zakis, G. 1994. *Functional analysis of lignins and their derivatives.* Tappi Press, Atlanta, Georgia.
Zawadzki, M. & Ragauskas, A. 2001. "N-Hydroxy compounds as new internal standards for the $^{31}$P-NMR determination of lignin hydroxyl functional groups," Holzforschung, 55, 283-285.
Zhang, L. & G. Gellerstedt. 2007. "Quantitative 2D HSQC NMR determination of polymer structures by selecting suitable internal standard references," Magnetic Resonance in Chemistry, 45(1), 37-45.
Zhao, Y., et al. 2009. "Supercritical hydrolysis of cellulose for oligosaccharide production in combined technology," Chemical Engineering Journal, 150(2), 411-417.
Office Action dated Aug. 7, 2012 for Canadian Application No. CA 2,769,746, which was filed on Jan. 19, 2011. (Inventor—Kilambi; Applicant—Renmatix). (pp. 1-3).
Office Action dated Apr. 13, 2012 for Canadian Application No. CA 2,769,746, which was filed on Jan. 19, 2011. (Inventor—Kilambi; Applicant—Renmatix). (pp. 1-2).
Notice of Allowance dated Jan. 28, 2013 for Canadian Application No. CA 2,769,746, which was filed on Jan. 19, 2011. (Inventor—Kilambi; Applicant—Renmatix). (pp. 1-1).
Office Action dated Sep. 23, 2014 for Canadian Application No. CA 2,815,597, which was filed on May 7, 2013. (Inventor—Kilambi; Applicant—Renmatix). (pp. 1-2).
Office Action dated Apr. 23, 2014 for Canadian Application No. CA 2,815,597, which was filed on May 7, 2013. (Inventor—Kilambi; Applicant—Renmatix). (pp. 1-2).
Office Action dated Mar. 14, 2014 for Chinese Application No. CN 201180011545.7, which was filed on Jan. 19, 2011. (Inventor—Kilambi; Applicant—Renmatix) (pp. 1-6).
Office Action dated Nov. 14, 2014 for Chinese Application No. CN 201180011545.7, which was filed on Jan. 19, 2011. (Inventor—Kilambi; Applicant—Renmatix) (pp. 1-66).
International Preliminary Report on Patentability dated Jul. 24, 2012 for International Application No. PCT/US2011/021726, which was filed on Jan. 19, 2011 and published as WO 2011/091044 on Jul. 28, 2011. (Inventor—Kilambi; Applicant—Renmatix) (pp. 1-11).
International Search Report dated Jul. 5, 2011 for International Application No. PCT/US2011/021726, which was filed on Jan. 19, 2011 and published as WO 2011/091044 on Jul. 28, 2011. (Inventor—Kilambi; Applicant—Renmatix) (pp. 1-4).
Written Opinion dated Jul. 5, 2011 for International Application No. PCT/US2011/021726, which was filed on Jan. 19, 2011 and published as WO 2011/091044 on Jul. 28, 2011. (Inventor—Kilambi; Applicant—Renmatix) (pp. 1-10).
Non-Final Rejection dated Sep. 20, 2013 for U.S. Appl. No. 13/864,744, filed Apr. 17, 2013 and published as US 2013/0239954 on Sep. 19, 2013. (Inventor—Kilambi; Applicant—Renmatix). (pp. 1-26).
Notice of Allowance dated Aug. 15, 2014 for U.S. Appl. No. 13/864,744, filed Apr. 17, 2013 and published as US 2013/0239954 on Sep. 19, 2013. (Inventor—Kilambi; Applicant—Renmatix). (pp. 1-9).
Final Rejection dated Mar. 14, 2014 for U.S. Appl. No. 13/864,744, filed Apr. 17, 2013 and published as US 2013/0239954 on Sep. 19, 2013. (Inventor—Kilambi; Applicant—Renmatix). (pp. 1-12).
Office Action dated Jul. 22, 2013 for Canadian Application No. 2,806,873, which was filed on May 4, 2012. (Inventor—Kiran Kadam; Applicant—Renmatix) (pp. 1-3).

Notice of Allowance dated Nov. 20, 2013 for for Canadian Application No. 2,806,873, which was filed on May 4, 2012. (Inventor—Kiran Kadam; Applicant—Renmatix) (pp. 1-1).
Extended European Search Report dated Oct. 16, 2014 for EP 12779305.7, which was filed on May 4, 2012 and published as EP 2705111 on Mar. 14, 2014. (Inventor—Kiran Kadam; Applicant—Renmatix) (pp. 1-2).
International Search Report dated Nov. 30, 2012 for International Application No. PCT/US2012/036591, which was filed on May 4, 2012 and published as WO 2012/151524 on Nov. 8, 2012. (Inventor—Kiran Kadam; Applicant—Renmatix). (pp. 1-3).
Written Opinion dated Nov. 30, 2012 for International Application No. PCT/US2012/036591, which was filed on May 4, 2012 and published as WO 2012/151524 on Nov. 8, 2012. (Inventor—Kiran Kadam; Applicant—Renmatix). (pp. 1-6).
International Preliminary Report on Patentability dated Nov. 5, 2013 for International Application No. PCT/US2012/036591, which was filed on May 4, 2012 and published as WO 2012/151524 on Nov. 8, 2012. (Inventor—Kiran Kadam; Applicant—Renmatix). (pp. 1-7).
First Examination Report dated Aug. 1, 2014 for New Zealand Application No. 616832, which was filed on May 4, 2012. (Inventor—Kiran Kadam; Applicant—Renmatix). (pp. 1-2).
Notice of Allowance dated Dec. 3, 2013 for U.S. Appl. No. 13/464,275, which was filed on May 4, 2012 and published as US 2012/0282465 on Nov. 8, 2012. (Inventor—Kiran Kadam; Applicant—Renmatix) (pp. 1-4).
Notice of Allowance dated Oct. 17, 2013 for U.S. Appl. No. 13/464,275, filed May 4, 2012 and published as US 2012/0282465 on Nov. 8, 2012. (Inventor—Kiran Kadam; Applicant—Renmatix) (pp. 1-9).
Non-Final Rejection dated Jun. 21, 2013 for U.S. Appl. No. 13/464,275, filed May 4, 2012 and published as US 2012/0282465 on Nov. 8, 2012. (Inventor—Kadam; Applicant—Renmatix) (pp. 1-6).
Notice of Allowance dated Jul. 14, 2014 for U.S. Appl. No. 14/045,327, filed Oct. 3, 2013 (Inventor—Kiran Kadam; Applicant—Renmatix) (pp. 1-7).
Non-Final Rejection dated Jan. 3, 2014 for U.S. Appl. No. 14/045,327, filed Oct. 3, 2013 (Inventor—Kiran Kadam; Applicant—Renmatix) (pp. 1-13).
International Preliminary Report on Patentability dated Jul. 1, 2014 for International Application No. PCT/US2012/067535, which was filed on Dec. 3, 2012 and published as WO 2013/101397 on Jul. 4, 2013. (Inventor—Srinivas Kilambi; Applicant—Renmatix) (pp. 1-6).
Written Opinion dated Feb. 20, 2013 for International Application No. PCT/US2012/067535, which was filed on Dec. 3, 2012 and published as WO 2013/101397 on Jul. 4, 2013. (Inventor—Srinivas Kilambi; Applicant—Renmatix) (pp. 1-5).
International Search Report dated Feb. 20, 2013 for International Application No. PCT/US2012/067535, which was filed on Dec. 3, 2012 and published as WO 2013/101397 on Jul. 4, 2013. (Inventor—Srinivas Kilambi; Applicant—Renmatix) (pp. 1-3).
Office Action dated Nov. 21, 2012 for Canadian Application No. CA 2,769,746, which was filed on Jan. 19, 2011. (Inventor—Kilambi; Applicant—Renmatix). (pp. 1-2).
Notice of Allowance dated Apr. 1, 2014 for U.S. Appl. No. 13/472,798, filed May 16, 2012 and published as US 2013/0172540 on Jul. 4, 2013. (Inventor—Srinivas Kilambi; Applicant—Renmatix) (pp. 1-7).
Final Rejection dated Oct. 29, 2013 for U.S. Appl. No. 13/472,798, filed May 16, 2012 and published as US 2013/0172540 on Jul. 4, 2013. (Inventor—Srinivas Kilambi; Applicant—Renmatix) (pp. 1-27).
Non-Final Rejection dated Apr. 17, 2013 for U.S. Appl. No. 13/472,798, filed May 16, 2012 and published as US 2013/0172540 on Jul. 4, 2013. (Inventor—Srinivas Kilambi; Applicant—Renmatix) (pp. 1-12).
Final Rejection dated Dec. 3, 2012 for U.S. Appl. No. 13/472,798, filed May 16, 2012 and published as US 2013/0172540 on Jul. 4, 2013. (Inventor—Srinivas Kilambi; Applicant—Renmatix) (pp. 1-10).

(56) References Cited

OTHER PUBLICATIONS

Non-Final Rejection dated Aug. 7, 2012 for U.S. Appl. No. 13/472,798, filed May 16, 2012 and published as US 2013/0172540 on Jul. 4, 2013. (Inventor—Srinivas Kilambi; Applicant—Renmatix) (pp. 1-9).

International Search Report and Written Opinion dated Jul. 28, 2014 for International Application No. PCT/US2014/029284, which was filed on Mar. 14, 2014 and published as WO 2014/144746 on Sep. 18, 2014. (Inventor—Ewellyn A. Capanema; Applicant—Renmatix) (pp. 1-5).

* cited by examiner

Hibbert ketones

HIGH PURITY LIGNIN, LIGNIN COMPOSITIONS, AND HIGHER STRUCTURED LIGNIN

CROSS REFERENCE TO RELATED APPLICATIONS

The application claims the benefit of U.S. Application No. 61/802,087 filed Mar. 15, 2013, the entire disclosure of which is incorporated herein by reference.

FIELD OF THE INVENTION

The invention generally relates to lignin and lignin compositions having high purity. The invention also generally relates to lignins having unique structural characteristics, including less structural degradation than conventional lignins.

BACKGROUND OF THE INVENTION

Native lignin is the second most abundant natural polymer on Earth. It is an irregular heterogeneous polymer. It is widely believed that lignin structure is tridimensional; however, concrete evidence is lacking, which causes some scientists to question whether the structure truly is tridimensional (Ralph et al. (2004)). Lignin is optically inactive. The repeatable (monomeric) unit in lignin is the phenylpropane unit (or the so-called C9-unit) of the p-hydroxyphenyl (H), guaiacyl (G) and syringyl (S) types (FIG. 1). Coniferous lignins are predominantly of the G-type. Hardwood lignins contain both G-units and S-units. The H-unit content in woody lignin is usually low; however, the H-unit content can significantly contribute to the structure of non-woody lignins (for instance, lignins derived from annual fibers). In addition, annual fiber lignins contain significant amounts of cinnamic and ferrulic acid derivatives attached to the lignin predominantly by ester linkages with the gamma hydroxyl of the C9-units (Ralph et al. (2004), Adler (1977), and Sakakibara (1991)).

Lignin C9-units contain different functional groups. The most common functional groups are aromatic methoxyl and phenolic hydroxyl, primary and secondary aliphatic hydroxyls, small amounts of carbonyl groups (of the aldehyde and ketone types) and carboxyl groups. The monomeric C9 lignin units are linked together to form the polymeric structure of lignin via C—O—C and C—C linkages. The most abundant lignin inter-unit linkage is the β-O-4 type of linkage (see structures 1-4 and 7 of FIG. 1). They constitute about 50% of the inter-unit linkages in lignin (about 45% in softwoods, and up to 60-65% in hardwoods). Other common lignin inter-unit linkages are the resinol (β-β) (structure 6), phenylcoumaran (β-5) (structure 5), 5-5 (structure 12) and 4-O-5 (structure 11) moieties. Their number varies in different lignins, but typically does not exceed 10% of the total lignin moieties. The number of other lignin moieties is usually below 5%. (Adler (1977), Sakakibara (1991), Balakshin et al. (2008))

The degree of lignin condensation ("DC") is an important lignin characteristic, as it is often negatively correlated with lignin reactivity. The definition of condensed lignin moieties is not always clear. Most commonly, condensed lignin structures are lignin moieties linked to other lignin units via the 2, 5 or 6 positions of the aromatic ring (in H-units also via the C-3 position). The most common condensed structures are 5-5', β-5 and 4-O-5' structures. Since the C-5 position of the syringyl aromatic ring is occupied by a methoxyl group, and therefore it cannot be involved in condensation, hardwood lignins are typically less condensed than softwood lignins.

According to the current understanding in the field, typically most lignin in softwood and softwood pulps is linked (i.e., chemically attached) to polysaccharides, mainly hemicelluloses (Lawoko et al. (2005)). The main types of lignin-carbohydrate ("LC") linkages in wood are phenyl glycoside bonds (structure A), esters (structure B) and benzyl ethers (structure C) (see FIG. 1) (Koshijima et al. (2003), Helm (2000), and Balakshin et al. (2007)). The occurrence of stable LC bonds is one of the main reasons preventing selective separation of the wood components in biorefining processes.

Technical lignins are obtained as a result of lignocellulosic biomass processing. Technical lignins differ dramatically from lignin in its native, natural form found in nature (so-called "native lignin") as a result of the combination of multiple reactions that take place during biomass processing. These reactions can include catalyzed biomass hydrolysis, condensation of extracted lignin fragments, elimination of native lignin functional groups, formation of new functional groups, and others. Technical lignins are appreciably more heterogeneous (in terms of chemical structure and molecular mass) than the native lignins. Technical lignins have a large variety of structural moieties typically present in rather small amounts (Balakshin et al. (2003), and Liitia et al. (2003)).

In terms of the chemical structure, native lignins undergo significant degradation and/or modification during biomass processing. Lignin degradation occurs predominantly via cleavage of β-O-4 linkages (although the mechanisms typically are different for different processes) that results in an increase in the amount of phenolic hydroxyls and a decrease in the molecular mass of lignin. Lignin degradation also leads to a decrease in the amount of aliphatic hydroxyls, oxygenated aliphatic moieties and the formation of carboxyl groups and saturated aliphatic structures. In contrast to lignin degradation, some reverse reactions, such as lignin re-polymerization and/or re-condensation, typically take place to certain extents. These reverse reactions typically result in an increase in the molecular mass of lignin, and a decrease in its reactivity. These changes are common for most of the technical lignins, although the degree of transformation can vary significantly depending on the process conditions (temperature, time, pH, and others), feedstock origin, and feedstock identity.

Each process typically provides the lignin with some specific chemical characteristics. First, the reaction mechanism can be quite different in acidic and base media. The cleavage of β-O-4 linkages under alkaline conditions occurs via a quinone-methide intermediate and results in formation of coniferyl alcohol type moieties as a primary reaction product (FIG. 2). They are not accumulated in the lignin however, but undergo further secondary re-arrangement reactions forming various (aryl-) aliphatic acids. β-5 and β-1 type of linkages in native lignin typically cannot be cleaved during the process but are transformed into stilbene type structures (structure 30, FIG. 1). The latter are stable and are accumulated in alkaline lignins. In addition, significant amount of vinyl ether structures (structure 29, FIGS. 1 and 2) are formed during soda pulping and accumulated in the lignin, which is in contrast to kraft lignin. Another structural difference between soda and kraft lignins, as a result of difference in the reaction mechanism, is the presence of aryl-glycerol type structures (structure 20, FIG. 1) in soda lignins. On the other hand, lignin undergoes a demethylation reaction resulting in formation of o-quinone structures during kraft pulping (but not during soda pulping). In addition, kraft lignins typically contain a few percent of organically bonded sulfur, likely in the form of thiol compounds (Balakshin et al. (2003), Gellerstedt (1996), Marton (1971), and Geirer (1980)). Kraft and soda lignins have a significantly higher degree of condensation than the corresponding native lignins. However, this typically is the result of accumulation of condensed moieties of the original native lignin, rather than the extensive condensation reactions during pulping (Balakshin et al. (2003)). Kraft and soda lignins typically contain a few percent of carbohydrate and ash impurities. The amounts of these contaminants are also dependent on the feedstock origin, and the amount of contaminants is typically significantly higher in the annual fiber lignins than in woody lignins.

There is a large variety of lignins that may originate from potential acid-based biorefinery processes (Glasser et al. (1983)). The acid-base processes may be performed by the addition of mineral or organic acids (anywhere from catalytic amounts, up to the use of organic acids as the reaction media) or without acid addition (e.g., autohydrolysis), in which organic acids are generated due to the cleavage of acetyl groups contained in lignocellulosic biomass. Autohydrolysis may also occur due to the formation of acidic reaction products. Technical lignins derived from potential biorefinery processes are much less investigated than kraft lignins.

The main pathway of lignin degradation under acidic condition is the acidic hydrolysis of β-O-4 linkages (FIG. 3). The major product of this reaction is the so-called Hibbert's ketones (Wallis (1971)). Accumulation of these moieties in lignin results in relatively high content of carbonyl groups and the corresponding saturated aliphatic structures, as compared to alkaline lignins (Berlin et al. (2006)). Although degradation of lignin under acidic condition typically occurs via vinyl ether intermediates, these vinyl ether intermediates typically do not accumulate in the lignin, because vinyl ether structures typically are very unstable in acidic media. Significant amounts of olephinic moieties were observed in lignin obtained under acidic conditions, but their nature is different from the olephinic structures of kraft and soda lignins. Their exact structure is still not well understood (Berlin et al. (2006)).

Moreover, lignin condensations taking place under acidic conditions are typically more significant than those taking place in the alkaline process. Acidic lignin condensation occurs predominantly via the 2,6 position of the aromatic ring, in contrast to alkaline condensation which occurs predominantly at the C-5 position of the aromatic ring (Glasser et al. (1983)). The degree of lignin condensation typically is dependent on the acidity of the reaction media (pH and solvent used) and the process severity (temperature, time, pressure). As an extreme example, the most modified technical lignin known is the industrial acid hydrolysis lignin produced in Russia obtained at 170-190° C. for 2-3 h with 1% $H_2SO_4$. This modified technical lignin is highly insoluble in polar organic solvents and NaOH solution due to strong condensation/polymerization reactions during the process. It also has a relatively high content of phenolic hydroxyl groups and olephinic structures. In addition, the modified technical lignin contains 10-30% residual carbohydrates and up to 20% lipophilic extractives (Chudakov (1983)). In contrast, a significant fraction (70-90%) of acid hydrolysis lignin obtained at very high reaction temperature (greater than 2200° C.) but short reaction time (less than 1 min.) was soluble in a solution of 50% dioxane in 1N NaOH.

The carbohydrate content in these soluble lignins was significantly lower at 2-4% (Glasser et al. (1983), and Lora et al. (2002)). Steam explosion lignin is also quite degraded in terms of cleavage of β-O-4 linkages, but typically much less condensed than acid hydrolysis lignins (Glasser et al. (1983), Robert et al. (1988), and Li et al. (2009)). In addition to structural variations in lignins obtained by different processes ("between-process" variations), there are also typically some structural differences between lignins obtained within the same type of process lignin ("within-process" variations). For example, one of the more important factors in within-process variations is the feedstock origin. This directly typically affects structural characteristics, such as ratios between the S, G, and H units, as well as the degree of condensation. It has been shown that various hardwood lignins can degrade differently during kraft pulping, which typically results in different hydroxyl and carboxyl group content, and different β-O-4, β-β, and β-5 linkages (Capanema et al. (2005)).

Lignins having unique structures also have unique properties, and these structurally unique lignins have uses in many different fields and applications, including, for example, adhesives and plastics. Thus, there remains a need in the art for high purity lignins and lignin compositions having unique structures and properties. The application is directed to these, and other important needs.

BRIEF DESCRIPTION OF THE DRAWINGS

The accompanying drawings, which are included to provide a further understanding of the invention and are incorporated in and constitute a part of this specification, illustrate aspects of the invention and together with the description serve to explain the principles of the invention. In the drawings.

DETAILED DESCRIPTION OF THE INVENTION

Figure 1:
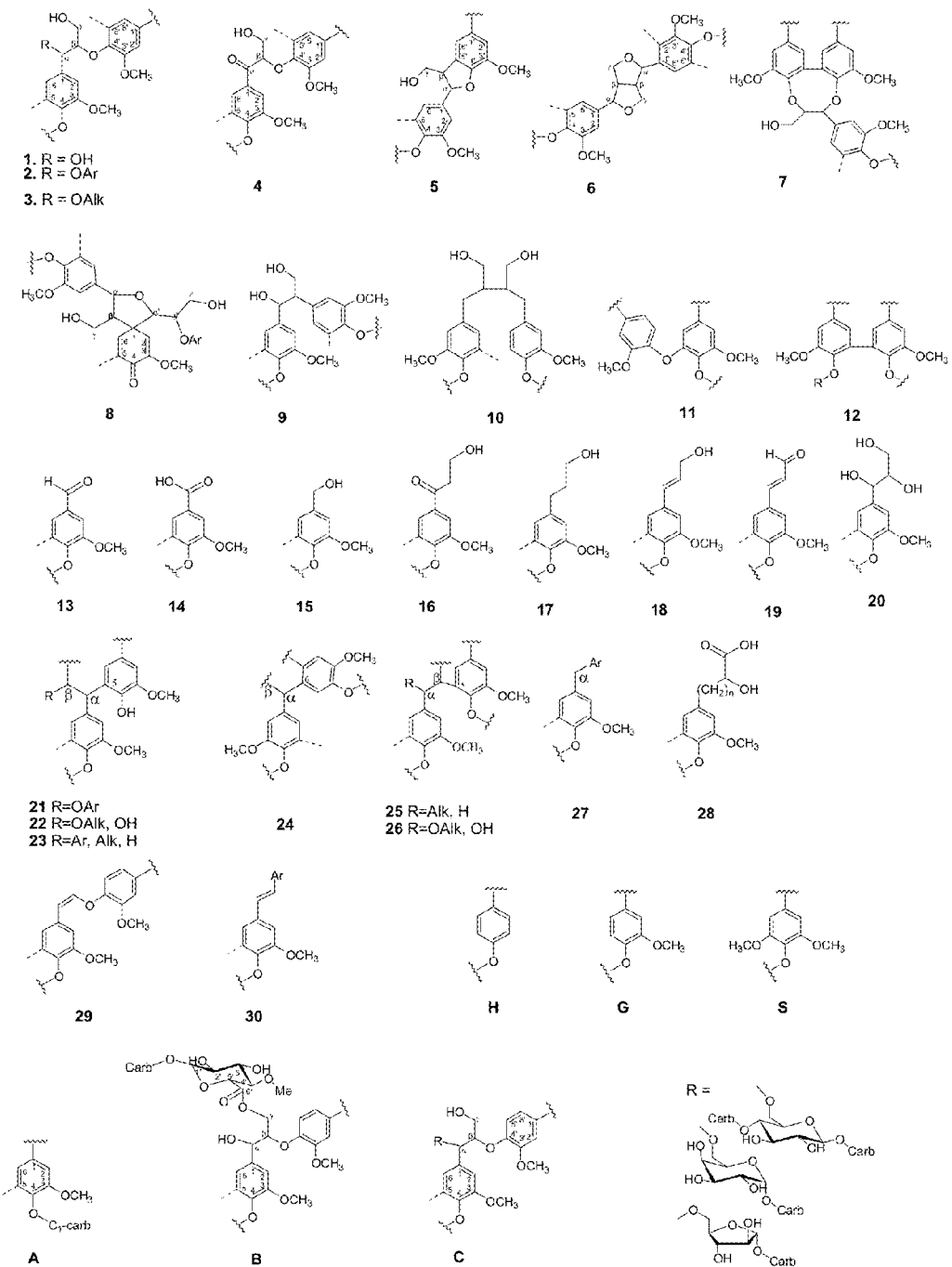
FIG. 1 illustrates structural moieties of various types of lignins.
Figure 2:
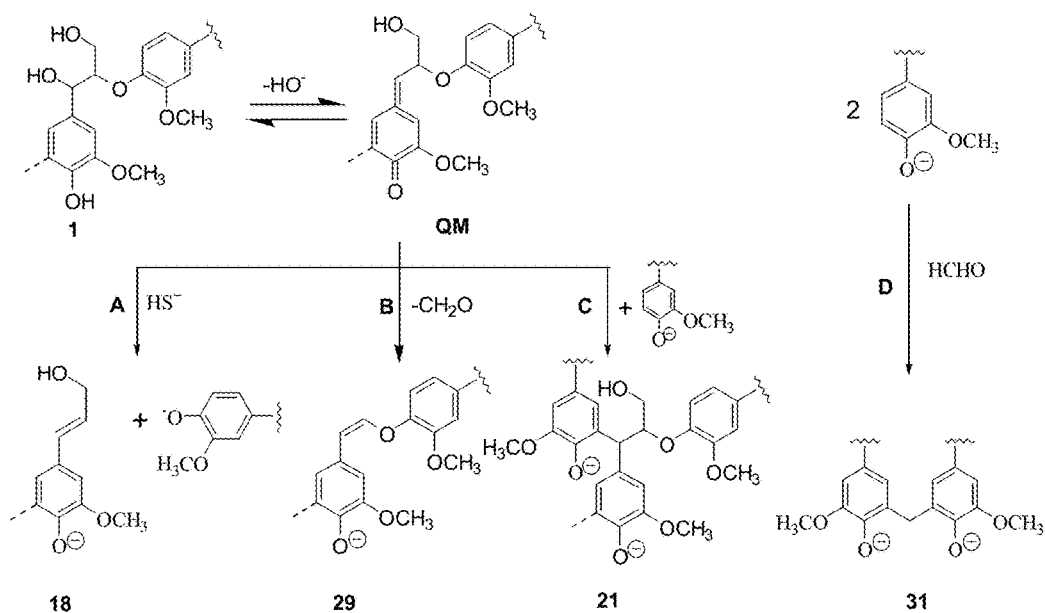
FIG. 2 illustrates the principal lignin reactions that take place during alkaline pulping.
Figure 3:
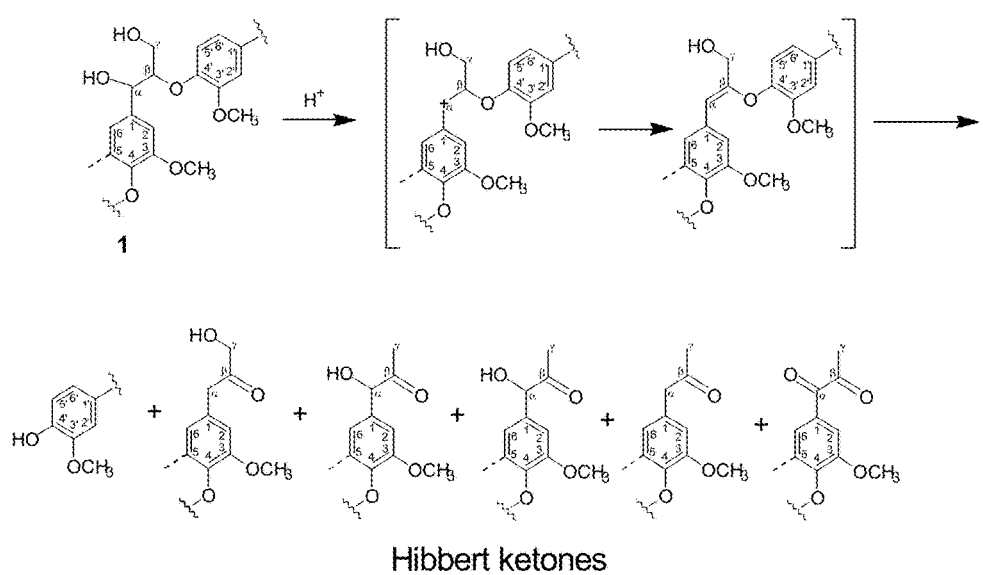
FIG. 3 illustrates the principal reaction taking place during lignin degradation under acidolysis conditions. Cleavage of lignin at the β-O-4 linkage is the principal reaction and results in formation of free phenolic moieties and Hibbert ketones.

As employed above and throughout the disclosure, the following terms, unless otherwise indicated, shall be understood to have the following meanings.

As used herein, the phrase "substantially free" means have no more than about 1%, preferably less than about 0.5%, more preferably, less than about 0.1%, by weight of a component, based on the total weight of any composition containing the component.

As used herein, the singular forms "a," "an," and "the" include the plural reference unless the context clearly indicates otherwise.

While the present invention is capable of being embodied in various forms, the description below of several embodiments is made with the understanding that the present disclosure is to be considered as an exemplification of the invention, and is not intended to limit the invention to the specific embodiments illustrated. Headings are provided for convenience only and are not to be construed to limit the invention in any manner. Embodiments illustrated under any heading may be combined with embodiments illustrated under any other heading.

The use of numerical values in the various quantitative values specified in this application, unless expressly indicated otherwise, are stated as approximations as though the minimum and maximum values within the stated ranges were both preceded by the word "about." In this manner, slight variations from a stated value can be used to achieve substantially the same results as the stated value. Also, the disclosure of ranges is intended as a continuous range including every value between the minimum and maximum values recited as well as any ranges that can be formed by such values. Also disclosed herein are any and all ratios (and ranges of any such ratios) that can be formed by dividing a recited numeric value into any other recited numeric value. Accordingly, the skilled person will appreciate that many such ratios, ranges, and ranges of ratios can be unambiguously derived from the numerical values presented herein and in all instances such ratios, ranges, and ranges of ratios represent various embodiments of the present invention.

As used herein, "higher structured lignin" indicates lignin having a less degraded structure compared to conventional lignin. For example, lignin having a more degraded structure (i.e., conventional lignin) is characterized by (1) a decrease in the amounts of aliphatic OH group (especially secondary ones), β-O-4 and β-β linkages, and oxygenated aliphatic moieties in general (and a decrease in molecular weight), and (2) an increase in the amounts of phenolic OH, COOR and CO functional groups, saturated aliphatic moieties, and the degree of condensation which typically results from formation and accumulation of C—C linkages in the aromatic ring. Conversely, lignin having a less degraded structure (i.e., the lignin of the invention) is characterized by (1) an increase in the amounts of aliphatic OH group (especially secondary ones), β-O-4 and β-β linkages, and oxygenated aliphatic moieties in general (and a decrease in molecular weight), and (2) a decrease in the amounts of phenolic OH, COOR and CO functional groups, saturated aliphatic moieties, and the degree of condensation which typically results from formation and accumulation of C—C linkages in the aromatic ring.

A supercritical fluid is a fluid at a temperature above its critical temperature and at a pressure above its critical pressure. A supercritical fluid exists at or above its "critical point," the point of highest temperature and pressure at which the liquid and vapor (gas) phases can exist in equilibrium with one another. Above critical pressure and critical temperature, the distinction between liquid and gas phases disappears. A supercritical fluid possesses approximately the penetration properties of a gas simultaneously with the solvent properties of a liquid. Accordingly, supercritical fluid extraction has the benefit of high penetrability and good solvation.

Reported critical temperatures and pressures include: for pure water, a critical temperature of about 374.2° C., and a critical pressure of about 221 bar; for carbon dioxide, a critical temperature of about 31° C. and a critical pressure of about 72.9 atmospheres (about 1072 psig). Near critical water has a temperature at or above about 300° C. and below the critical temperature of water (374.2° C.), and a pressure high enough to ensure that all fluid is in the liquid phase. Sub-critical water has a temperature of less than about 300° C. and a pressure high enough to ensure that all fluid is in the liquid phase. Sub-critical water temperature may be greater than about 250° C. and less than about 300° C., and in many instances sub-critical water has a temperature between about 250° C. and about 280° C. The term "hot compressed water" is used interchangeably herein for water that is at or above its critical state, or defined herein as near-critical or sub-critical, or any other temperature above about 50° C. (preferably, at least about 100° C.) but less than subcritical and at pressures such that water is in a liquid state.

Biomass is a renewable energy source generally comprising carbon-based biological material derived from recently-living organisms. The organisms may have been plants, animals, fungi, etc. Examples of biomass include without limitation wood, lignocellulosic biomass, municipal solid waste, manufacturing waste (wood residues such as sawmill and paper mill discards), agricultural residues (including corn stover, sugarcane bagasse, rice hulls, oat hulls, etc.), food waste, black liquor (a byproduct of wood pulping processes), etc. Wood can be, for example, hardwood, softwood, annual fibers, and combinations thereof. Biomass typically comprises cellulose, hemicellulose, and lignin. Any suitable type of biomass can be used as a feedstock for the inventive lignin described herein. Fossil fuels are generally not considered biomass even though ultimately derived from carbon-based biological material. The term "biomass" as used herein does not include fossil fuel sources.

As used herein, the term "glass transition temperature" or "Tg" means the temperature at which an amorphous material changes from a brittle, vitreous state to a plastic state. It is dependent upon the composition of the material being tested, including moisture content, the extent of annealing, and the pressure exerted on the material. Glass transition temperature may be measured by differential scanning calorimetry, thermomechanical analysis, dynamic mechanical analysis, and the like.

As used herein, "steam exploding" means a thermomechanochemical process used to breakdown the structural components of the biomass aided by heat in the form of steam (thermo), shear forces due to the expansion of moisture (mechano), and hydrolysis of glycosidic bonds (chemical). For example, in the reactor, steam under high pressure penetrates the lignocellulosic structures by diffusion. The steam condenses under the high pressure thereby "wetting" the material. The "wet" biomass is "exploded" when the pressure within the reactor is released. Several phenomena occur at this point. First, the condensed moisture within the structure evaporates instantaneously due to the sudden decrease in pressure. The expansion of the water vapor exerts a shear force on the surrounding structure. If this shear force is high enough, the vapor will cause the mechanical breakdown of the lignocellulosic structures.

Lignins of the invention can be prepared by any suitable technique. A preferred process employs a reactive fluid, preferably where the reactive fluid comprises sub-critical, near-critical, or supercritical water. The reactive fluid may additionally comprise carbon dioxide, sulfur dioxide, $C_1$-$C_5$ alcohols (such as methanol, ethanol, propanol, butanol, and pentanol), and combinations thereof. In some embodiments, the reactive fluid does not comprise carbon dioxide. In some embodiments, the reactive fluid does not comprise one or more $C_1$-$C_5$ alcohols. In some embodiments, the reactive fluid does not comprise exogenous acid. In some embodiments, the reactive fluid consists of water in a sub-critical, near-critical, or supercritical state.

The process may comprise a pretreatment step, in which biomass is pretreated under a first temperature and a first pressure for a first period of time, thereby forming a pretreated biomass. The pretreatment step, as used herein, typically comprises extracting hemicellulose (if present) from the biomass, while leaving behind the cellulose (if present) and lignin (i.e., the products of the pretreatment step are termed herein the "pretreated biomass"). Such pretreatment steps are known in the art. The process may additionally comprise a treatment step, in which the pretreated biomass is treated under a second temperature and a second pressure for a second period of time. In some embodiments, the process comprises the treatment step and does not comprise the pretreatment step. In other words, biomass that is not subjected to a pretreatment step as defined herein is subjected to a treatment step comprising a reactive fluid; however, prior to the treatment step the biomass may be comminuted (e.g., size reduced by mechanical means, such as crushing, grinding, collision milling, etc.), which comminution does not qualify as a pretreatment step as used herein. In the case of using a reactive fluid comprising supercritical water, the process may comprise treating biomass using supercritical water without a pretreatment step as defined herein. Suitable temperatures, pressures, and residence times, as well as other suitable conditions for processing biomass, are disclosed in U.S. Patent Application Publication 2012/02961774, hereby incorporated by reference in its entirety. Other processes suitable for preparing the lignins of the invention may also be employed.

The lignins of the invention typically are extracted from the solids produced in a treatment step as described above by using a suitable solvent. Exaction with a suitable solvent is referred to herein as "the extraction step" or "extraction." For example, the solvent can be aqueous alkaline solutions, such as aqueous sodium hydroxide solutions. The amount of base in the alkaline aqueous solutions can be about 0.1 wt. % or more, and the maximum amount is not particularly limited. The amount of base in the alkaline aqueous solutions can be about 3 wt. % or less, and the minimum amount is not particularly limited. The balance of the solution typically comprises or consists of water. For example, the amount of base can be about 0.1 wt. % or more, e.g., about 0.3 wt. % or more, about 0.5 wt. % or more, about 0.7 wt. % or more, about 0.9 wt. % or more, about 1 wt. % or more, about 1.2 wt. % or more, about 1.4 wt. % or more, about 1.6 wt. % or more, about 1.8 wt. % or more, about 2 wt. % or more, about 2.2 wt. % or more, about 2.4 wt. % or more, about 2.6 wt. % or more, or about 2.8 wt. % or more. Alternatively, or in addition, the amount of base in the aqueous alkaline solution can be about 3 wt. % or less, e.g., about 2.8 wt. % or less, about 2.6 wt. % or less, about 2.4 wt. % or less, about 2.2 wt. % or less, about 2 wt. % or less, about 1.8 wt. % or less, about 1.6 wt. % or less, about 1.4 wt. % or less, about 1.2 wt. % or less, about 1 wt. % or less, about 0.9 wt. % or less, about 0.7 wt. % or less, about 0.5 wt. % or less, or about 0.3 wt. % or less. The amount of base in the aqueous alkaline solution can be bounded by any two of the foregoing endpoints, or can be an open-ended range. For example, the amount of base can be about 0.9 wt. % or more, about 1.7 wt. % to about 2.6 wt. %, about 2.8 wt. % to about 3 wt. %, or about 0.9 wt. % to about 1.2 wt. %. Preferably, the aqueous alkaline solution is about 1 wt. %.

Other suitable extraction solvents include aqueous organic solvents, such as at least one of dioxane, acetone, ethanol, methanol, propanol, or butanol in water. The amount of organic solvent (dioxane, acetone, ethanol, methanol, propanol, butanol, or a combination thereof) in the aqueous organic solvent can be about 80 vol. % or more, and the upper limit is not particularly limited. The amount of organic solvent can be about 99.5 vol % or less, and the minimum amount is not particularly limited. The balance can comprise or consist of water. For example, the amount of organic solvent in the aqueous organic solvent can be about 80 vol. % or more, e.g., about 82 vol. % or more, about 84 vol. % or more, about 86 vol. % or more, about 88 vol. % or more, about 90 vol. % or more, about 92 vol. % or more, about 94 vol. % or more, about 96 vol. % or more, about 98 vol. % or more, or about 99 vol. % or more. Alternatively, or in addition, the amount of organic solvent in the aqueous organic solvent can be about 99.5 vol. % or less, e.g., about 99 vol. % or less, about 98 vol. % or less, about 96 vol. % or less, about 94 vol. % or less, about 92 vol. % or less, about 90 vol. % or less, about 88 vol. % or less, about 86 vol. % or less, about 84 vol. % or less, or about 82 vol. % or less. The amount of organic solvent in the aqueous organic solvent can be bounded by any two of the foregoing endpoints, or can be an open-ended range. For example, the amount of organic solvent in the aqueous organic solvent can be about 86 vol. % or less, about 88 vol. % to about 94 vol. %, about 90 vol. % to about 92 vol. %, or about 94 to about 96 vol. %. Preferred amounts of organic solvent in water is about 90 vol. % or about 96 vol. %.

The lignins or lignin compositions of the invention typically contain low amounts of impurities. For example, prior to extraction, the solids resulting from biomass processing may contain significant amounts of carbohydrates, such as xylan, glucan, or combinations thereof. The total amount of carbohydrates typically is about 10 wt. % or more, e.g., about 20 wt. % or more, about 30 wt. % or more, about 40 wt. % or more, or about 50 wt. % or more.

After extraction as described herein, however, the inventive lignins or lignin compositions contain low amounts of carbohydrates, such as xylan, glucan, or both xylan and glucan. The amounts recited hereinbelow may refer to the total amount of carbohydrates, or may specifically refer to either xylan or glucan. For example, the amount of carbohydrates typically can be about 5 wt. % or less, e.g., about 4.5 wt. % or less, about 4 wt. % or less, about 3.5 wt. % or less, about 3 wt. % or less, about 2.5 wt. % or less, about 2 wt. % or less, about 1.8 wt. % or less, about 1.6 wt. % or less, about 1.4 wt. % or less, about 1.2 wt. % or less, about 1 wt. % or less, about 0.8 wt. % or less, about 0.6 wt. % or less, about 0.4 wt. % or less, about 0.2 wt. % or less, or about 0 wt. %. The minimum amount is not particularly limited. Alternatively, or in addition, the amount of carbohydrates after extraction typically is about 0 wt. % or more, e.g., about 0.2 wt. % or more, about 0.4 wt. % or more, about 0.6 wt. % or more, about 0.8 wt. % or more, about 1 wt. % or more, about 1.2 wt. % or more, about 1.4 wt. % or more, about 1.6 wt. % or more, about 1.8 wt. % or more, about 2 wt. % or more, about 2.5 wt. % or more, about 3 wt. % or more, about 3.5 wt. % or more, about 4 wt. % or more, or about 4.5 wt. % or more. The maximum amount is not particularly limited. The amount of carbohydrates after the extraction step can be bounded by any two of the foregoing endpoints, or can be an open-ended range. For example, the amount of carbohydrates after extraction can be about 1 wt. % or more, about 0 wt. % to about 0.2 wt. %, about 0.2 wt. % to about 1 wt. %, or about 0.8 wt. % to about 1.2 wt. %.

The amount of lignin present after the treatment step, but prior to the extraction step, based on the weight of the solids obtained in a treatment step as described herein, is typically about 40 wt. % or more, and the maximum amount is not particularly limited. The amount of lignin present after the treatment step can be about 60 wt. % or less, and the minimum amount is not particularly limited. For example, the amount of lignin prior to the extraction step can be about 40 wt. % or more, about 44 wt. % or more, about 48 wt. % or more, about 52 wt. % or more, or about 56 wt. % or more. Alternatively, or in addition, the amount of lignin typically is about 60 wt. % or less, e.g., about 56 wt. % or less, about 52 wt. % or less, about 48 wt. % or less, or about 44 wt. % or less. The amount of lignin present after the treatment step, but prior to the extraction step, can be bounded by any two of the foregoing endpoints, or can be an open-ended range. For example, the amount of lignin can be about 48 wt. % or more, about 44 wt. % to about 56 wt. %, about 48 wt. % to about 52 wt. %, or about 52 wt. % to about 56 wt. %.

The amount of lignin present after the extraction step, based on the weight of the solids after extraction, is typically about 80 wt. % or more, e.g., about 85 wt. % or more, about 88 wt. % or more, about 90 wt. % or more, about 92 wt. % or more, about 94 wt. % or more, about 96 wt. % or more, about 98 wt. % or more, or about 99 wt. % or more, and the maximum amount is not particularly limited.

The extraction yield of lignin, as defined herein, is typically about 50% or more, e.g., about 55% or more, about 60% or more, about 65% or more, about 70% or more, about 80% or more, about 82% or more, about 84% or more, about 86% or more, about 88% or more, about 90% or more, about 92% or more, about 94% or more, about 96% or more, about 98% or more, or about 99% or more, and the maximum yield is not particularly limited. In an embodiment, the upper limit is less than 100%. These extraction yields apply to any of the extractions solvents disclosed herein. These extraction yield values apply to any of the types of extraction yields set forth in Table 3.

The lignin of the invention has unique structural characteristics. For example, the lignin of the invention has unique moieties and amounts of moieties that differ from conventional lignins. See, for example, Tables 4 and 5 herein. The amounts of moieties are expressed as units of moiety per 100 aromatic units ("units per 100 Ar"), and can be considered as mol %. The aromatic region (about 100-162 ppm) in the 13C spectrum is integrated, and this integral set to a value of 600. Subsequent integration of the moieties or regions of interest in this same spectrum will now be in the units of "per 100 Ar." The unit of measurement "units per 100 Ar" is well known in the art and is the conventional way for describing moieties of lignin. The identities and amounts of moieties in units per 100 Ar, as described herein, apply to the lignins or lignin compositions obtained using any of the extractions solvents as disclosed herein. The measurements can be conducted by quantitative nuclear magnetic resonance spectroscopy (NMR), such as quantitative $^{13}$C NMR spectroscopy. See, for example, Capanema and Jameel et al. (2005) and Capanema and Kadla et al. (2005) for further information on calculating the amounts of moieties in lignin. Quantifying the amounts of the various moieties present in lignin via $^{13}$C and/or $^1$H NMR spectroscopy typically requires integration of the $^{13}$C and/or $^1$H NMR spectra. Chemical shift ranges where various lignin moieties or other regions of interest may be located in a $^{13}$C and/or $^1$H spectrum are reported herein to aid in determining the measurement of these various moieties. However, as one of ordinary skill in the art would certainly understand, the actual integral may be located within a slightly different chemical shift range, and one of ordinary skill in the art would be able to recognize this fact and be able to integrate the appropriate peaks in the appropriate chemical shift range to determine as accurately as possible the integrals of various moieties or regions of interest.

In the measurement of some structural moieties, it is sometimes useful to acetylate the lignin for analytical purposes. In particular, acetylation is used to quantify various OH groups of lignin. In addition, lignin acetylation can result in separation of some signals in an NMR spectrum that otherwise overlap, thereby allowing more accurate integration and quantification. Lignin acetylation can be performed by the method disclosed in Adler (1987).

Different types of carbonyl ("CO") moieties can be measured from the regions of about 200-210 ppm and about 190-200 ppm for non-conjugated and conjugated CO, respectively, in a $^{13}$C NMR spectrum. Typically, the total CO content, non-conjugated CO content, and conjugated CO content are measured for acetylated lignin and non-acetylated lignin, and the two values are averaged. Total CO content is the sum of conjugated CO and non-conjugated CO.

The total carbonyl ("CO") content of the lignins of the invention can be about 10 units or more per 100 Ar, and the maximum amount is not particularly limited. The total CO content of the lignins of the invention can be about 25 units or more per 100 Ar, and the minimum amount is not particularly limited. For example, the total CO content is about 10 or more, e.g, about 11 or more, about 12 or more, about 13 or more, about 14 or more, about 15 or more, about 16 or more, about 17 or more, about 18 or more, about 19 or more, about 20 or more, about 21 or more, about 22 or more, about 23 or more or about 24 or more units per 100 Ar. Alternatively, or in addition, the total CO content can be about 25 or less, e.g., about 24 or less, about 23 or less, about 22 or less, about 21 or less, about 20 or less, about 19 or less, about 18 or less, about 17 or less, about 16 or less, about 15 or less, about 14 or less, about 13 or less, about 12 or less, or about 11 or less units per 100 Ar. The total CO content can be bounded by any two of the foregoing endpoints, or can be an open-ended range. For example, the total CO content can be about 10 or more, about 20 to about 25, about 23 or less, about 11 to about 14, or about 14 to about 17 units per 100 Ar.

The non-conjugated carbonyl ("CO") content of the lignins of the invention can be about 3 units or more per 100 Ar, and the maximum amount is not particularly limited. The non-conjugated CO content can be about 15 units or less per 100 Ar, and the minimum amount is not particularly limited. For example, the non-conjugated CO content can be about 3 or more, e.g., about 4 or more, about 5 or more, about 6 or more, about 7 or more, about 8 or more, about 9 or more, about 10 or more, about 11 or more, about 12 or more, about 13 or more, or about 14 or more units per 100 Ar. Alternatively, or in addition, the non-conjugated CO content can be about 15 or less, e.g., about 14 or less, about 13 or less, about 12 or less, about 11 or less, about 10 or less, about 9 or less, about 8 or less, about 7 or less, about 6 or less, about 5 or less, or about 4 or less units per 100 Ar. The non-conjugated CO content can be bounded by any two of the foregoing endpoints, or can be an open-ended range. For example, the non-conjugated CO content can be about 7 or more, about 5 to about 6, about 6 to about 10, about 11 or less, or about 8 to about 11 units per 100 Ar.

The conjugated carbonyl ("CO") content of the lignins of the invention can be about 5 units or more per 100 Ar, and the maximum amount is not particularly limited. The conjugated CO content of the lignins of the invention can be about 20 units or less per 100 Ar, and the minimum amount is not particularly limited. For example, the conjugated CO content can be about 5 or more, e.g., about 6 or more, about 7 or more, about 8 or more, about 9 or more, about 10 or more, about 11 or more, about 12 or more, about 13 or more, about 14 or more, about 15 or more, about 16 or more, about 17 or more, about 18 or more, or about 19 or more units per 100 Ar. Alternatively, or in addition, the conjugated CO content can be about 20 or less, e.g., about 19 or less, about 18 or less, about 17 or less, about 16 or less, about 15 or less, about 14 or less, about 13 or less, about 12 or less, about 11 or less, about 10 or less, about 9 or less, about 8 or less, about 7 or less, or about 6 or less units per 100 Ar. The conjugated CO content can be bounded by any two of the foregoing endpoints, or can be an open-ended range. For example, the conjugated CO content can be about 9 to about 11, about 14 or more, about 11 to about 14, or about 12 to about 18 units per 100 Ar.

Carboxyl and ester moieties ("COOR") can be measured from the regions of about 167-180 ppm and about 165-167 ppm in the $^{13}$C NMR spectra of non-acetylated lignins. Total COOR content is the sum of aliphatic COOR and conjugated COOR.

The total carboxyl and ester ("COOR") content of the lignins of the invention can be about 5 units or more per 100 Ar, and the maximum amount is not particularly limited. The total COOR content of the lignins of the invention can be about 25 units or less per 100 Ar, and the minimum amount is not particularly limited. For example, the total COOR content can be about 5 or more, e.g., about 6 or more, about 7 or more, about 8 or more, about 9 or more, about 10 or more, about 11 or more, about 12 or more, about 13 or more, about 14 or more, about 15 or more, about 16 or more, about 17 or more, about 18 or more, about 19 or more, about 20 or more, about 21 or more, about 22 or more, about 23 or more, or about 24 or more units per 100 Ar. Alternatively, or in addition, the total COOR content can be about 25 or less, e.g., about 24 or less, about 23 or less, about 22 or less, about 21 or less, about 20 or less, about 19 or less, about 18 or less, about 17 or less, about 16 or less, about 15 or less, about 14 or less, about 13 or less, about 12 or less, about 11 or less, about 10 or less, about 9 or less, about 8 or less, about 7 or less, or about 6 or less units per 100 Ar. The total COOR content can be bounded by any two of the foregoing endpoints, or can be an open-ended range. For example, the total COOR content can be about 7 to about 11, about 10 to about 12, about 5 or more, or about 18 to about 19 units per 100 Ar.

The aliphatic carboxyl and ester ("COOR") content of the lignins of the invention can be about 3 units or more per 100 Ar, and the maximum amount is not particularly limited. The aliphatic COOR content can be about 20 units or less per 100 Ar, and the minimum amount is not particularly limited. For example, the aliphatic COOR content can be about 3 or more, e.g., about 4 or more, about 5 or more, about 6 or more, about 7 or more, about 8 or more, about 9 or more, about 10 or more, about 11 or more, about 12 or more, about 13 or more, about 14 or more, about 15 or more, about 16 or more, about 17 or more, about 18 or more, or about 19 or more units per 100 Ar. Alternatively, or in addition, the aliphatic COOR content can be about 20 or less, e.g., about 19 or less, about 18 or less, about 17 or less, about 16 or less, about 15 or less, about 14 or less, about 13 or less, about 12 or less, about 11 or less, about 10 or less, about 9 or less, about 8 or less, about 7 or less, about 6 or less, about 5 or less, or about 4 or less units per 100 Ar. The aliphatic COOR content can be bounded by any two of the foregoing endpoints, or can be an open-ended range. For example, the aliphatic COOR content can be about 6 to about 9, about 10 or less, about 14 to about 15, or about 8 to about 16 units per 100 Ar.

The conjugated carboxyl and ester ("COOR") content of the lignins of the invention can be about 1 unit or more per 100 Ar, and the maximum amount is not particularly limited. The conjugated COOR content of the lignins of the invention can be about 8 units or less per 100 Ar, and the minimum amount is not particularly limited. For example, the conjugated COOR content can be about 1 or more, e.g., about 2 or more, about 3 or more, about 4 or more, about 5 or more, about 6 or more, or about 7 or more units per 100 Ar. Alternatively, or in addition, the conjugated COOR content can be about 8 or less, e.g., about 7 or less, about 6 or less, about 5 or less, about 4 or less, about 3 or less, or about 2 or less units per 100 Ar. The conjugated COOR content can be bounded by any two of the foregoing endpoints, or can be an open-ended range. For example, the conjugated COOR content can be about 8 or less, about 1 to about 4, about 3 to about 5, or about 2 to about 8 units per 100 Ar.

Hydroxyl ("OH") moieties can be measured from the resonance at about 165-171.5 ppm in the $^{13}$C NMR spectra of acetylated lignin preparations. However, the resonance of acetyl groups may be somewhat overlapped with the resonance of COOR groups, especially for primary OH groups. Therefore, for more accurate values, the resonance of signals in the spectra of non-acetylated lignin are subtracted from the corresponding resonance in the spectra of the acetylated lignins in the range of about 169.7-171.5 ppm, about 169-169.7 ppm, and about 165-169 ppm for primary OH, secondary OH and phenolic OH groups, respectively. Primary OH, secondary OH, and phenolic OH contents can be calculated according to the following equations:

primary OH content=I(171.5-169.7)ac−I(171.5-169.7)na secondary OH content=I(169.7-169.0)ac−I(169.7-169.0)na phenolic OH content=I(169.0-165.0)ac−I(169.0-165.0)na where I(xx-xx)ac and I(xx-xx)nc are the integrals in the range of xx-xx ppm in the $^{13}$C NMR spectra of acetylated ("ac") and non-acetylated lignins ("na"), respectively.

The aliphatic OH is the sum of primary OH and secondary OH. Total OH is the sum of aliphatic OH and phenolic OH. The sum of the various OH groups in the $^{13}$C NMR spectra typically correlates well with the total acetyl group signals at about 18-22 ppm, verifying the feasibility of this calculation method.

The total hydroxyl ("OH") content of the lignins of the invention can be about 100 units or more per 100 Ar, and the maximum amount is not particularly limited. The total OH content of the lignins of the invention can be about 150 units or less per 100 Ar, and the minimum amount is not particularly limited. For example, the total OH content can be about 100 or more, e.g., about 102 or more, about 104 or more, about 106 or more, about 108 or more, about 110 or more, about 112 or more, about 114 or more, about 116 or more, about 118 or more, about 120 or more, about 122 or more, about 124 or more, about 126 or more, about 128 or more, about 130 or more, about 132 or more, about 134 or more, about 136 or more, about 138 or more, about 140 or more, about 142 or more, about 144 or more, about 146 or more, or about 148 or more units per 100 Ar. Alternatively, or in addition, the total OH content can be about 150 or less, e.g., about 148 or less, about 146 or less, about 144 or less, about 142 or less, about 140 or less, about 138 or less, about 136 or less, about 134 or less, about 132 or less, about 130 or less, about 128 or less, about 126 or less, about 124 or less, about 122 or less, about 120 or less, about 118 or less, about 116 or less, about 112 or less, about 110 or less, about 108 or less, about 106 or less, about 104 or less, or about 102 or less units per 100 Ar. The total OH content can be bounded by any two of the foregoing endpoints, or can be an open-ended range. For example, the total OH content can be about 114 to about 122, about 120 or less, about 106 to about 144, or about 136 to about 150 units per 100 Ar.

The aliphatic hydroxyl ("OH") content of the lignins of the invention can be about 35 units or more per 100 Ar, and the maximum amount is not particularly limited. The aliphatic OH content of the lignins of the invention can be about 70 units or less per 100 Ar, and the minimum amount is not particularly limited. For example, the aliphatic OH content can be about 35 or more, e.g., about 38 or more, about 40 or more, about 42 or more, about 44 or more, about 46 or more, about 48 or more, about 50 or more, about 52 or more, about 54 or more, about 56 or more, about 58 or more, about 60 or more, about 62 or more, about 64 or more, about 66 or more, or about 68 or more units per 100 Ar. Alternatively, or in addition, the aliphatic OH content can be about 70 or less, e.g., about 68 or less, about 66 or less, about 64 or less, about 62 or less, about 60 or less, about 58 or less, about 56 or less, about 54 or less, about 52 or less, about 50 or less, about 40 or less, about 46 or less, about 44 or less, about 42 or less, about 40 or less, about 40 or less, about 38 or less, or about 36 or less units per 100 Ar. The aliphatic OH content can be bounded by any two of the foregoing endpoints, or can be an open-ended range. For example, the aliphatic OH content can be about 70 or less, about 40 to about 50, about 56 to about 62, or about 46 to about 52 units per 100 Ar.

The primary hydroxyl ("OH") content of the lignins of the invention can be about 20 units or more per 100 Ar, and the maximum amount is not particularly limited. The primary OH content of the lignins of the invention can be about 40 units or less per 100 Ar, and the minimum amount is not particularly limited. For example, the primary OH content can be about 20 or more, e.g., about 22 or more, about 24 or more, about 26 or more, about 28 or more, about 30 or more, about 32 or more, about 34 or more, about 36 or more, or about 38 or more units per 100 Ar. Alternatively, or in addition, the primary OH content can be about 40 or less, e.g., about 38 or less, about 36 or less, about 34 or less, about 32 or less, about 30 or less, about 28 or less, about 26 or less, about 24 or less, or about 22 or less units per 100 Ar. The primary OH content can be bounded by any two of the foregoing endpoints, or can be an open-ended range. For example, the primary OH content can be about 38 or more, about 26 to about 30, about 32 to about 36, or about 28 to about 40 units per 100 Ar.

The secondary hydroxyl ("OH") content of the lignins of the invention can be about 10 units or more per 100 Ar, and the maximum amount is not particularly limited. The secondary OH content of the lignins of the invention can be about 45 units or less per 100 Ar, and the minimum amount is not particularly limited. For example, the secondary OH content can be about 10 or more, e.g., about 12 or more, about 14 or more, about 16 or more, about 18 or more, about 20 or more, about 22 or more, about 24 or more, about 26 or more, about 28 or more, about 30 or more, about 32 or more, about 34 or more, about 36 or more, about 38 or more, about 40 or more, about 42 or more, or about 44 or more units per 100 Ar. Alternatively, or in addition, the secondary OH content can be about 45 or less, e.g., about 44 or less, about 42 or less, about 40 or less, about 38 or less, about 36 or less, about 34 or less, about 32 or less, about 30 or less, about 28 or less, about 26 or less, about 24 or less, about 22 or less, about 20 or less, about 18 or less, about 16 or less, about 14 or less, or about 12 or less units per 100 Ar. The secondary OH content can be bounded by any two of the foregoing endpoints, or can be an open-ended range. For example, the secondary OH content can be about 12 or less, about 18 to about 28, about 20 to about 22, or about 28 to about 34 units per 100 Ar.

The phenolic hydroxyl ("OH") content of the lignins of the invention can be about 30 units or more per 100 Ar, and the maximum amount is not particularly limited. The phenolic OH content of the lignins of the invention can be about 100 units or less per 100 Ar, and the minimum amount is not particularly limited. For example, the phenolic OH content can be about 30 or more, e.g., about 32 or more, about 34 or more, about 36 or more, about 38 or more, about 40 or more, about 42 or more, about 44 or more, about 46 or more, about 48 or more, about 50 or more, about 52 or more, about 54 or more, about 56 or more, about 58 or more, about 60 or more, about 62 or more, about 64 or more, about 68 or more, about 70 or more, about 72 or more, about 74 or more, about 76 or more, about 78 or more, about 80 or more, about 82 or more, about 84 or more, about 86 or more, about 88 or more, about 90 or more, about 92 or more, about 94 or more, about 96 or more, or about 98 or more units per 100 Ar. Alternatively, or in addition, the phenolic OH content can be about 100 or less, e.g., about 98 or less, about 96 or less, about 94 or less, about 92 or less, about 90 or less, about 88 or less, about 86 or less, about 84 or less, about 82 or less, about 80 or less, about 78 or less, about 76 or less, about 74 or less, about 72 or less, about 70 or less, about 68 or less, about 66 or less, about 64 or less, about 62 or less, about 60 or less, about 58 or less, about 56 or less, about 54 or less, about 52 or less, about 50 or less, about 48 or less, about 46 or less, about 44 or less, about 42 or less, about 40 or less, about 38 or less, about 36 or less, about 34 or less, or about 32 or less units per 100 Ar. The phenolic OH content can be bounded by any two of the foregoing endpoints, or can be an open-ended range. For example, the phenolic OH content can be about 68 or more, about 60 to about 70, about 30 or more, about 66 or less, about 74 to about 80, about 70 or less, or about 62 to about 98 units per 100 Ar.

The ratio of syringyl to guaiacyl ("S/G ratio") can be measured by $^{13}$C NMR using acetylated lignins. The amount of syringyl (S) can be measured by integrating the signals corresponding to the 2- and 6-positions of the syringyl unit (i.e., $S_{2,6}$) in the chemical shift range of about 100-108.6 ppm, and dividing the integral by two (i.e., $S_{2,6}/2$). The amount of guaiacyl can be measured by integrating the 2-position of guaiacyl (i.e., $G_2$) in the chemical shift range of about 108.6-114.6 ppm. The S/G ratio can then be calculated as follows: S/G ratio=$(S_{2,6}/G_2)/2$.

The ratio of syringyl to guaiacyl ("S/G ratio") of the lignins of the invention can be about 1.0 or more, and the maximum ratio is not particularly limited. The S/G ratio can be about 1.5 or less, and the minimum ratio is not particularly limited. For example, the S/G ratio can be about 1.0 or more, e.g., about 1.05 or more, about 1.1 or more, about 1.15 or more, about 1.2 or more, about 1.25 or more, about 1.3 or more, about 1.35 or more, about 1.4 or more, or about 1.45 or more. Alternatively, or in addition, the S/G ratio can be about 1.5 or less, e.g., about 1.45 or less, about 1.4 or less, about 1.35 or less, about 1.3 or less, about 1.25 or less, about 1.2 or less, about 1.15 or less, about 1.1 or less, or about 1.05 or less. The S/G ratio can be bounded by any two of the foregoing endpoints, or can be an open-ended range. For example, the S/G ratio can be about 1.0 or more, 1.1 to about 1.3, about 1.25 to about 1.4, about 1.5 or less, or about 1.2 to about 1.35.

The amount of aromatic protons ("ArH") can be measured from the integral at about 100-125 ppm ("$I_{100-125}$") in the spectra of acetylated lignins.

The aryl proton ("ArH") content of the lignins of the invention can be about 190 units or more per 100 Ar, and the maximum amount is not particularly limited. The ArH content of the lignins of the invention can be about 220 units or less per 100 Ar, and the minimum amount is not particularly limited. For example, the ArH content can be about 190 or more, about 195 or more, about 200 or more, about 205 or more, about 210 or more, or about 215 or more units per 100 Ar. Alternatively, or in addition, the ArH content can be about 220 or less, e.g., about 215 or less, about 210 or less, about 205 or less, about 200 or less, or about 195 or less units per 100 Ar. The ArH content can be bounded by any two of the foregoing endpoints, or can be an open-ended range. For example, the ArH content can be about 195 or less, about 200 to about 210, about 195 to about 205, about 220 or less, or about 210 to about 220 units per 100 Ar.

The degree of condensation ("DC"—see, e.g., structure 11, 12, and 21-26 of FIG. 1) of the lignins of the invention can be measured by $^{13}$C NMR using non-acetylated lignin and the formula: DC=[300−(S+H)/(S+G+H)*100]−$I_{100-125}$. S and G in this formula are the same as defined in the calculation of the S/G ratio. H is determined by integrating in the chemical shift range of about 156-161 ppm. The DC can be thought of as the percentage of condensed moieties (condensed C9 units) to total moieties (all C9 units). The DC of the lignins of the invention can be about 30 or more, and the maximum DC is not particularly limited. The DC of the lignins of the invention can be about 50 or less, and the minimum DC is not particularly limited. For example, the degree of condensation can be about 30 or more, e.g., about 32 or more, about 34 or more, about 36 or more, about 38 or more, about 40 or more, about 42 or more, about 44 or more, about 46 or more, or about 48 or more. Alternatively, or in addition, the degree of condensation can be about 50 or less, e.g., about 48 or less, about 46 or less, about 44 or less, about 42 or less, about 40 or less, about 38 or less, about 36 or less, about 34 or less, or about 32 or less. The degree of condensation can be bounded by any two of the foregoing endpoints, or can be an open-ended range. For example, the degree of condensation can be about 30 or more, about 38 to about 42, about 40 to about 46, or about 32 to about 42.

Various types of β-O-4 linkages (see, e.g., structures 1-4 of FIG. 1) can be measured by subtracting the resonance at about 83-90 ppm in the $^{13}$C NMR spectrum of an acetylated lignin from the resonance in the same region in the spectrum of the corresponding non-acetylated lignin.

The content of β-O-4 linkages of the lignins of the invention can be about 4 units or more per 100 Ar, and the maximum amount is not particularly limited. The content of β-O-4 linkages of the lignins of the invention can be about 26 units or less per 100 Ar, and the minimum amount is not particularly limited. For example, the content of β-O-4 linkages can be about 4 or more, e.g., about 6 or more, about 8 or more, about 10 or more, about 12 or more, about 14 or more, about 16 or more, about 18 or more, about 20 or more, about 22 or more, or about 24 or more units per 100 Ar. Alternatively, or in addition, the content of β-O-4 linkages can be about 26 or less, e.g., about 24 or less, about 22 or less, about 20 or less, about 18 or less, about 16 or less, about 14 or less, about 12 or less, about 10 or less, about 8 or less, or about 6 or less units per 100 Ar. The content of β-O-4 linkages can be bounded by any two of the foregoing endpoints, or can be an open-ended range. For example, the content of β-O-4 linkages can be about 10 or more, about 10 to about 26, about 14 to about 18, or about 16 to about 22 units per 100 Ar.

β-5 and β-β linkages (see, e.g., structure 5 and structure 6, respectively, of FIG. 1) can be measured using the integrals at about 86-88 ppm and 84-86 ppm, respectively, in the $^{13}$C NMR spectra of acetylated lignins.

The content of β-β linkages of the lignins of the invention can be about 1 unit or more per 100 Ar, and the maximum amount is not particularly limited. The content of β-β linkages of the lignins of the invention can be about 10 units or less per 100 Ar, and the minimum amount is not particularly limited. For example, the content of β-β linkages can be about 1 or more, e.g., about 2 or more, about 3 or more, about 4 or more, about 5 or more, about 6 or more, about 7 or more, about 8 or more, or about 9 or more units per 100 Ar. Alternatively, or in addition, the content of β-β linkages can be about 10 or less, e.g., about 9 or less, about 8 or less, about 7 or less, about 6 or less, about 5 or less, about 4 or less, about 3 or less, or about 2 or less units per 100 Ar. The content of β-β linkages can be bounded by any two of the foregoing endpoints, or can be an open-ended range. For example, the content of β-β linkages can be about 3 or more, about 4 to about 5, about 2 to about 8, or about 6 to about 10 units per 100 Ar.

The content of β-5 linkages of the lignins of the invention can be about 1 unit or more, and the maximum amount is not particularly limited. The content of β-5 linkages of the lignins of the invention can be about 10 units or less per 100 Ar, and the minimum amount is not particularly limited. For example, the content of β-5 linkages can be about 1 or more, e.g., about 2 or more, about 3 or more, about 4 or more, about 5 or more, about 6 or more, about 7 or more, about 8 or more, or about 9 or more units per 100 Ar. Alternatively, or in addition, the content of β-5 linkages can be about 10 or less, e.g., about 9 or less, about 8 or less, about 7 or less, about 6 or less, about 5 or less, about 4 or less, about 3 or less, or about 2 or less units per 100 Ar. The content of β-5 linkages can be bounded by any two of the foregoing endpoints, or can be an open-ended range. For example, the content of β-5 linkages can be about 4 or more, about 2 to about 4, about 3 to about 7, or about 5 to about 9 units per 100 Ar.

The methoxyl ("OCH$_3$") content can be measured using the integrals at about 54.3-58.5 ppm in the $^{13}$C spectra. Typically, the OCH$_3$ content is measured for both acetylated lignin and non-acetylated lignin, and the two values are averaged. The methoxyl ("OCH$_3$") content of the lignins of the invention can be about 100 units or more per 100 Ar, and the maximum amount is not particularly limited. The OCH$_3$ content of the lignins of the invention can be about 140 units or less per 100 Ar, and the minimum amount is not particularly limited. For example, the OCH$_3$ content can be about 100 or more, e.g., about 102 or more, about 104 or more, about 106 or more, about 108 or more, about 110 or more, about 112 or more, about 114 or more, about 116 or more, about 118 or more, about 120 or more, about 122 or more, about 124 or more, about 126 or more, about 128 or more, about 130 or more, about 132 or more, about 134 or more, about 136 or more, or about 138 or more units per 100 Ar. Alternatively, or in addition, the OCH$_3$ content can be about 140 or less, e.g., about 138 or less, about 136 or less, about 134 or less, about 132 or less, about 130 or less, about 128 or less, about 126 or less, about 124 or less, about 122 or less, about 120 or less, about 118 or less, about 116 or less, about 114 or less, about 112 or less, about 110 or less, about 108 or less, about 106 or less, about 104 or less, or about 102 or less units per 100 Ar. The OCH$_3$ content can be bounded by any two of the foregoing endpoints, or can be an open-ended range. For example, the OCH$_3$ content can be about 122 or less, about 110 to about 120, about 128 or less, about 100 to about 128, about 116 or less, or about 112 to about 140 units per 100 Ar.

The oxygenated aliphatic content can be measured using the integrals at about 58.5-90.0 ppm in the spectra of both the acetylated lignin and non-acetylated lignin, and the results are averaged. Typically the oxygenated aliphatic content is corrected for sugar content according to the method reported in Example 4 when the sugar content is at least about 2 units per 100 Ar. The oxygenated aliphatic content of the lignins of the invention can be about 80 units or more per 100 Ar, and the maximum amount is not particularly limited. The oxygenated aliphatic content of the lignins of the invention can be about 300 units or less per 100 Ar, and the minimum amount is not particularly limited. For example, the oxygenated aliphatic content can be about 80 or more, e.g., about 85 or more, about 90 or more, about 95 or more, about 100 or more, about 102 or more, about 104 or more, about 106 or more, about 108 or more, about 110 or more, about 112 or more, about 114 or more, about 116 or more, about 118 or more, about 120 or more, about 125 or more, about 130 or more, about 135 or more, about 140 or more, about 145 or more, about 150 or more, about 160 or more, about 170 or more, about 180 or more, about 190 or more, about 200 or more, about 210 or more, about 220 or more, about 230 or more, about 240 or more, about 250 or more, about 260 or more, about 270 or more, about 280 or more, or about 290 or more units per 100 Ar. Alternatively, or in addition, the oxygenated aliphatic content can be about 300 or less, e.g., 290 or less, about 280 or less, about 270 or less, about 260 or less, about 250 or less, about 240 or less, about 230 or less, about 220 or less, about 210 or less, about 200 or less, about 190 or less, about 180 or less, about 170 or less, about 160 or less, about 150 or less, about 145 or less, about 140 or less, about 135 or less, about 130 or less, about 125 or less, about 120 or less, about 118 or less, about 116 or less, about 114 or less, about 112 or less, about 110 or less, about 108 or less, about 106 or less, about 104 or less, about 102 or less, about 100 or less, about 95 or less, about 90 or less, or about 85 or less units per 100 Ar. The oxygenated aliphatic content can be bounded by any two of the foregoing endpoints, or can be an open-ended range. For example, the oxygenated aliphatic content can be about 300 or less, about 116 or more, about 95 to about 150, about 95 to about 220, about 95 or more, about 120 or less, about 112 to about 150, or about 110 to about 136 units per 100 Ar.

The saturated aliphatic content of the lignins of the invention can be about 30 units or more per 100 Ar, and the maximum amount is not particularly limited. The saturated aliphatic content of the lignins of the invention can be about 100 units or less per 100 Ar, and the minimum amount is not particularly limited. For example, the saturated aliphatic content can be about 30 or more, e.g., about 32 or more, about 34 or more, about 36 or more, about 38 or more, about 40 or more, about 42 or more, about 44 or more, about 46 or more, about 48 or more, about 50 or more, about 52 or more, about 54 or more, about 56 or more, about 58 or more, about 60 or more, about 62 or more, about 64 or more, about 68 or more, about 70 or more, about 72 or more, about 74 or more, about 76 or more, about 78 or more, about 80 or more, about 82 or more, about 84 or more, about 86 or more, about 88 or more, about 90 or more, about 92 or more, about 94 or more, about 96 or more, or about 98 or more units per 100 Ar. Alternatively, or in addition, the saturated aliphatic content can be about 100 or less, e.g., about 98 or less, about 96 or less, about 94 or less, about 92 or less, about 90 or less, about 88 or less, about 86 or less, about 84 or less, about 82 or less, about 80 or less, about 78 or less, about 76 or less, about 74 or less, about 72 or less, about 70 or less, about 68 or less, about 66 or less, about 64 or less, about 62 or less, about 60 or less, about 58 or less, about 56 or less, about 54 or less, about 52 or less, about 50 or less, about 48 or less, about 46 or less, about 44 or less, about 42 or less, about 40 or less, about 38 or less, about 36 or less, about 34 or less, or about 32 or less units per 100 Ar. The saturated aliphatic content can be bounded by any two of the foregoing endpoints, or can be an open-ended range. For example, the saturated aliphatic content can be about 50 to about 56, about 40 to about 94, about 90 or less, or about 52 to about 76 units per 100 Ar.

The sugar content of the lignins of the invention is not particularly limited, and can be at least about 0 units per 100 Ar, and the maximum amount is not particularly limited. The sugar content can be less than about 20 units per 100 Ar, and the minimum amount is not particularly limited. For example, the sugar content can be at least about 0 units, e.g., at least about 1 unit, at least about 2 units, at least about 3 units, at least about 4 units, at least about 5 units, at least about 6 units, at least about 8 units, at least about 10 units, at least about 12 units, at least about 14 units, at least about 16 units, at least about 18 units or more, per 100 Ar. Alternatively, or in addition, the sugar content can be less than about 20 units, e.g., less than about 18 units, less than about 16 units, less than about 14 units, less than about 12 units, less than about 10 units, less than about 8 units, less than about 6 units, less than about 5 units, less than about 4 units, less than about 3 units, less than about 2 units, or less than about 1 unit, per 100 Ar. The sugar content can be bounded by any two of the foregoing endpoints, or can be an open-ended range. For example, the sugar content can be at least about 2 units, about 1 unit to about 4 units, or less than about 10 units. In some embodiments, the sugar content can be about 0 units per 100 Ar, or about 1 unit per 100 Ar.

Figure 4:
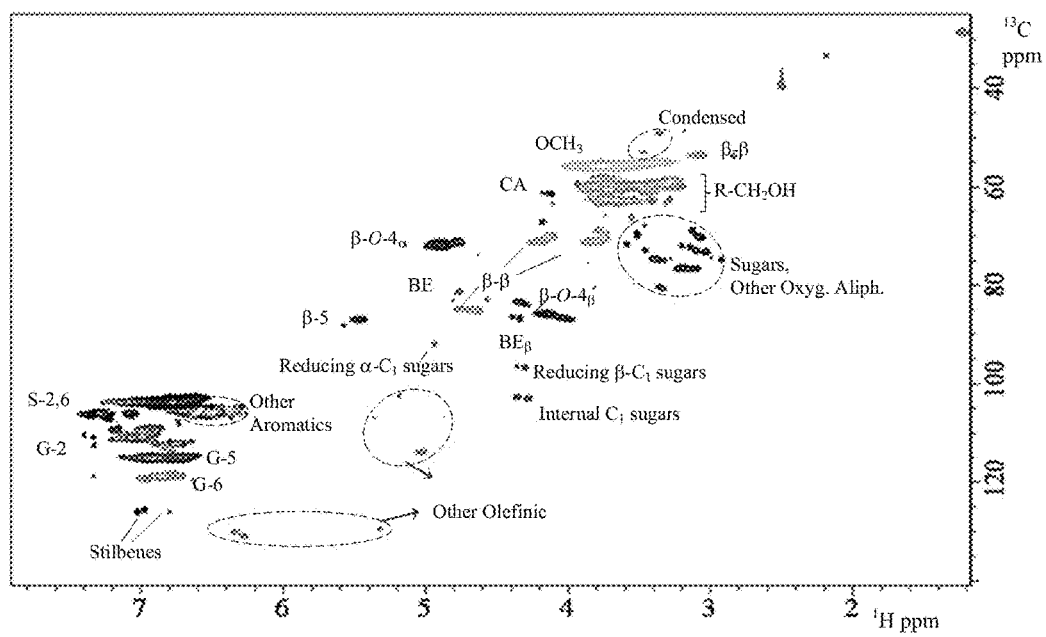
FIG. 4 illustrates a 2D $^1H-^{13}C$ HSQC NMR spectrum of lignin of the invention extracted with dioxane.

In some embodiments, the lignins of the invention can have a two-dimensional proton-carbon heteronuclear single quantum coherence nuclear magnetic resonance (2D $^1$H—$^{13}$C HSQC NMR) spectrum comprising the spectrum shown in FIG. 4. In some embodiments, the lignins of the invention can have a 2D $^1$H—$^{13}$C HSQC NMR spectrum comprising the cross peaks shown in FIG. 4. In some embodiments, the lignins of the invention can have a 2D $^1$H—$^{13}$C HSQC NMR spectrum comprising at least one of the cross peaks shown in FIG. 4. In some embodiments, the lignins of the invention can have a 2D $^1$H—$^{13}$C HSQC NMR spectrum comprising the spectrum shown in at least one of FIGS. 7, 10, 13, and 16. In some embodiments, the lignins of the invention can have a 2D $^1$H—$^{13}$C HSQC NMR spectrum comprising the cross peaks shown in at least one of FIGS. 7, 10, 13, and 16. In some embodiments, the lignins of the invention can have a 2D $^1$H—$^{13}$C HSQC NMR spectrum comprising at least one of the cross peaks shown in at least one of FIGS. 7, 10, 13, and 16. In some embodiments, the lignins of the invention can have a $^{13}$C NMR spectrum comprising the spectrum shown in FIG. 5.

In some embodiments, the lignins of the invention may have (+) or may not have (−) cross peaks in one or more chemical shift regions of a 2D $^1$H—$^{13}$C HSQC NMR spectrum. To determine whether signals are present or absent in a 2D spectrum, the intensity of the 2D NMR spectrum typically is set to a level where true signals and background noise can be distinguished. Noise does not qualify as cross peaks. Chemical shift regions in a 2D $^1$H—$^{13}$C HSQC NMR spectrum can be defined by a $^{13}$C chemical shift range (in ppm) in the $^{13}$C dimension and a $^1$H chemical shift range (in ppm) in the $^1$H dimension, akin to the x and y coordinates of a typical two-dimensional graph. For example, the inventive lignin from Run 2 of Example 1 has cross peaks in a 2D $^1$H—$^{13}$C HSQC NMR spectrum at the chemical shift region defined by a $^{13}$C chemical shift range of 106.9 to 107.45 ppm and a $^1$H chemical shift range of 5.74 to 5.84 ppm (see Table 10 of Example 7). In contrast, the two comparative lignins described in Example 7 do not have cross peaks at this chemical shift region, and therefore the indicated inventive lignin is unique for this reason alone. In general, the inventive lignins can have (+) cross peaks or not have (−) cross peaks at any of the chemical shift regions indicated in Table 10 of Example 7. Moreover, the inventive lignins may have (+) or may not have (−) cross peaks at any combination of the chemical shift regions indicated in Table 10 of Example 7. For example, the lignins of the invention can have (+) cross peaks in a 2D $^1$H—$^{13}$C HSQC NMR spectrum at the chemical shift region defined by a $^{13}$C chemical shift range of 24.75 to 25.25 ppm and a $^1$H chemical shift range of 2.7 to 2.8 ppm, and in addition the lignins of the invention may not have (−) cross peaks in the chemical shift region defined by a $^{13}$C chemical shift range of 46.5 to 47 ppm and a $^1$H chemical shift range of 2.86 to 2.96 ppm. Any suitable combinations of chemical shift regions in Table 10 of Example 7 describing the presence (+) or absence (−) of cross peaks may be used to describe the lignins of the invention.

The glass transition temperature ("Tg") of the lignins of the invention can be about 40° C. or more, and the maximum Tg is not particularly limited. The Tg of the lignins of the invention can be about 120° C. or less, and the minimum Tg is not particularly limited. For example, the Tg can be about 40° C. or more, e.g., about 45° C. or more, about 50° C. or more, about 55° C. or more, about 60° C. or more, about 65° C. or more, about 70° C. or more, about 75° C. or more, about 80° C. or more, about 85° C. or more, about 90° C. or more, about 95° C. or more, about 100° C. or more, about 105° C. or more, or about 110° C. or more, about 115 or more. Alternatively, or in addition, the Tg can be about 120° C. or less, e.g., about 115° C. or less, about 110° C. or less, about 105° C. or less, about 100° C. or less, about 95° C. or less, about 90° C. or less, about 85° C. or less, about 80° C. or less, about 75° C. or less, about 70° C. or less, about 65° C. or less, about 60° C. or less, about 55° C. or less, about 50° C. or less, or about 45° C. or less. The Tg can be bounded by any two of the foregoing endpoints, or can be an open-ended range. For example, the Tg can be about 65° C. to about 75° C., about 55° C. to about 80° C., or about 75° C. to about 95° C.

The number average molecular weight ("$M_n$") of the lignins of the invention can be at least about 600 g/mol, and the maximum $M_n$ is not particularly limited. The $M_n$ of the lignins of the invention can be less than about 1300 g/mol, and the minimum $M_n$ is not particularly limited. For example, the $M_n$ can be at least about 600 g/mol, e.g., at least about 650 g/mol, at least about 700 g/mol, at least about 750 g/mol, at least about 800 g/mol, at least about 850 g/mol, at least about 900 g/mol, at least about 950 g/mol, at least about 1000 g/mol, at least about 1050 g/mol, at least about 1100 g/mol, at least about 1150 g/mol, at least about 1200 g/mol, or at least about 1250 g/mol. Alternatively, or in addition, the $M_n$ can be less than about 1300 g/mol, e.g., less than about 1250 g/mol, less than about 1200 g/mol, less than about 1150 g/mol, less than about 1100 g/mol, less than about 1050 g/mol, less than about 1000 g/mol, less than about 950 g/mol, less than about 900 g/mol, less than about 850 g/mol, less than about 800 g/mol, less than about 750 g/mol, less than about 700 g/mol, or less than about 650 g/mol. The $M_n$ can be bounded by any two of the foregoing endpoints, or can be an open-ended range. For example, the $M_n$ can be at least about 700 g/mol, about 800 g/mol to about 1100 g/mol, or about 950 g/mol or less.

The weight average molecular weight ("$M_w$") of the lignins of the inventions can be at least about 1500 g/mol, and the maximum $M_w$ is not particularly limited. The $M_w$ of the lignins of the invention can be less than about 4300 g/mol, and the minimum $M_w$ is not particularly limited. For example, the $M_w$ can be at least about 1500 g/mol, e.g., at least about 1700 g/mol, at least about 1900 g/mol, at least about 2100 g/mol, at least about 2300 g/mol, at least about 2500 g/mol, at least about 2700 g/mol, at least about 2900 g/mol, at least about 3100 g/mol, at least about 3300 g/mol, at least about 3500 g/mol, at least about 3700 g/mol, at least about 3900 g/mol, or at least about 4100 g/mol. Alternatively, or in addition, the $M_w$ can be less than about 4300 g/mol, e.g., less than about 4100 g/mol, less than about 3900 g/mol, less than about 3700 g/mol, less than about 3500 g/mol, less than about 3300 g/mol, less than about 3100 g/mol, less than about 2900 g/mol, less than about 2700 g/mol, less than about 2500 g/mol, less than about 2300 g/mol, less than about 2100 g/mol, less than about 1900 g/mol, or less than about 1700 g/mol. The $M_w$ can be bounded by any two of the foregoing endpoints, or can be an open-ended range. For example, the $M_w$ can be at least about 1700 g/mol, about 2300 g/mol to about 3100 g/mol, or less than about 3900 g/mol.

The Z-average ("$M_z$") molecular weight of the lignins of the invention can be at least about 6500 g/mol, and the maximum $M_z$ is not particularly limited. The $M_z$ of the lignins of the invention can be less than about 25000 g/mol, and the minimum $M_z$ is not particularly limited. For example, the $M_z$ can be at least about 6500 g/mol, e.g., at least about 7000 g/mol, at least about 7500 g/mol, at least about 8000 g/mol, at least about 8500 g/mol, at least about 9000 g/mol, at least about 9500 g/mol, at least about 10000 g/mol, at least about 10500 g/mol, at least about 11000 g/mol, at least about 11500 g/mol, at least about 12000 g/mol, at least about 14000 g/mol, at least about 16000 g/mol, at least about 18000 g/mol, at least about 18500 g/mol, at least about 19000 g/mol, at least about 19500 g/mol, at least about 20000 g/mol, at least about 20500 g/mol, at least about 21000 g/mol, at least about 21500 g/mol, at least about 22000 g/mol, at least about 22500 g/mol, at least about 23000 g/mol, at least about 23500 g/mol, at least about 24000 g/mol, or at least about 24500 g/mol. Alternatively, or in addition, the Mz can be less than about 25000 g/mol, e.g., less than about 24500 g/mol, less than about 24000 g/mol, less than about 23500 g/mol, less than about 23000 g/mol, less than about 22500 g/mol, less than about 22000 g/mol, less than about 21500 g/mol, less than about 21000 g/mol, less than about 20500 g/mol, less than about 20000 g/mol, less than about 19500 g/mol, less than about 19000 g/mol, less than about 18500 g/mol, less than about 18000 g/mol, less than about 16000 g/mol, less than about 14000 g/mol, less than about 12000 g/mol, less than about 11500 g/mol, less than about 11000 g/mol, less than about 10500 g/mol, less than about 10000 g/mol, less than about 9500 g/mol, less than about 9000 g/mol, less than about 8500 g/mol, less than about 8000 g/mol, less than about 7500 g/mol, or less than about 7000 g/mol. The $M_z$ can be bounded by any two of the foregoing endpoints, or can be an open-ended range. For example, the $M_z$ can be at least about 7500 g/mol, about 19000 g/mol to about 21500 g/mol, or less than about 10000 g/mol.

The polydispersity index ("PDI") of the lignins of the invention can be at least about 1, and the maximum PDI is not particularly limited. The PDI of the lignins of the invention can be less than about 4, and the minimum PDI typically is greater than about 1. For example, the PDI can be at least about 1, e.g., at least about 1.3, at least about 1.5 at least about 1.8, at least about 2, at least about 2.2, at least about 2.4, at least about 2.6, at least about 2.8, at least about 3, at least about 3.2, at least about 3.4, at least about 3.6, or at least about 3.8. Alternatively, or in addition, the PDI can be less than about 4, e.g., less than about 3.8, less than about 3.6, less than about 3.4, less than about 3.2, less than about 3, less than about 2.8, less than about 2.6, less than about 2.4, less than about 2.2, less than about 2, less than about 1.8, less than about 1.5, or less than about 1.3. The PDI can be bounded by any two of the foregoing endpoints, or can be an open-ended range. For example, the PDI can be at least about 2.2, about 2 to about 3.6, or about 2.2 or less.

The lignins of the invention can be characterized by pyrolysis GC/MS according to the procedures disclosed herein. When subjected to the disclosed pyrolysis conditions, at least a portion of the lignin will break down into simpler molecules that can be identified by GC/MS. Some of the unique characteristics of the lignins of the invention can be demonstrated when subjected to pyrolysis GC/MS in this manner. See, for example, the examples herein, especially Example 6 and Table 8. When the lignins of the invention are subjected to the pyrolysis GC/MS analysis disclosed herein, various compounds can form and be detected. The amounts of these compounds are expressed as a percentage of the total integrated peak area in the GC chromatogram within the retention time of about 1 min to about 48 min (e.g., about 1.5 min to about 47.5 min).

When the lignins of the invention are subjected to the pyrolysis GC/MS analysis disclosed herein, syringol can form and be detected (having a retention time under the disclosed conditions of about 20.5 min to about 21.5 min). The amount of syringol can be at least about 2%, and the maximum amount is not particularly limited. The amount of syringol can be about 20% or less, and the minimum amount is not particularly limited. For example, the amount of syringol can be about 2% or more, e.g., about 3% or more, about 4% or more, about 5% or more, about 6% or more, about 7% or more, about 8% or more, about 9% or more, about 10% or more, about 11% or more, about 12% or more, about 13% or more, about 14% or more, about 15% or more, about 16% or more, about 17% or more, about 18% or more, or about 19% or more. Alternatively, or in addition, the amount of syringol can be about 20% or less, e.g., about 19% or less, about 18% or less, about 17% or less, about 16% or less, about 15% or less, about 14% or less, about 13% or less, about 12% or less, about 11% or less, about 10% or less, about 9% or less, about 8% or less, about 7% or less, about 6% or less, about 5% or less, about 4% or less, or about 3% or less. The amount of syringol can be bounded by any two of the foregoing endpoints, or can be an open-ended range. For example, the amount of syringol can be about 8% or more, about 7% to about 10%, or about 21% or less.

When the lignins of the invention are subjected to the pyrolysis GC/MS analysis disclosed herein, 4-methylsyringol can form and be detected (having a retention time under the disclosed conditions of about 23.5 min to about 24.5 min). The amount of 4-methylsyringol can be at least about 4%, and the maximum amount is not particularly limited. The amount of 4-methylsyringol can be less than about 15%, and the minimum amount is not particularly limited. For example, the amount of 4-methylsyringol can be about 4% or more, e.g., about 5% or more, about 6% or more, about 7% or more, about 8% or more, about 9% or more, about 10% or more, about 11% or more, about 12% or more, about 13% or more, or about 14% or more. Alternatively, or in addition, the amount of 4-methylsyringol can be about 15% or less, e.g., about 14% or less, about 13% or less, about 12% or less, about 11% or less, about 10% or less, about 9% or less, about 8% or less, about 7% or less, about 6% or less, or about 5% or less. The amount of 4-methylsyringol can be bounded by any two of the foregoing endpoints, or can be an open-ended range. For example, the amount of 4-methylsyringol can be about 11% or less, about 9% to about 12%, or about 14% or less.

When the lignins of the invention are subjected to the pyrolysis GC/MS analysis disclosed herein, 4-vinylsyringol can form and be detected (having a retention time under the disclosed conditions of about 27 min to about 28 min). The amount of 4-vinylsyringol can be at least about 0.5%, and the maximum amount is not particularly limited. The amount of 4-vinylsyringol can be less than about 16%, and the minimum amount is not particularly limited. For example, the amount of 4-vinylsyringol can at least about 0.5%, e.g., at least about 1%, at least about 1.5%, at least about 2%, at least about 3%, at least about 4%, at least about 5%, at least about 6%, at least about 7%, at least about 7.5%, at least about 8%, at least about 8.5%, at least about 9%, at least about 10%, at least about 11%, at least about 12%, at least about 13%, at least about 14%, or at least about 15%. Alternatively, or in addition, the amount of 4-vinylsyringol can be less than about 16%, e.g., less than about 15%, less than about 14%, less than about 13%, less than about 12%, less than about 11%, less than about 10%, less than about 9%, less than about 8.5%, less than about 8%, less than about 7.5%, less than about 7%, less than about 6%, less than about 5%, less than about 4%, less than about 3%, less than about 2%, less than about 1.5%, or less than about 1%. The amount of 4-vinylsyringol can be bounded by any two of the foregoing endpoints, or can be an open-ended range. For example, the amount of 4-vinylsyringol can be about 3% or more, about 4% to about 7%, or about 14% or less.

When the lignins of the invention are subjected to the pyrolysis GC/MS analysis disclosed herein, 4-allylsyringol can form and be detected (having a retention time under the disclosed conditions of about 27.5 min to about 28.5 min). The amount of 4-allylsyringol can be at least about 0.5%, and the maximum amount is not particularly limited. The amount of 4-allylsyringol can be less than about 8%, and the minimum amount is not particularly limited. For example, the amount of 4-allylsyringol can at least about 0.5%, e.g., at least about 1%, at least about 1.5%, at least about 2%, at least about 2.5%, at least about 3%, at least about 3.5%, at least about 4%, at least about 4.5%, at least about 5%, at least about 5.5%, at least about 6%, at least about 6.5%, at least about 7%, or at least about 7.5%. Alternatively, or in addition, the amount of 4-allylsyringol can be less than about 8%, e.g., less than about 7.5%, less than about 7%, less than about 6.5%, less than about 6%, less than about 5.5%, less than about 5%, less than about 4.5%, less than about 4%, less than about 3.5%, less than about 3%, less than about 2.5%, less than about 2%, less than about 1.5%, or less than about 1%. The amount of 4-allylsyringol can be bounded by any two of the foregoing ranges, or can be an open-ended range. For example, the amount of 4-allylsyringol can be about 2.5% or more, about 2% to about 4%, or about 7% or less.

When the lignins of the invention are subjected to the pyrolysis GC/MS analysis disclosed herein, cis-propenylsyringol can form and be detected (having a retention time under the disclosed conditions of about 29 min to about 30 min). The amount of cis-propenylsyringol can be at least about 0.25%, and the maximum amount is not particularly limited. The amount of cis-propenylsyringol can be less than about 3%, and the minimum amount is not particularly limited. For example, the amount of cis-propenylsyringol can be at least about 0.25%, e.g., at least about 0.5%, at least about 0.75%, at least about 1%, at least about 1.25%, at least about 1.5%, at least about 1.75%, at least about 2%, at least about 2.25%, at least about 2.5%, or at least about 2.75%. Alternatively, or in addition, the amount of cis-propenylsyringol can be less than about 3%, e.g., less than about 2.75%, less than about 2.5%, less than about 2.25%, less than about 2%, less than about 1.75%, less than about 1.5%, less than about 1.25%, less than about 1%, less than about 0.75%, or less than about 0.5%. The amount of cis-propenylsyringol can be bounded by any two of the foregoing endpoints, or can be an open-ended range. For example, the amount of cis-propenylsyringol can be about 1% or more, about 0.75% to about 1.75%, or about 1.5% or less.

When the lignins of the invention are subjected to the pyrolysis GC/MS analysis disclosed herein, trans-propenylsyringol can form and be detected (having a retention time under the disclosed conditions of about 31 min to about 32 min). The amount of trans-propenylsyringol can be at least about 3%, and the maximum amount is not particularly limited. The amount of trans-propenylsyringol can be less than about 12%, and the minimum amount is not particularly limited. For example, the amount of trans-propenylsyringol can be at least about 3%, e.g., at least about 4%, at least about 5%, at least about 6%, at least about 7%, at least about 8%, at least about 9%, at least about 10%, or at least about 11%. Alternatively, or in addition, the amount of trans-propenylsyringol can be less than about 12%, e.g., less than about 11%, less than about 10%, less than about 9%, less than about 8%, less than about 7%, less than about 6%, less than about 5%, or less than about 4%. The amount of trans-propenylsyringol can be bounded by any two of the foregoing endpoints, or can be an open-ended range. For example, the amount of trans-propenylsyringol can be at least about 5%, about 4% to about 11%, or less than about 9%.

When the lignins of the invention are subjected to the pyrolysis GC/MS analysis disclosed herein, syringyl vinyl ketone can form and be detected (having a retention time under the disclosed conditions of about 35.9 min to about 36.3 min). The amount of syringyl vinyl ketone can be at least about 0.25%, and the maximum amount is not particularly limited. The amount of syringyl vinyl ketone can be less than about 5%, and the minimum amount is not particularly limited. For example, the amount of syringyl vinyl ketone can be at least about 0.25%, e.g., at least about 0.5%, at least about 0.75%, at least about 1%, at least about 1.25%, at least about 1.5%, at least about 1.75%, at least about 2%, at least about 2.25%, at least about 2.5%, at least about 2.75%, at least about 3%, at least about 3.5%, at least about 4%, or at least about 4.5%. Alternatively, or in addition, the amount of syringyl vinyl ketone can be less than about 5%, e.g., less than about 4.5%, less than about 4%, less than about 3.5%, less than about 3%, less than about 2.75%, less than about 2.5%, less than about 2.25%, less than about 2%, less than about 1.75%, less than about 1.5%, less than about 1.25%, less than about 1%, less than about 0.75%, or less than about 0.5%. The amount of syringyl vinyl ketone can be bounded by any two of the foregoing endpoints, or can be an open-ended range. For example, the amount of syringyl vinyl ketone can be about 0.5% or more, about 0.75% to about 2%, or about 1.5% or less.

When the lignins of the invention are subjected to the pyrolysis GC/MS analysis disclosed herein, dihydrosinapyl alcohol can form and be detected (having a retention time under the disclosed conditions of about 37.5 min to about 38.5 min). The amount of dihydrosinapyl alcohol can be at least about 0.1%, and the maximum amount is not particularly limited. The amount of dihydrosinapyl alcohol can be less than about 2%, and the minimum amount is not particularly limited. For example, the amount of dihydrosinapyl alcohol can be at least about 0.1%, e.g., at least about 0.2%, at least about 0.3%, at least about 0.4%, at least about 0.5%, at least about 0.6%, at least about 0.7%, at least about 0.8%, at least about 0.9%, at least about 1%, at least about 1.2%, at least about 1.4%, at least about 1.6%, or at least about 1.8%. Alternatively, or in addition, the amount of dihydrosinapyl alcohol can be less than about 2%, e.g., less than about 1.8%, less than about 1.6%, less than about 1.4%, less than about 1.2%, less than about 1%, less than about 0.9%, less than about 0.8%, less than about 0.7%, less than about 0.6%, less than about 0.5%, less than about 0.4%, less than about 0.3%, or less than about 0.2%. The amount of dihydrosinapyl alcohol can be bounded by any two of the foregoing endpoints, or can be an open-ended range. For example, the amount of dihydrosinapyl alcohol can be about 0.2% or more, about 1% to about 2%, or about 0.7% or less.

When the lignins of the invention are subjected to the pyrolysis GC/MS analysis disclosed herein, sinapaldehyde can form and be detected (having a retention time under the disclosed conditions of about 41.1 min to about 42.1 min). The amount of sinapaldehyde can be at least about 0.25%, and the maximum amount is not particularly limited. The amount of sinapaldehyde can be less than about 5%, and the minimum amount is not particularly limited. For example, the amount of sinapaldehyde can be at least about 0.25%, e.g., at least about 0.5%, at least about 0.75%, at least about 1%, at least about 1.25%, at least about 1.5%, at least about 1.75%, at least about 2%, at least about 2.25%, at least about 2.5%, at least about 2.75%, at least about 3%, at least about 3.5%, at least about 4%, or at least about 4.5%. Alternatively, or in addition, the amount of sinapaldehyde can be less than about 5%, e.g., less than about 4.5%, less than about 4%, less than about 3.5%, less than about 3%, less than about 2.75%, less than about 2.5%, less than about 2.25%, less than about 2%, less than about 1.75%, less than about 1.5%, less than about 1.25%, less than about 1%, less than about 0.75%, or less than about 0.5%. The amount of syringyl vinyl ketone can be bounded by any two of the foregoing endpoints, or can be an open-ended range. For example, the amount of sinapaldehyde can be about 1% or more, about 1.25% to about 2.25%, or about 1.75% or less.

When the lignins of the invention are subjected to the pyrolysis GC/MS analysis disclosed herein, an unidentified compound in the GC chromatogram having main ions in the mass spectrum at m/z values of 107, 77, and 152 ("107+77+152") can form and be detected (this unidentified compound has a retention time under the disclosed conditions of about 16 min to about 17 min). The amount of unidentified compound 107+77+152 can be at least about 0.01%, and the maximum amount is not particularly limited. The amount of unidentified compound 107+77+152 can be less than about 5%, and the minimum amount is not particularly limited. For example, the amount of unidentified compound 107+77+152 can be at least about 0.01%, e.g., at least about 0.02%, at least about 0.03%, at least about 0.04%, at least about 0.05%, at least about 0.06%, at least about 0.07%, at least about 0.08%, at least about 0.09%, at least about 0.1%, at least about 0.11%, at least about 0.12%, at least about 0.13%, at least about 0.14%, at least about 0.15%, at least about 0.16%, at least about 0.17%, at least about 0.18%, at least about 0.19%, at least about 0.2%, at least about 0.4%, at least about 0.6%, at least about 0.8%, at least about 1%, at least about 1.2%, at least about 1.4%, at least about 1.6%, at least about 1.8%, or at least about 2%. Alternatively, or in addition, the amount of unidentified compound 107+77+152 can be less than about 2%, e.g., less than about 1.8%, less than about 1.6%, less than about 1.4%, less than about 1.2%, less than about 1%, less than about 0.8%, less than about 0.6%, less than about 0.4%, less than about 0.2%, less than about 0.19%, less than about 0.18%, less than about 0.17%, less than about 0.16%, less than about 0.15%, less than about 0.14%, less than about 0.13%, less than about 0.12%, less than about 0.11%, less than about 0.1%, less than about 0.09%, less than about 0.08%, less than about 0.07%, less than about 0.06%, less than about 0.05%, less than about 0.04%, less than about 0.03%, or less than about 0.02%. The amount of unidentified compound 107+77+152 can be bounded by any two of the foregoing endpoints, or can be an open-ended range. For example, the amount of unidentified compound 107+77+152 can be at least about 0.02%, about 0.05% to about 0.12%, or about 0.2% or less.

The lignins and lignin compositions of the invention can be used in a variety of applications, including, but not limited to, as a fuel, tackifier, phenol formaldehyde resin extender in the manufacture of particle board and plywood, in the manufacture of molding compounds, urethane and epoxy resins, antioxidants, controlled-release agents, flow control agents, cement/concrete mixing, plasterboard production, oil drilling, general dispersion, tanning leather, road covering, vanillin production, dimethyl sulfide and dimethyl sulfoxide production, phenol substitute in phenolic resins, incorporation into polyolefin blends, aromatic (phenol) monomers, additional miscellaneous monomers, carbon fibers, metal sequestration in solutions, basis of gel formation, polyurethane copolymer, or combinations thereof.

The invention is further illustrated by the following examples, in which all parts and percentages are by weight, unless otherwise stated. It should be understood that these examples, while indicating preferred embodiments of the invention, are given by way of illustration only and are not to be construed as limiting in any manner. From the above discussion and these examples, one skilled in the art can ascertain the essential characteristics of this invention, and without departing from the spirit and scope thereof, can make various changes and modifications of the invention to adapt it to various usages and conditions.

EXAMPLES

NMR spectra were acquired at 25° C. in DMSO-$d_6$. Quantitative $^{13}C$ NMR spectra were acquired on a Bruker AVANCE 500 MHz spectrometer equipped with a 5 mm QNP probe using an inverse gated proton decoupling sequence (Capanema et al. (2004), and Capanema and Jameel et al. (2005)). Sample concentration was about 25%. Chromium (III) acetylacetonate (0.016 M) was added to the NMR tube prior to quantitative $^{13}C$ NMR acquisition to provide complete relaxation of all nuclei. The acquisition parameters included a 90° pulse width, a relaxation delay of 1.7 s, and an acquisition time of 1.2 s. A total of 20,000 scans were collected. The spectra were processed and the data were calculated according to Capanema et al. (2004), and Capanema and Jameel et al. (2005).

The 2D HSQC NMR spectra were acquired at a sample concentration of about 10% on a Bruker AVANCE III 950 MHz spectrometer equipped with a cryo-platform and a Bruker 5 mm ID CPTCI ($^1H/^{13}C/^{15}N/D$) cryo-probe with Z-Axis Gradient spectrometer. The acquisition parameters were as follows: 24 transient (scans per block) were acquired using 2K data points in F2 ($^1H$) dimension for an acquisition time of 72 ms and 512 data points in F1 ($^{13}C$) dimension for an acquisition time of 5.36 ms and for a total experiment time of 4 h 20 minutes. The 2D data set was processed with 2K×2K data points using Qsine function in both dimensions.

Pyrolysis gas chromatography mass spectrometry (Py-GC/MS) measurements were performed according to Ohraaho et al. (2013), which uses a filament pulse pyrolyzer (Pyrola2000, PyrolAB, Sweden) connected to a GC/MS instrument (Varian 3800 GC/2000 MS). About 100 μg of the sample was weighed accurately on an automatic ultra-micro balance (CHAN 29 Instruments Inc. Cerritos, USA) and placed directly on the filament, which contained a small cavity. Pyrolysis chamber was maintained at about 175° C. and purged with Helium 22.7 ml/min in order to lead the pyrolysis products into the gas chromatography injector, which contained a split liner (Restek, 3.4 mm×5.0×54). A split injector maintained at about 280° C. using a split ratio of 1:18 was used. Temperature rise time to a final pyrolysis temperature about 580° C. was set to 8 ms and total pyrolysis time was 2 s. Pyrolysis products were separated using a capillary column (J&W, DB-1701, 30 m×0.25 mm, film 1 μm), using the following temperature program: initial temperature 100° C. (1 min), rate of increase 4° C./min to 265° C., and held at temperature for 7.75 min. Helium was used as a carrier gas, using a constant flow rate of about 1 ml/l. Ion trap mass spectrometer was used for the compound detection with the mass scan range of m/z 46-399 (EI 70 eV). The ion trap and transfer line temperature was set to about 180° C. and about 250° C., respectively. The GC chromatogram was integrated within the retention time zone of about 1 min to about 48 min to obtain a total area of integrated peaks. Specific peaks of interest within this retention time in the GC chromatogram were then individually integrated and the data expressed as a percentage of the total integrated area from about 1 min to about 48 min in the GC chromatogram. In other words, the data was normalized to the total integrated peak area, with the total integrated peak area representing 100%. Two parallel measurements were performed for each sample (i.e., run in duplicate). The pyrolysis products formed were identified using data from the literature and commercial NIST05 library. Peaks in a GC chromatogram that were not identified by mass spectrometry are reported herein as m/z values for the main ions. For example, an unidentified compound labeled as "166+135" means that the corresponding peak in the GC chromatogram has two main ion peaks, one at an m/z of 166 and one at an m/z of 135.

The compositional analysis for sugars (e.g., xylose, glucose, etc.) and lignin was performed according to NREL/TP-510-42618, herein incorporated by reference in its entirety.

Glass transition temperature (Tg) measurements were performed using differential scanning calorimetry (DSC) as follows. Lignin samples (about 5 mg) were weighed in duplicate into pre-weighted pans with lids and placed in the vacuum oven at 40° C. overnight. On removing the pans from the oven they are immediately hermetically sealed with a sample press and left to cool. The weight of the pan containing lignin is recorded and the pan tare weight subtracted from this to provide the weight of dry lignin in the sealed pan. Pans are loaded and run on a program consisting of the following steps: (1) Ramp at 5° C./min to 105° C.; (2) Isothermal at 105° C. for 40 min; (3) Ramp at 50° C./min to 200° C.; (4) Ramp 10° C./min to 250° C.

Molecular weights (Mw, Mn, Mz) and polydispersity index (PDI) were determined by size exclusion chromatography (SEC) following a general procedure found in Baumberger et al. (2007). More specifically, the SEC analysis was performed on an Agilent 1260 ultra HPLC, equipped with Agilent refractive index (RI) and ultraviolet (UV) detectors, with UV set to 280 nm. The column set employed three sulfonated polystyrene-divinylbenzene PSS MCX columns (a pre-column, a 1000 Å column, and a 100 000 Å column), all available from Polymer Standards Service. The mobile phase was an aqueous alkaline solution (0.1 M NaOH), and the flow rate was about 0.4-1 mL/min. The method employed six different polystyrene standards ranging from 891 g/mol to 65,400 g/mol. Each injection was performed at a concentration of about 1 mg/mL.

Example 1

This example demonstrates techniques used to extract lignins of the invention.

Biomass comprising hardwood was mixed with water to form a slurry. The slurry was reacted at a temperature of about 170-245° C. and a pressure of about 35-62 bar for a period of about 1-120 minutes. The reaction mixture was cooled to less than 100° C. and depressurized to less than 10 bar. The cooled and depressurized reaction mixture was then filtered using a filter press. The solids were collected and re-slurried with water. A portion of the slurry was then further processed according to one set of conditions ("Run 1"), and another portion of the slurry was then further processed according to a different set of conditions ("Run 2").

In Run 1, the slurry was pumped at a rate of about 230 kg/h to about 270 kg/h at ambient conditions, while subcritical, near-critical, or supercritical water having a temperature of about 360° C. to about 600° C. and a pressure of about 200 bar to about 600 bar was contacted with the slurry at a rate of about 535 kg/h to about 570 kg/h.

In Run 2, the slurry was pumped at a rate of about 160 kg/h to about 200 kg/h at ambient conditions, while subcritical, near-critical, or supercritical water having a temperature of about 360° C. to about 600° C. and a pressure of about 200 bar to about 600 bar was contacted with the slurry at a rate of about 485 kg/h to about 505 kg/h.

In both of Runs 1 and 2, the resulting reaction mixture was cooled to ambient conditions, and the mixture subjected to a filter press, and the solids then air dried and ground (size reduction). The composition of the solids from Runs 1 and 2 is reported in Table 1.

TABLE 1

Composition Analysis of solids from Runs 1 and 2

| | Xylose (%) | Glucose (%) | Lignin (%) |
|---|---|---|---|
| Run 1 | 0.8 | 48.1 | 48.3 |
| Run 2 | 0.64 | 40.8 | 53.9 |

The dried and ground solids from Runs 1 and 2 was then extracted with each of four different extraction solvents:
1. Aqueous sodium hydroxide solution (1% NaOH by weight)
2. Dioxane/water solution (96% dioxane by volume)
3. Dioxane/water solution (90% dioxane by volume)
4. Acetone/water solution (90% acetone by volume).

Extraction of the solids from Runs 1 and 2 was performed as follows: For alkaline solution 1, the solids were constantly stirred for 3 hours, and for aqueous organic solutions 2-4, the solids were exhaustively extracted. All extractions were performed at ambient conditions (about 20° C. at about 1 atm), and the ratio of solids to solvent was kept constant at about 1 to 10. After extraction, the resulting mixtures were separated by centrifugation. The alkaline solution 1 was acidified to a pH of about 2 to precipitate lignin, and the precipitated lignin was washed to remove acid and dried at about 45° C. to constant weight under vacuum. The lignins extracted by aqueous organic solvents 2-4 were recovered by evaporating the solvent to dryness at about 40° C. under vacuum.

Experiments showed that samples extracted with dioxane/water (90%) typically have higher extraction yields than dioxane:water (96%), and therefore the dioxane/water (90%) solvent was used to obtain the results listed in Table 2. The composition of the solids from Runs 1 and 2 after extraction are reported in Table 2.

TABLE 2

Composition analysis of extracted lignins and the corresponding residues after lignin extraction.

|  | Xylan (%) | Glucan (%) | Lignin (%) |
| --- | --- | --- | --- |
| DL-Run 1 | 0.61 | 0.85 | 87.76 |
| DL-Run 2 | 0.59 | 1.14 | 86.63 |
| NaL-Run 1 | 0.29 | 0.41 | 90.92 |
| NaL-Run 2 | 0.21 | 0.82 | 91.29 |
| RDL-Run 1 | 0.88 | 76.4 | 17.2 |
| RDL-Run 2 | 0.74 | 76.3 | 16.2 |
| RnaL-Run 1 | 0.65 | 73.5 | 16.4 |
| RnaL-Run 2 | 0.55 | 72.8 | 16.7 |

DL—dioxane lignin; NaL—Alkali lignin; RDL—residue after dioxane extraction, RnaL—residue after alkali extraction It is significant to note that the sum of the identified components presented in Tables 1 and 2 does not total 100%. However, this phenomenon is typical for many lignin preparations (even for native ones) but typically is not addressed in the scientific literature. One possible explanation can be the amount of Klason lignin is somehow underestimated, because the nuclear magnetic resonance (NMR) spectra (FIGS. 4 and 5, see Example 2) of these lignins do not show any impurities except for sugars, in the amounts very similar to the wet chemistry data. Therefore, we suggest evaluating the purity of lignin, at least for hardwood species, according to Equation 1:

Lignin purity=100−ash−carbohydrate     (Equation 1)

Table 3 illustrates the lignin extraction yields of Runs 1 and 2. The extraction yield is defined as:

$$\text{Extraction Yield} = 100 \times \frac{\text{Weight Isolated from Sample}}{\text{Total Sample Weight}}$$

Also shown in Table 3 is the extraction yield of lignin based on the amount of lignin contained in the sample (this is shown as "per lignin in SHR"):

$$\text{per ligin in } SHR = 100 \times \frac{\text{Weight of true lignin isolated from sample}}{\text{Weight of Lignin contained in sample}}$$

TABLE 3

Extraction yields based on original starting material and lignin content

|  | Run 1 | | | Run 2 | | |
| --- | --- | --- | --- | --- | --- | --- |
| Extraction yield | (90%) Dioxane (%) | (90%) Acetone (%) | (1%) NaOH (%) | (90%) Dioxane (%) | (90%) Acetone (%) | (1%) NaOH (%) |
| per SHR average | 40.6 | 22.1 | 39.1 | 49.3 | 31.1 | 45.4 |
| per lignin in SHR* | 81.8 | 44.5 | 78.9 | 89.6 | 56.5 | 82.5 |
| Lignin in extracted residue (% SHR) | 21.0 | 51.5 | 20.5 | 15.2 | 43.5 | 16.9 |
| Total closure for lignin | 102.8 | 96 | 99.4 | 104.8 | 100.0 | 99.4 |
| Total closure for solids | 100.0 | 99.8 | 97.5 | 100.0 | 99.3 | N/A |

*corrected for lignin purity by Equation 1

The material balance results show a very good closure for solids in the cases of organic solvent extraction. The closure is slightly lower for the NaOH extractions because part of the extracted material likely is not precipitated by acidification. However, this amount is not high. Furthermore, the material balance for lignin is also rather good when lignin purity is estimated by Equation 1 (the material balance was lower when Klason lignin values were used for the extracted lignin purity). In addition, this indicates that the organic material extracted by the NaOH solution, but not-precipitated by acid, is predominantly of sugar origin (e.g., unwashed monomeric and/or oligomeric sugars).

Example 2

This example demonstrates nuclear magnetic resonance spectroscopy of lignins of the invention. This example also compares the lignins of the invention with conventional lignins.

Figure 5:
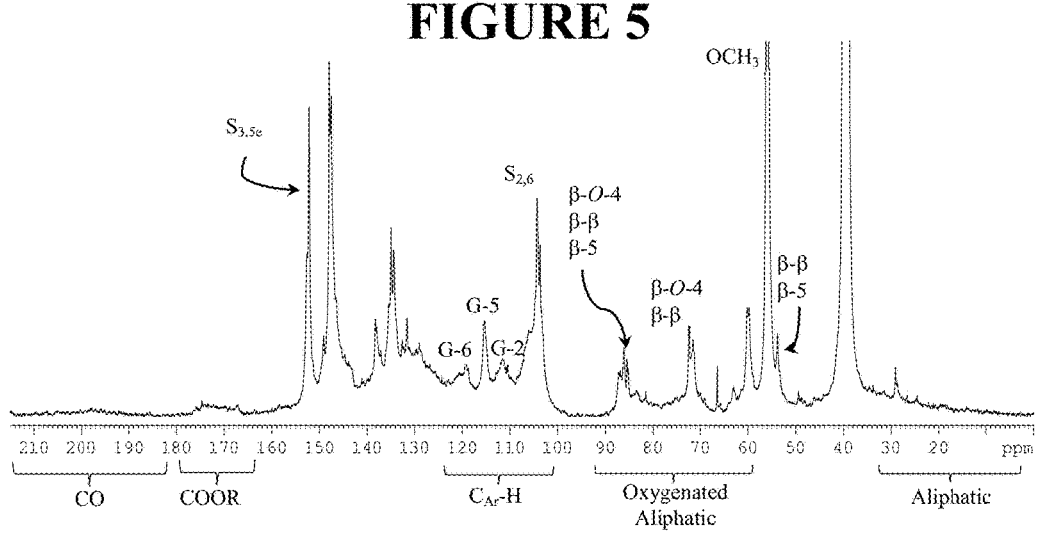
FIG. 5 illustrates a quantitative $^{13}C$ NMR spectrum of lignin of the invention extracted with an alkaline solution.

The dioxane extracted lignin prepared in Example 1 was analyzed with 2D $^1$H—$^{13}$C HSQC NMR (FIG. 4), and NaOH extracted lignin from Run 2 in Example 1 was measured with quantitative $^{13}$C NMR techniques (FIG. 5). Two dimensional NMR (e.g., HSQC) is a very powerful tool to identify various lignin moieties in a complex lignin sample as it provides good signal dispersion and allows more reliable assignments of the detected signals than other NMR techniques. However, a routine HSQC method is not typically quantitative, and therefore was complimented by a quantitative $^{13}$C NMR analysis for comprehensive lignin characterization.

The HSQC spectrum of the dioxane and NaOH extracted lignin showed the presence of significant amounts of native lignin subunits (FIGS. 4 and 5). In accordance with sugar analysis by the wet chemistry method (see, e.g., Table 2), the amount of sugars in the extracted lignin was very low. Noteworthy, the amount of terminal reducing sugar moieties was comparable to the amount of internal sugar units. The sugar fragments were likely attached to lignin via benzyl ether linkages.

Importantly, only small amounts of coniferyl alcohol type structures and low amounts or no vinyl ether structures (structure 29, FIG. 1) were detected. These moieties were speculated to be products of lignin degradation under supercritical water hydrolysis based on experiments using model compounds (Ehara et al. (2002)). The low amount of coniferyl alcohol structures and low amount or the absence of vinyl ether structures implies that these moieties, if formed, may be unstable under the reaction conditions employed and likely undergo further conversion.

Signals of newly formed lignin moieties were detected in the 2D spectrum, and the signals were assigned according to the best information currently known. Some signals were assigned as condensed alkyl-aryl structures and stilbene moieties. In addition, there were significant amounts of newly formed lignin structures of oxygenated aliphatic, olefinic and aromatic types. The signals may originate from the obtained lignin, though it is conceivable that some of these signals may originate from impurities or other components of the original biomass feedstock (e.g., bark or other wood wastes). A comparison of the HSQC spectrum of the extracted lignin (FIG. 5) with the spectra of other technical lignins (Capanema et al. (2001)) show noticeable differences, although not all signals can be definitively assigned in all cases.

Table 4 reports the major functionalities of the lignins of the invention in comparison with other typical hardwood technical lignins (kraft and organosolv) and a birch milled wood lignin (MWL). The birch MWL can be used as a model of a native hardwood lignin.

hardwood species can be observed. Therefore, the structure of technical lignins is typically dependent not only on the process type, but also on the feedstock origin.

The lignins of the invention were significantly less degraded than other technical lignins, (even *E. globulus* kraft lignin, which is the least degraded reference technical lignin). This lower level of degradation, along with qualitative differences between the inventive lignin and conventional technical lignins based on 2D NMR data, indicate that the inventive lignins are a special and unique type of technical lignins. Lower degree of lignin degradation, and therefore lower lignin heterogeneity, typically suggests relatively high lignin reactivity. The differences between the lignins extracted from the solids of Runs 1 and 2 of Example 1 (similar but different treatment conditions) are very subtle. Dioxane-extracted lignins are quite similar to the NaOH-extracted lignins, but the lignins extracted with 90% acetone represent a more degraded lignin fraction than the NaOH- and dioxane-extracted lignins.

TABLE 4

Structural properties of lignin. Data expressed per 100 aromatic units (can be considered as mol %).

| | Inventive Lignins* | | Reference Lignins | | | |
|---|---|---|---|---|---|---|
| Moieties | Run 1 (units per 100Ar) | Run 2 (units per 100Ar) | [1]Birch Kraft | [1]*E. glob.* kraft | [2]Mix HW Alcell | [2]Birch MWL lignin |
| Total CO | 14 | 17 | 9 | 14 | 35 | 12 |
| Non-conjugated CO | 5 | 6 | 4 | 5 | 16 | 3 |
| Conjugated CO | 9 | 11 | 5 | 9 | 19 | 9 |
| Total COOR | 18 | 19 | 20 | 18 | 19 | 4 |
| Aliph COOR | 14 | 15 | 18 | 16 | 15 | 3 |
| Conjugated COOR | 4 | 4 | 2 | 2 | 4 | 1 |
| Total OH | 121 | 120 | 107 | 128 | 104 | 150 |
| Aliphatic OH | 60 | 58 | 27 | 51 | 32 | 129 |
| Primary OH | 34 | 29 | 23 | 29 | 18 | 73 |
| Secondary OH | 26 | 29 | 3 | 22 | 14 | 56 |
| Phenolic OH | 61 | 62 | 80 | 77 | 72 | 20 |
| S/G ratio | 1.13 | 1.29 | 1.7 | 2.5 | 1.3 | 3.02 |
| ArH | 207 | 203 | 172 | 191 | 209 | 209 |
| Degree of condensation** | 40 | 41 | 65 | 37 | 33 | 16 |
| β-O-4 | 20 | 18 | 2 | 12 | 8 | 66 |
| β-β | 4 | 4 | 3 | 2 | 3 | 11 |
| β-5 | 2 | 2 | 2 | 1 | 3 | 2 |
| OCH$_3$ | 121 | 117 | 141 | 141 | 117 | 177 |
| Oxyg. aliphatic | 117 | 113 | 86 | 110 | 94 | 260 |
| Saturated aliphatic | 54 | 51 | NR | NR | 96 | 15 |
| Sugars (approximate) | 1 | 1 | 4 | 1 | <1 | NR |

*The inventive lignins were obtained according to the sodium hydroxide solution extraction of Example 1
**Substitution at 2, 5 and 6 position of the G-aromatic ring and 2,6 position of S-ring (FIG. 1)
[1]published data from Capanema and Jameel et al. (2005), and Berlin and Balakshin (2014)
[2]published data from Berlin and Balakshin (2014)
NR: not reported As depicted in Table 4, many technical processes significantly degrade and modify the structure of the native lignins, as illustrated by (1) a decrease in the amounts of aliphatic OH group (especially secondary ones), β-O-4 and β-β linkages, and oxygenated aliphatic moieties in general (and a decrease in molecular weight), and (2) an increase in the amounts of phenolic OH, COOR and CO functional groups, saturated aliphatic moieties, and the degree of condensation (typically due to formation and accumulation of C—C linkages in the aromatic ring). In addition, significant structural variations within kraft lignins obtained from different Example 3

This example demonstrates lignin extraction yields using various extraction solvents. The extraction procedure is similar to that as described in Example 1.

Figure 6:
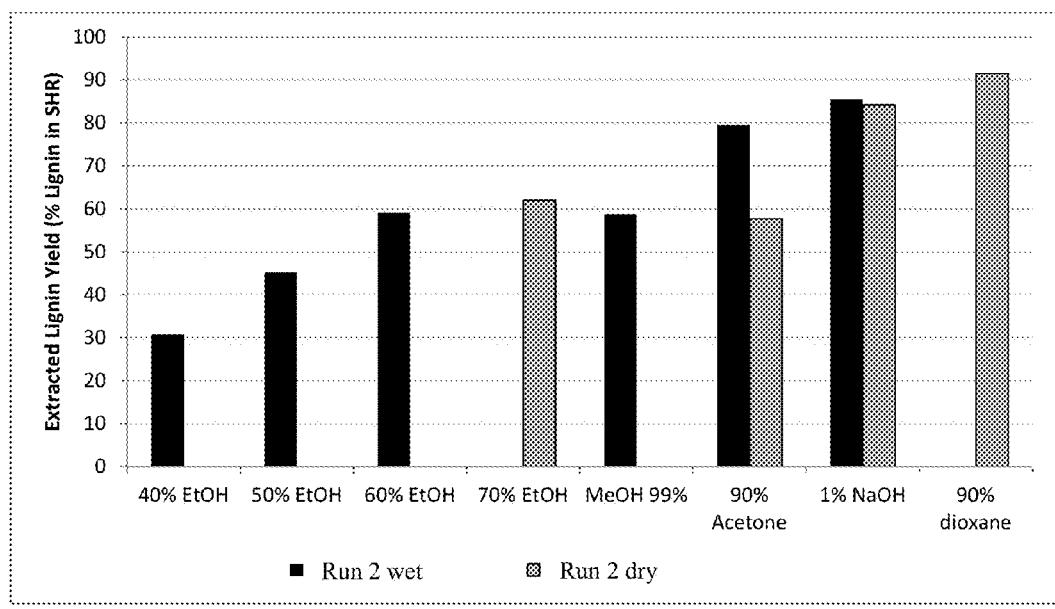
FIG. 6 illustrates lignin extraction yields using various extraction solvents.
Figure 7:
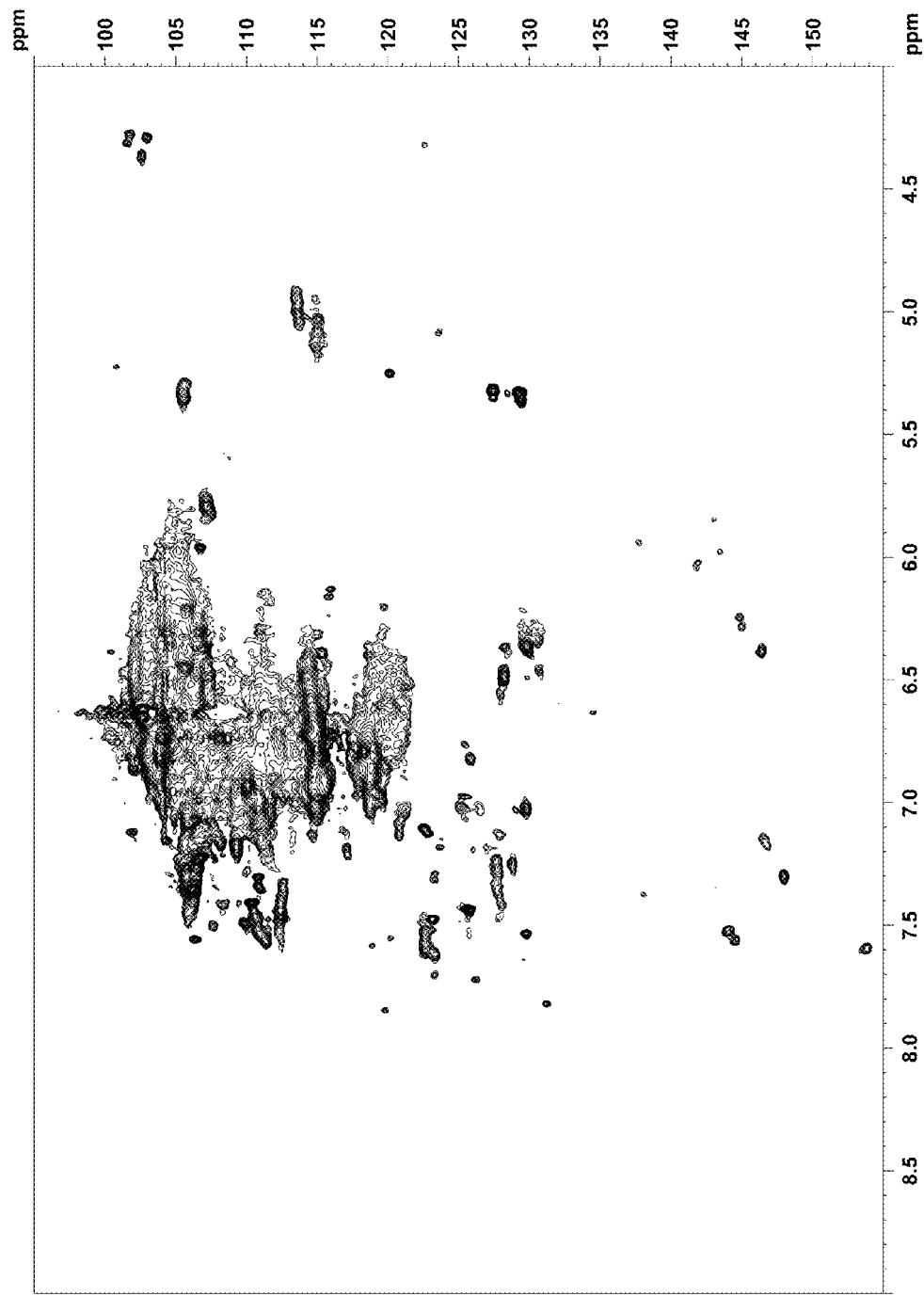
FIG. 7 illustrates the aromatic and olephinic region of a 2D $^1H-^{13}C$ HSQC NMR spectrum for a lignin of the invention, as described in Example 7.
Figure 8:
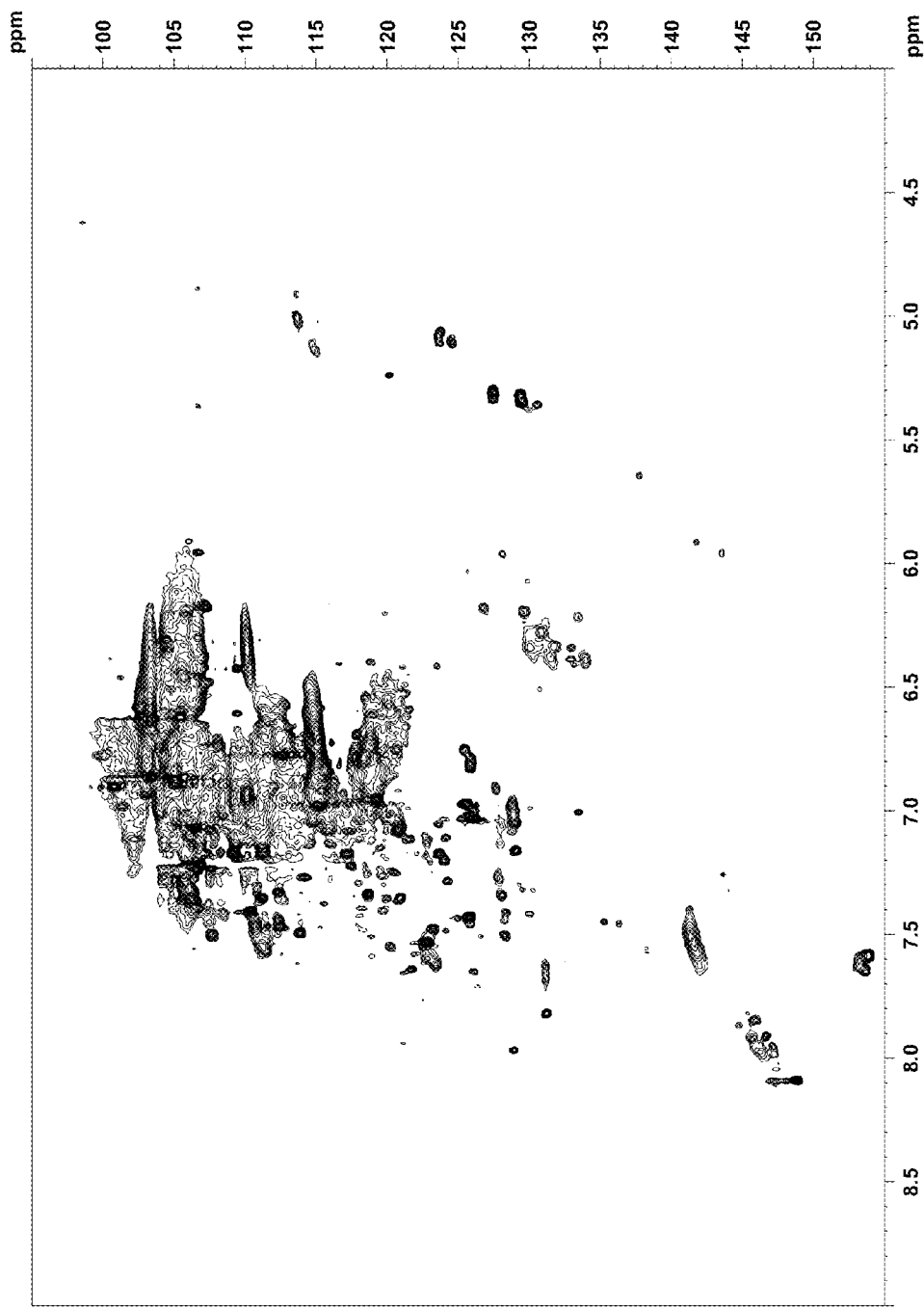
FIG. 8 illustrates the aromatic and olephinic region of a 2D $^1H-^{13}C$ HSQC NMR spectrum for a comparative lignin, as described in Example 7.
Figure 9:
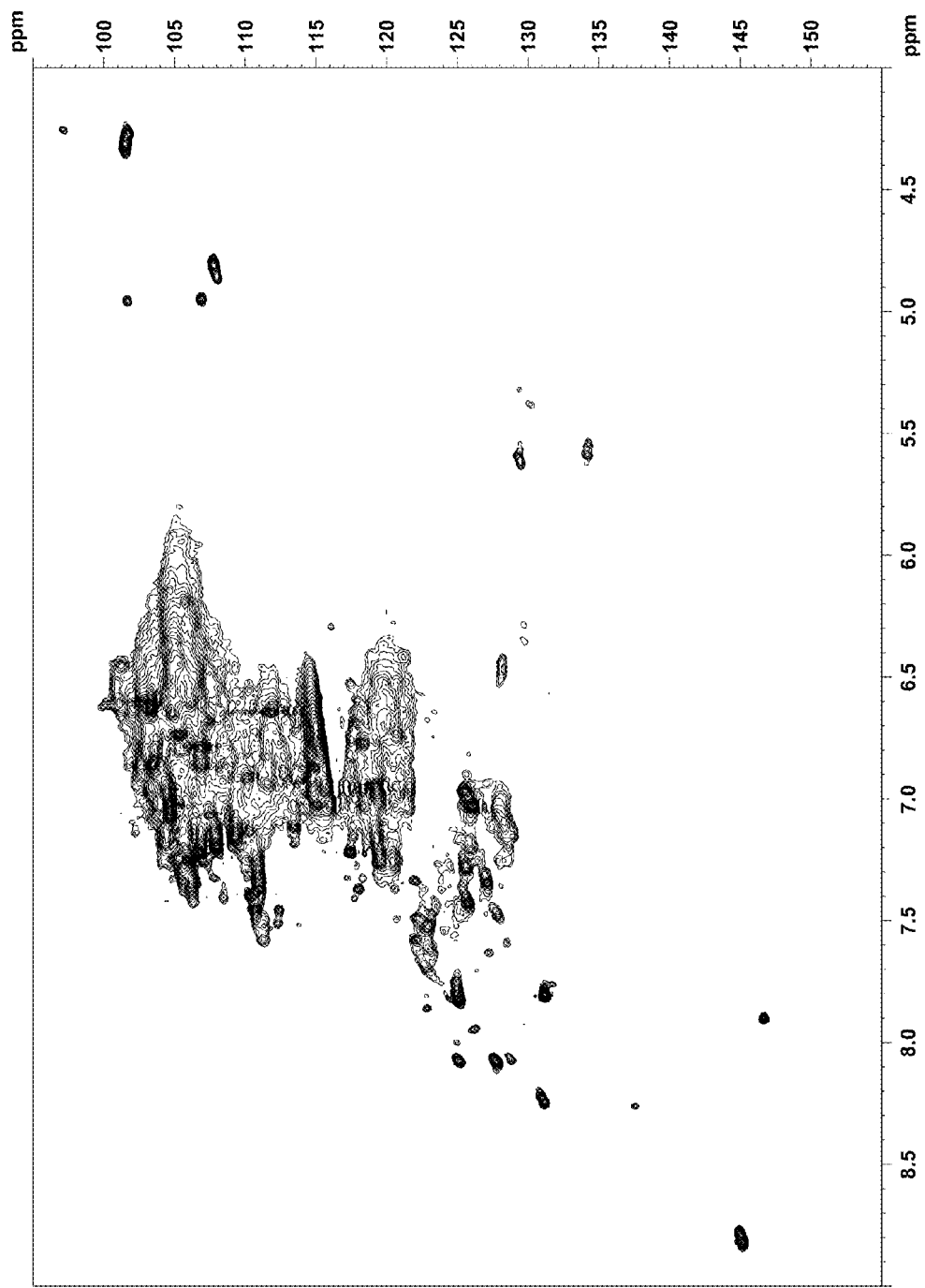
FIG. 9 illustrates the aromatic and olephinic region of a 2D $^1H-^{13}C$ HSQC NMR spectrum for a comparative lignin, as described in Example 7.
Figure 10:
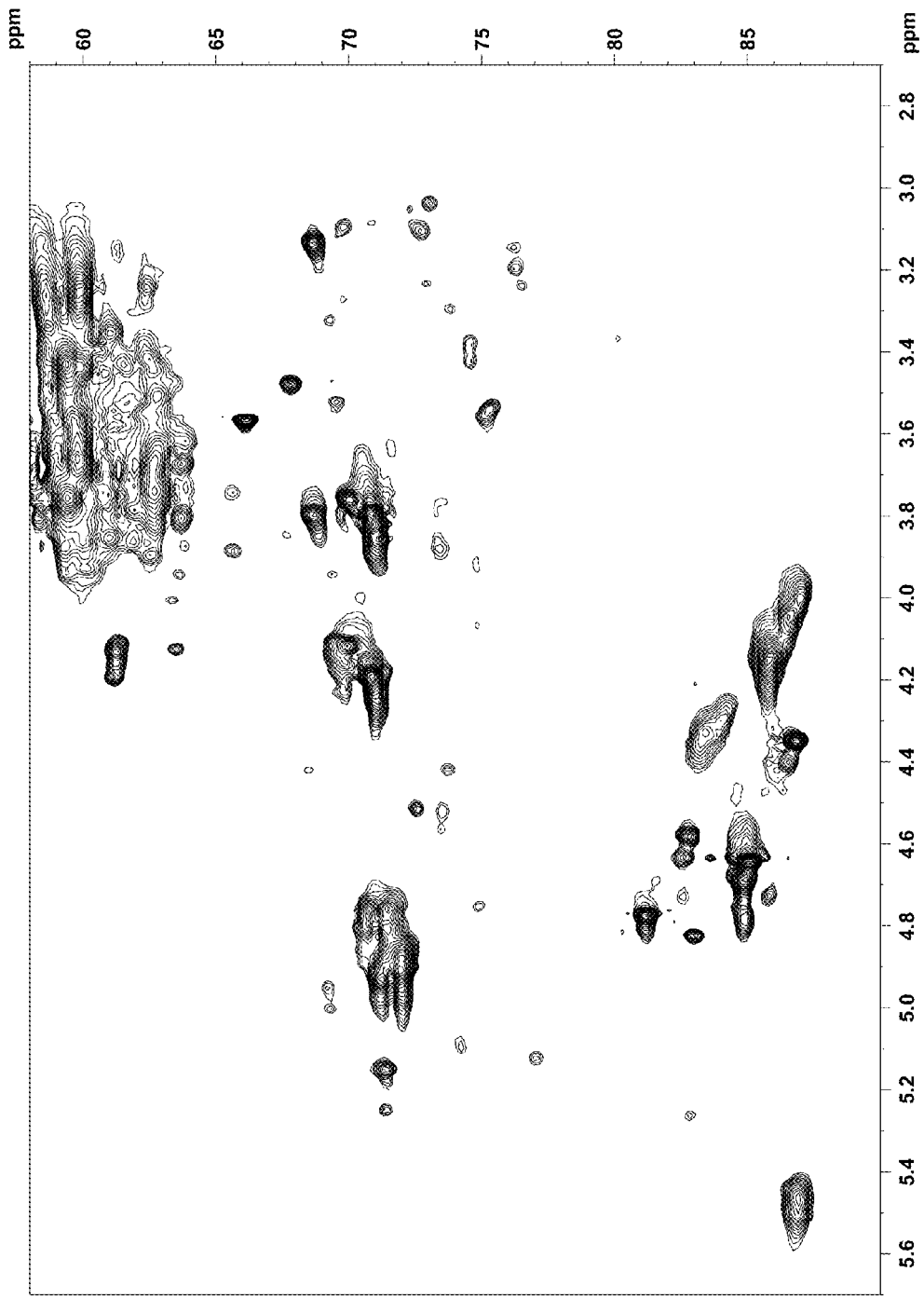
FIG. 10 illustrates the oxygenated aliphatic region of a 2D $^1H-^{13}C$ HSQC NMR spectrum for a lignin of the invention, as described in Example 7.
Figure 11:
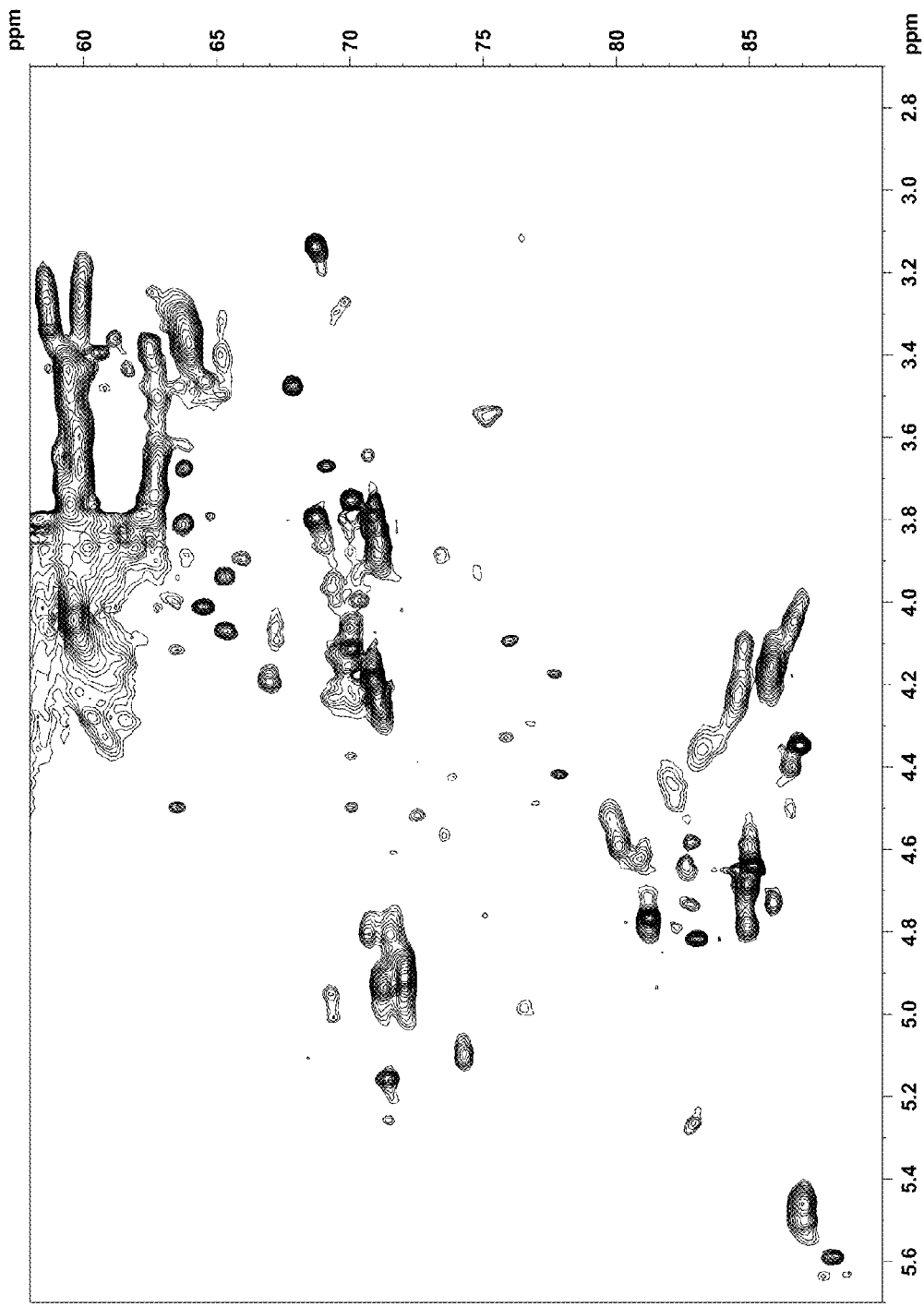
FIG. 11 illustrates the oxygenated aliphatic region of a 2D $^1H-^{13}C$ HSQC NMR spectrum for a comparative lignin, as described in Example 7.
Figure 12:
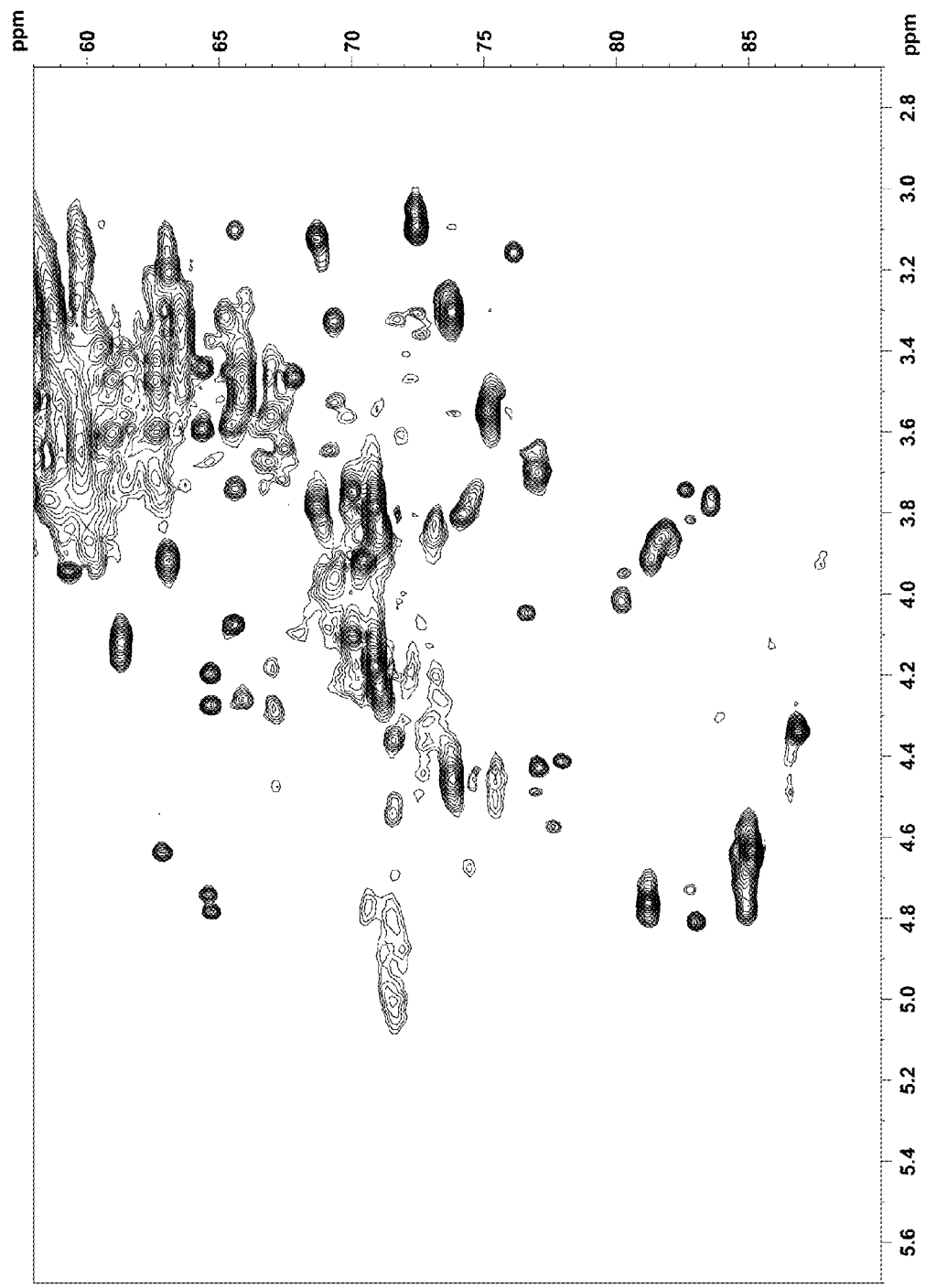
FIG. 12 illustrates the oxygenated aliphatic region of a 2D $^1H$—$^{13}C$ HSQC NMR spectrum for a comparative lignin, as described in Example 7.
Figure 13:
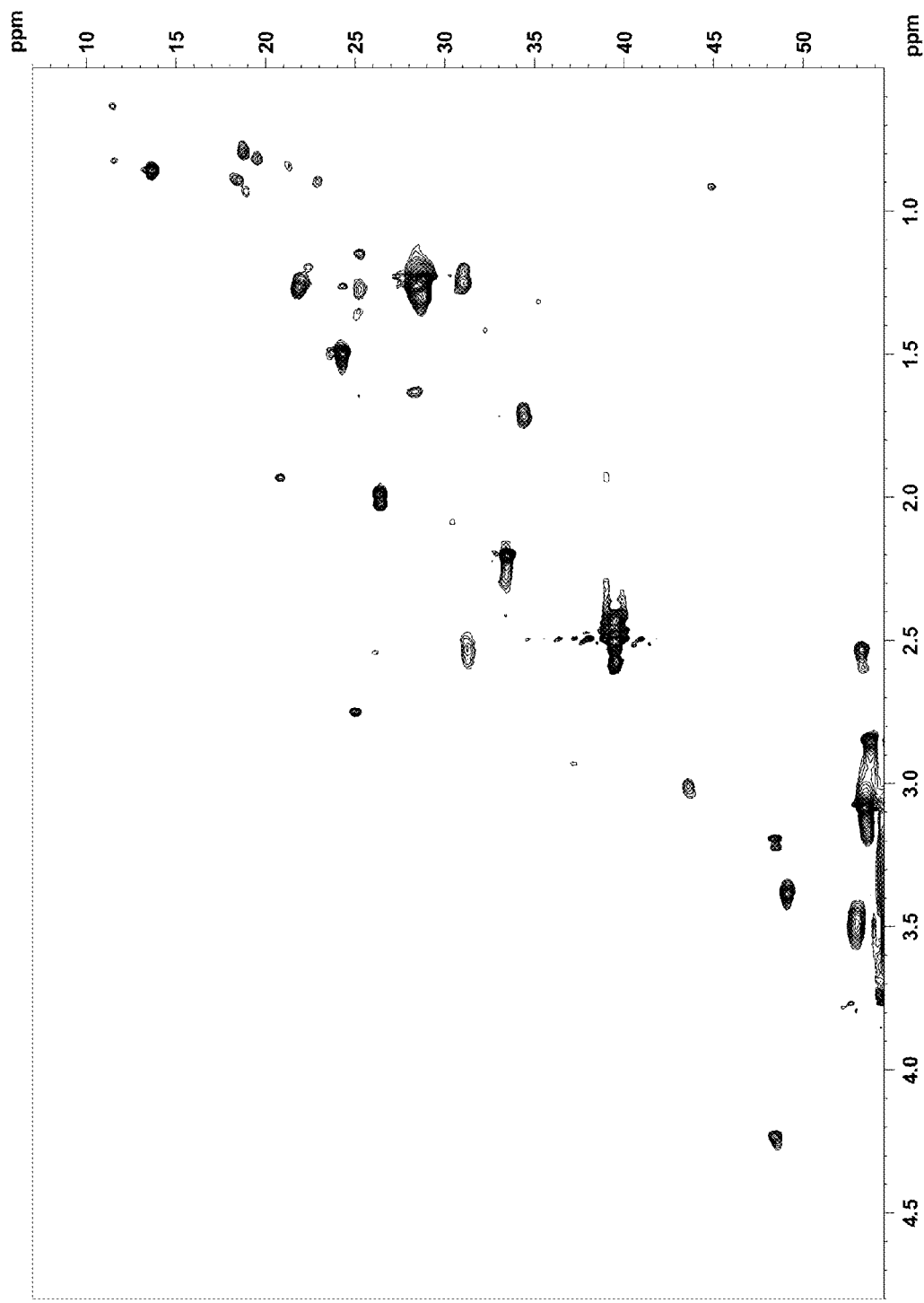
FIG. 13 illustrates the saturated aliphatic region of a 2D $^1H$—$^{13}C$ HSQC NMR spectrum for a lignin of the invention, as described in Example 7.
Figure 14:
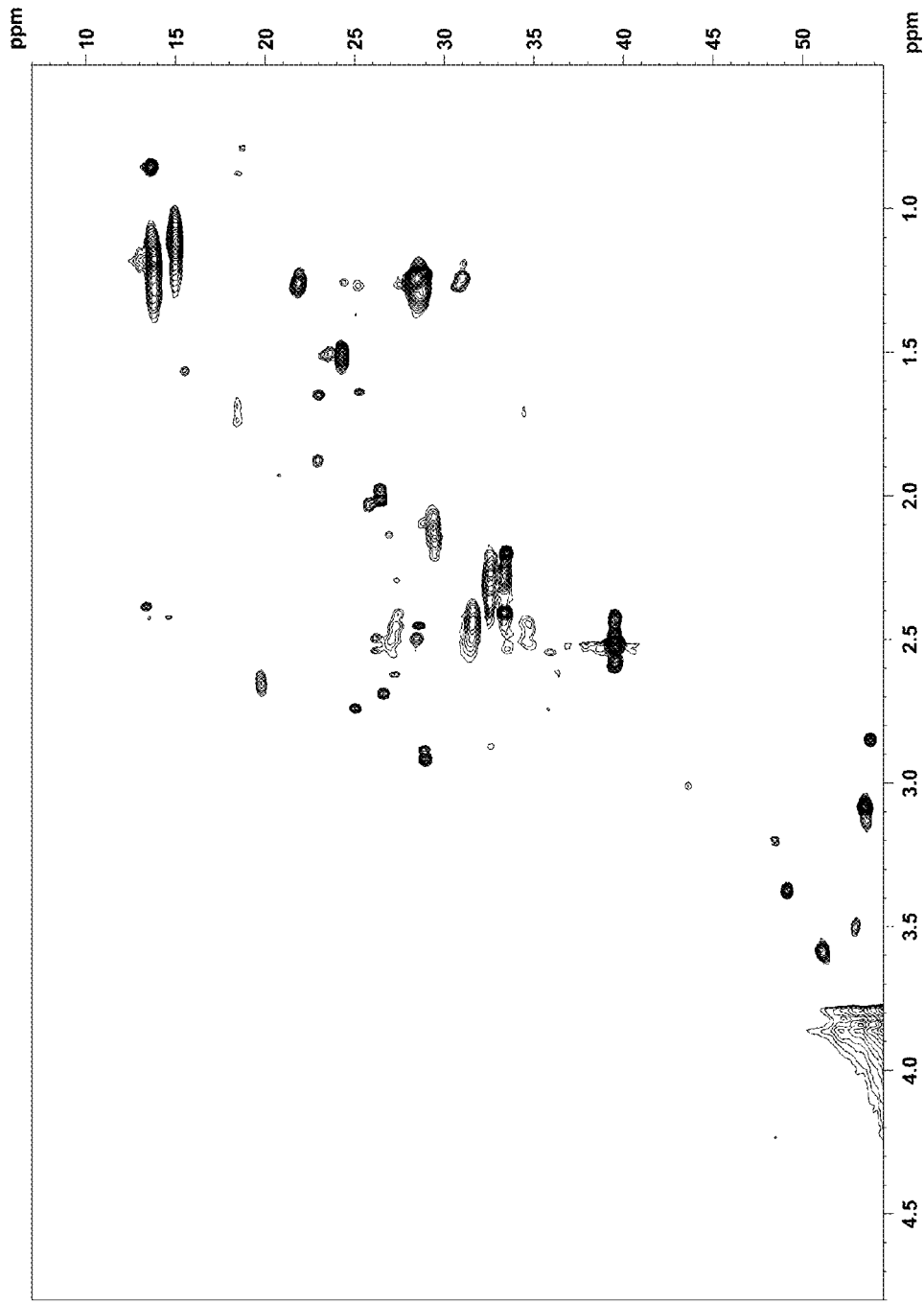
FIG. 14 illustrates the saturated aliphatic region of a 2D $^1H$—$^{13}C$ HSQC NMR spectrum for a comparative lignin, as described in Example 7.
Figure 15:
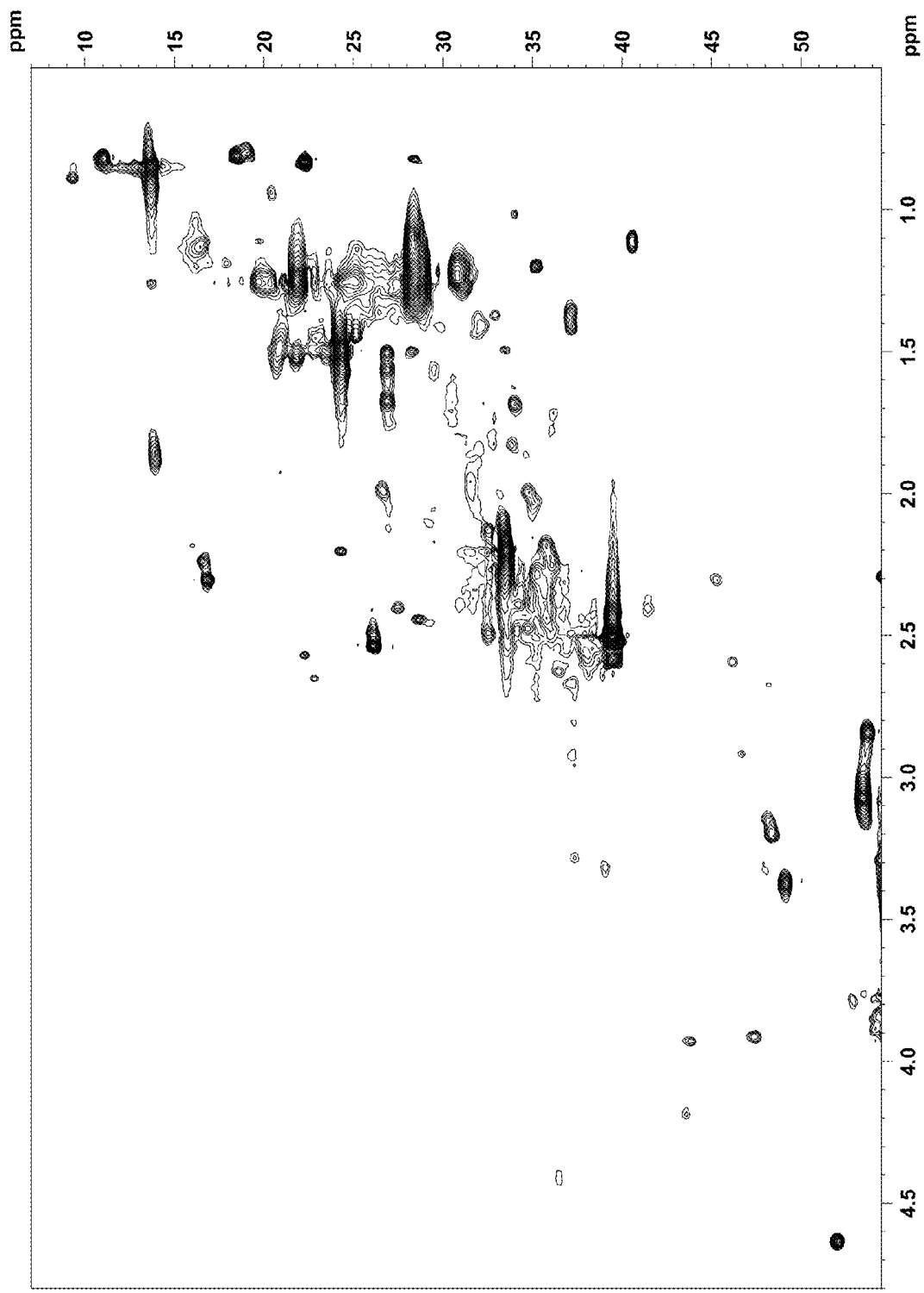
FIG. 15 illustrates the saturated aliphatic region of a 2D $^1H$—$^{13}C$ HSQC NMR spectrum for a comparative lignin, as described in Example 7.
Figure 16:
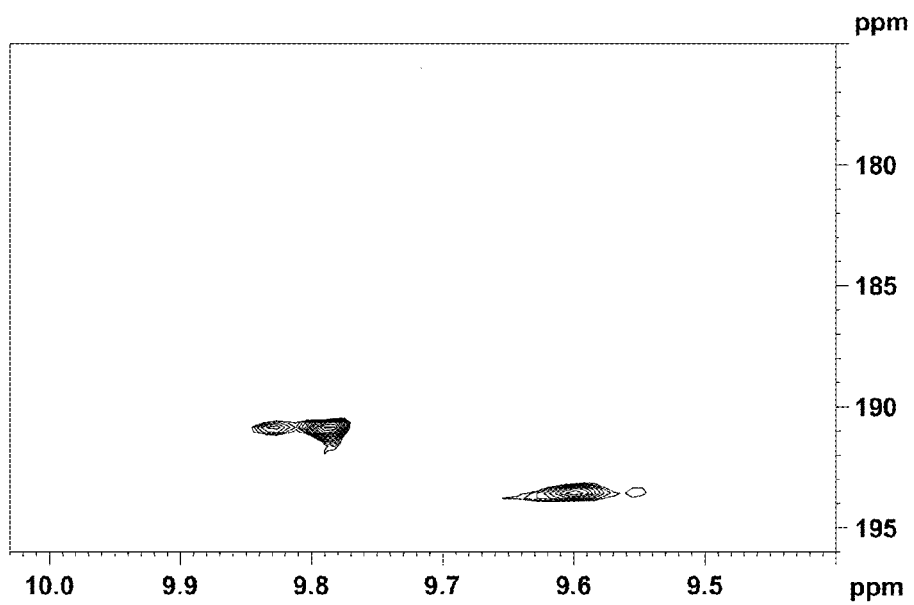
FIG. 16 illustrates the aldehyde region of a 2D $^1H$—$^{13}C$ HSQC NMR spectrum for a lignin of the invention, as described in Example 7.
Figure 17:
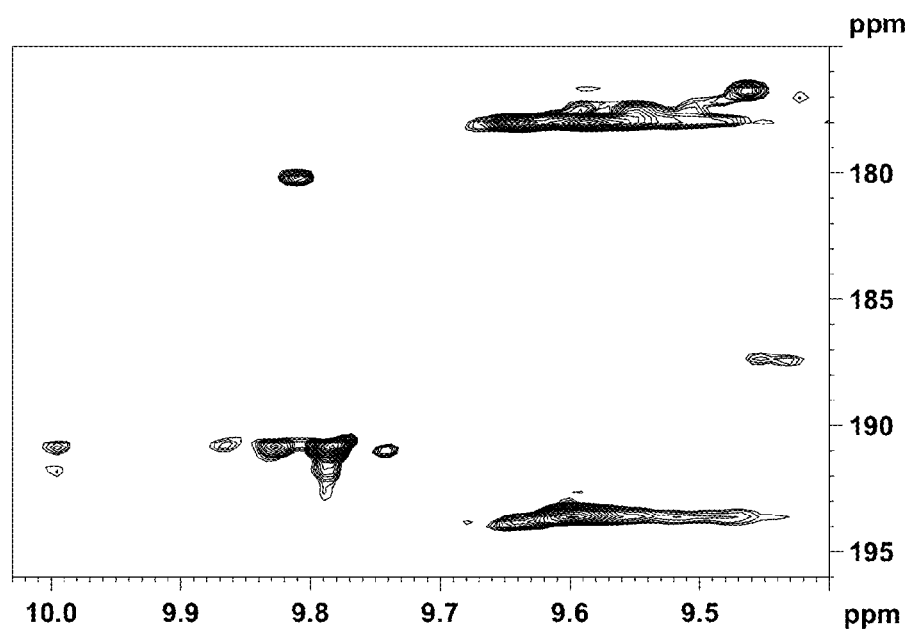
FIG. 17 illustrates the aldehyde region of a 2D $^1H$—$^{13}C$ HSQC NMR spectrum for a comparative lignin, as described in Example 7.
Figure 18:
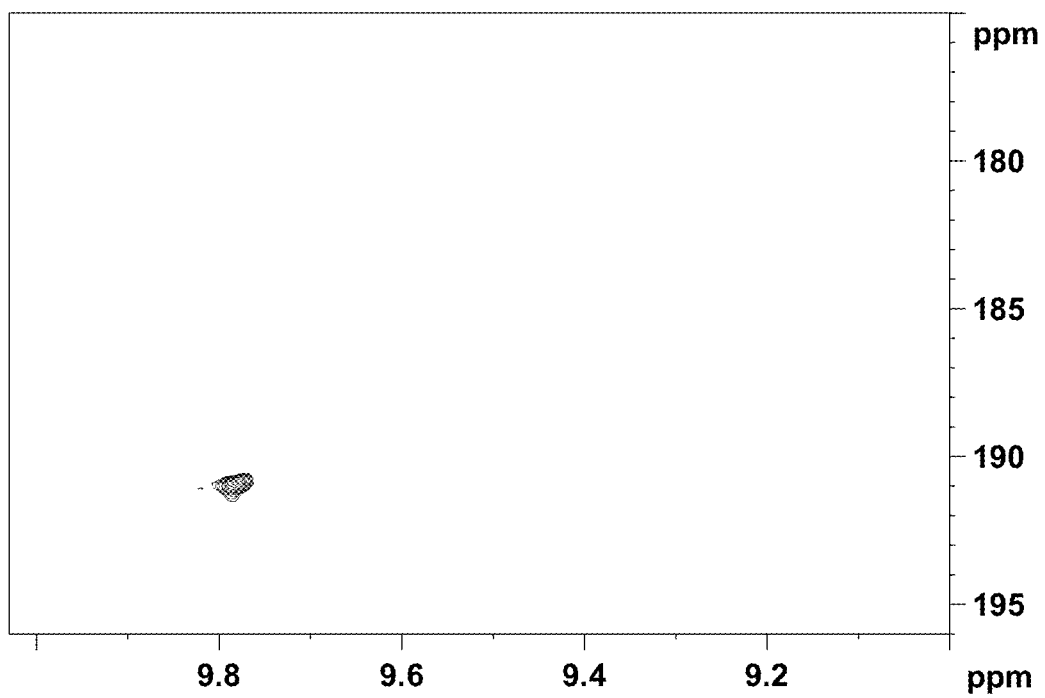
FIG. 18 illustrates the aldehyde region of a 2D $^1H$—$^{13}C$ HSQC NMR spectrum for a comparative lignin, as described in Example 7.

The wet solids from Run 2 in Example 1, without any drying or grinding, were washed with water ("Run 2 wet") and then extracted with the solvents shown in FIG. 6, namely, 40% ethanol in water, 50% ethanol in water, 60% ethanol in water, 99% methanol in water, 90% acetone in water, and 1 wt. % sodium hydroxide in water (all are % by volume unless otherwise indicated).

The dry and size-reduced unwashed solids of Run 2 ("Run 2 dry") were extracted with the solvents shown in FIG. 6, namely, 70% ethanol in water, 90% acetone in water, 1 wt. % sodium hydroxide in water, and 90% dioxane in water (all are % by volume unless otherwise indicated).

The yields of the different solvent extractions are reported in FIG. 6.

Example 4

This example illustrates the structural properties of lignins of the invention extracted using different solvents. The extraction procedure is similar to that as described in Example 1.

Table 5 reports the major functionalities of the lignins of the invention that are extracted using different solvents. The column titled "NaOH" corresponds to Run 2 in Example 1, and reports much of the same data as compared to the data reported in Table 4.

TABLE 5

Structural properties of lignin. Data expressed per 100 aromatic units (can be considered as mol %).

| Moieties | NaOH* | Acetone 90%** | MeOH 99%* | EtOH 70%* |
|---|---|---|---|---|
| Yield (% SHR lignin) | 85 | 79.5 | 58.7 | 63.5 |
| Tg | 91.8 | 79.9 | 75.7 | 66.4 |
| Total CO | 17 | 21 | 24 | 19 |
| Non-conjugated CO | 6 | 10 | 10 | 8 |
| Conjugated CO | 11 | 11 | 14 | 11 |
| Total COOR | 19 | 7 | 11 | 10 |
| Aliph COOR | 15 | 6 | 9 | 8 |
| Conjugated COOR | 4 | 1 | 2 | 2 |
| Total OH | 120 | 117 | †128 | †119 |
| Aliphatic | 58 | 47 | †51 | †51 |
| Primary | 29 | 27 | †25 | †29 |
| Secondary | 29 | 20 | †26 | †22 |
| Phenolic | 62 | 70 | 77 | 68 |
| S/G ratio | 1.29 | 1.30 | 1.23 | 1.31 |
| ArH | 203 | 205 | 207 | 208 |
| Degree of condensation | 41 | 38 | 38 | 35 |
| β-O-4 | 18 | 15 | 11 | 14 |
| β-β | 4 | 4 | 5 | 4 |
| β-5 | 3 | 3 | 4 | 3 |
| OCH$_3$ | 117 | 117 | 116 | 120 |
| Oxyg. aliphatic | 113 | 93 | †98 | †116 |
| Saturated aliphatic | 51 | 53 | 53 | 54 |
| Sugars (approximately) | ≤1 | ≤1 | 3 | 3 |
| Mn | 1199 | 997 | 778 | ND |
| Mw | 4169 | 2450 | 1683 | ND |
| Mz | 21243 | 9969 | 6849 | ND |
| PDI | 3.48 | 2.46 | 2.16 | ND |

*Extraction of the dry and size-reduced solids from Run 2 of Example 1
**Extraction of the "Run 2 wet" solids of Example 3
ND: not determined
†values are corrected for sugar content, as described in this example; NaOH and Acetone extracted samples are not corrected because the sugar content is low.

Technical lignins sometimes contain noticeable amount of carbohydrates in an NMR spectrum, and these signals may overlap somewhat with the signals for certain functional groups (for example, various types of OH moieties and oxygenated aliphatic moieties). It is therefore sometimes desirable to correct for this sugar content. In the spectra of non-acetylated lignin, sugar signals are partially overlapped with strong signals of S-2,6. However, after acetylation, the C-1 signals of carbohydrates are shifted upfield and can be separated from the lignin signals. Total amount of sugars can be estimated from the integral at about 99-102 ppm in the $^{13}$C NMR spectra of acetylated lignin. These values agree quite well with the values obtained by sugar analysis using wet chemistry methods. The corrections for sugar content can be made as follows:

OHpr-cor=OHpr−Sugars×% Hexose/100

OHsec-cor=OHsec−2Sugars

Oxygenated Aliphatic=I(90-58)cor=I(90-58)−Sugars× (4% Xyl+5% Hexose)/100 in which "OHpr-cor" is the amount of primary aliphatic OH groups corrected for sugar content, "OHpr" is the amount of primary aliphatic OH groups not corrected for sugar content, "Sugars" is the amount of sugars in the lignin sample per 100 Ar, "% Hexose" is the percentage of hexoses in sugars per total sugar content, "% Xyl" is the percentage of xylan in sugars per total sugar content, "OHsec-cor" is the amount of secondary aliphatic OH groups corrected for sugar content, "OHsec" is the amount of secondary aliphatic OH groups not corrected for sugar content, "Oxygenated Aliphatic" is the amount of oxygenated aliphatic carbons in lignin, "I(90-58)cor" is the integral at about 90-58 ppm corrected for sugar content, and "I(90-58)" is the integral at 90-58 ppm not corrected for sugar content.

Example 5

This example demonstrates nuclear magnetic resonance spectroscopy of comparative lignins.

Tables 6 and 7 report the amounts of various moieties present in comparative lignins. Certain data was obtained from the publications indicated in Tables 6 and 7. Curan lignin and soda bagasse lignin were obtained from the International Lignin Institute (ILI) headquartered in Lausanne, Switzerland, and alkaline lignin was purchased from Sigma-Aldrich. NMR measurements were performed on the Curan, soda bagasse, and alkaline lignins using the experimental techniques disclosed herein.

TABLE 6

Structural properties of comparative lignins. Data expressed per 100 aromatic units (can be considered as mol %).

| Moieties | [1]E. grandis MWL | [2]E. grandis kraft | [3]E. glob. Kraft residual | [3]E. grandis Kraft residual | [3]Birch Kraft residual | [4]Pine Kraft residual |
|---|---|---|---|---|---|---|
| Total CO | 12 | 12 | NR | NR | NR | NR |
| Non conjugated CO | 3 | 4 | NR | NR | NR | NR |
| Conjugated CO | 9 | 8 | NR | NR | NR | NR |

TABLE 6-continued

Structural properties of comparative lignins. Data expressed per 100 aromatic units (can be considered as mol %).

| Moieties | [1]E. grandis MWL | [2]E. grandis kraft | [3]E. glob. Kraft residual | [3]E. grandis Kraft residual | [3]Birch Kraft residual | [4]Pine Kraft residual |
|---|---|---|---|---|---|---|
| Total COOR | 5 | 16 | 24 | 19 | 33 | 41 |
| Aliph COOR | 3 | 13 | 22 | 17 | 30 | 37 |
| Conjugated COOR | 2 | 3 | 2 | 2 | 3 | 4 |
| Total OH | 141 | 119 | 162 | 143 | 123 | 127 |
| Aliphatic | 122 | 39 | 123 | 78 | 56 | 55 |
| Primary | 69 | 24 | 71 | 43 | 28 | 36 |
| Secondary | 53 | 15 | 52 | 35 | 28 | 19 |
| Phenolic | 19 | 80 | 39 | 65 | 67 | 72 |
| S/G ratio | 2.0 | 1.4 | 2.3 | 1.1 | 1.3 | |
| ArH | 215 | 186 | 194 | 197 | 162 | 210 |
| Degree of condensation | 21 | 55 | 37 | 52 | 82 | 90 |
| β-O-4 | 61 | 5 | 37 | 21 | 3 | 5 |
| β-β | 6 | 3 | 7 | 6 | 6 | 2.5 |
| β-5 | 3 | 2 | 1 | 4 | 4 | 4 |
| OCH$_3$ | 160 | 125 | 155 | 129 | 124 | 98 |
| Oxyg. aliphatic | 230 | 79 | 221 | 161 | 123 | 114 |
| Saturated aliphatic | NR | NR | NR | NR | NR | NR |
| Sugars (approx) | <1 | NR | 7 | 11 | 7 | NR |

NR: not reported
[1]published data from Balakshin et al. (2008), and Capanema and Jameel et al. (2005)
[2]published data from Capanema and Jameel et al. (2005), and Berlin and Balakshin (2014)
[3]published data from Balakshin et al. (2008), and Capanema and Jameel et al. (2005)
[4]published data from Balakshin et al. (2008)

TABLE 7

Structural properties of comparative lignins. Data expressed per 100 aromatic units (can be considered as mol %).

| Moieties | [1]Spruce MWL | [2]Pine kraft | [2]Indulin AT | [2]Douglas Fir OS | Curan | Soda Bagasse | Alkaline Lignin |
|---|---|---|---|---|---|---|---|
| Total CO | 21 | 11 | 12 | 20 | 16 | 18 | 12 |
| Non-conjugated CO | 5 | 4 | 5 | 7 | 7 | 7 | 6 |
| Conjugated CO | 14 | 7 | 7 | 13 | 9 | 11 | 6 |
| Total COOR | 5 | 21 | 16 | 6 | 21 | 36 | 20 |
| Aliph COOR | 4 | 20 | 15 | 5 | 17 | 26 | 16 |
| Conjugated COOR | 1 | 1 | 1 | 1 | 4 | 10 | 4 |
| Total OH | 138 | 108 | 118 | 118 | 122 | 95 | 117 |
| Aliphatic | 107 | 34 | 51 | 37 | 53 | 38 | 57 |
| Primary | 68 | 23 | 32 | 27 | 35 | 17 | 37 |
| Secondary | 39 | 11 | 19 | 10 | 18 | 21 | 20 |
| Phenolic | 31 | 74 | 67 | 81 | 69 | 57 | 60 |
| S/G ratio | NA | NA | NA | NA | NA | 0.51 | NA |
| ArH | 260 | 218 | 235 | NR | 218 | 207 | 226 |
| Degree of condensation | 38 | 82 | 65 | 73 | 82 | 59 | 74 |
| β-O-4 | 45 | 3 | 7 | 5 | 5 | 2 | 8 |
| β-β | 4 | 5 | 4 | 1 | 3 | 1 | 3 |
| β-5 | 9 | 3 | 4 | 3 | 2 | 1 | 3 |
| OCH$_3$ | 95 | 81 | 80 | 85 | 84 | 89 | 78 |
| Oxyg. aliphatic | 215 | 72 | 94 | 86 | 77 | 55 | 91 |
| Saturated aliphatic | NR | NR | 68 | 62 | 65 | 103 | 69 |
| Sugars (approx) | NR | NR | 1 | NR | 1 | 1 | 1 |

NR: not reported
NA: not applicable
[1]published data from Berlin and Balakshin (2014), and Capanema and Kadla et al. (2005)
[2]published data from Berlin and Balakshin (2014)

Example 6

This example demonstrates the data obtained from subjecting inventive and comparative lignins to pyrolysis, followed by analysis of the resulting compounds by GC/MS.

The sum of the peak areas for all integrated peaks in the GC chromatogram was normalized to 100%. The percentage of the total area attributed to each individual integrated peak is reported in Tables 8 and 9. Table 8 reports the data for compounds identified by GC/MS, and Table 9 reports the main ions for the unidentified compounds. The values are in percent. The lignins in Tables 8 and 9 are abbreviated as follows: RT—retention time in GC chromatogram; Run 2—NaOH extracted lignin from Run 2 in Example 1; AKL—aspen kraft lignin; ASL—aspen soda lignin; SE—steam explosion lignin (from ILI); LS—lignosulfonates (Sigma/Aldrich); PSL—pine soda lignin; RAHL—Russian Industrial Acid Hydrolysis lignin. StDev is the average standard deviation for the reported values of each identified compound or unidentified compound across all lignin types.

TABLE 8

Identified compounds in the pyrolysis GC/MS of inventive and comparative lignins. Values are the percent (%) contributed by each identified peak in the GC chromatogram to the total area in the GC chromatogram from a retention time of about 1 min to about 48 min.

| | | Inventive | Comparative | | | | | | | | |
|---|---|---|---|---|---|---|---|---|---|---|---|
| RT | Identified Compound | Run 2 | AKL | ASL | SE | Alcell | Curan | LS | PSL | RAHL | StDev |
| 3.089 | Toluene | 0.08 | 0.16 | 0.11 | 0.23 | 0.09 | 0.20 | 0.00 | 0.09 | 0.22 | 0.02 |
| 4.349 | x,x-Dimethylbenzene | 0.03 | 0.09 | 0.07 | 0.09 | 0.06 | 0.11 | 0.00 | 0.10 | 0.08 | 0.01 |
| 4.991 | Styrene | 0.02 | 0.01 | 0.02 | 0.03 | 0.03 | 0.02 | 0.01 | 0.00 | 0.03 | 0.01 |
| 10.909 | Phenol | 0.28 | 0.51 | 0.51 | 6.28 | 0.22 | 1.21 | 0.36 | 0.94 | 0.46 | 0.04 |
| 11.684 | Guaiacol | 3.88 | 6.78 | 5.67 | 9.55 | 2.83 | 27.20 | 9.14 | 18.85 | 3.93 | 0.40 |
| 12.424 | 2-Methylphenol | 0.23 | 0.38 | 0.28 | 0.54 | 0.22 | 0.77 | 0.17 | 0.69 | 0.34 | 0.01 |
| 13.061 | x,x-Dimethylphenol | 0.05 | 0.10 | 0.07 | 0.11 | 0.05 | 0.18 | 0.00 | 0.18 | 0.00 | 0.01 |
| 13.576 | 4-Methylphenol | 0.41 | 0.39 | 0.32 | 0.57 | 0.34 | 1.02 | 0.17 | 0.90 | 0.48 | 0.03 |
| 13.895 | x-Methylguaiacol | 0.40 | 0.68 | 0.49 | 0.62 | 0.32 | 1.64 | 0.28 | 1.12 | 0.27 | 0.02 |
| 14.594 | 3-Methylguaiacol | 0.05 | 0.13 | 0.09 | 0.13 | 0.04 | 0.26 | 0.09 | 0.18 | 0.08 | 0.01 |
| 14.874 | 4-Methylguaiacol | 5.12 | 2.86 | 2.21 | 1.97 | 4.43 | 7.17 | 1.07 | 8.87 | 5.17 | 0.05 |
| 15.111 | x,x-Dimethylphenol | 0.16 | 0.18 | 0.15 | 0.26 | 0.16 | 0.45 | 0.09 | 0.34 | 0.30 | 0.03 |
| 16.936 | 3-Ethylguaiacol | 0.39 | 0.29 | 0.19 | 0.19 | 0.38 | 0.59 | 0.06 | 0.56 | 0.32 | 0.01 |
| 17.526 | 4-Ethylguaiacol | 0.71 | 0.66 | 0.67 | 0.64 | 0.58 | 2.15 | 0.40 | 2.28 | 0.61 | 0.11 |
| 19.233 | 4-Vinylphenol | 0.26 | 0.17 | 0.15 | 0.20 | 0.14 | 0.17 | 0.13 | 0.22 | 0.14 | 0.02 |
| 19.314 | 3-Methoxycatechol | 0.70 | 2.20 | 0.81 | 0.60 | 0.84 | 0.00 | 0.00 | 0.00 | 0.00 | 0.11 |
| 19.381 | 4-Vinylguaiacol | 5.65 | 5.32 | 5.15 | 5.77 | 4.55 | 12.74 | 7.23 | 12.44 | 2.94 | 0.19 |
| 20.11 | Eugenol | 0.90 | 0.41 | 0.39 | 0.50 | 0.82 | 0.97 | 1.35 | 1.07 | 0.58 | 0.02 |
| 20.231 | 4-Propylguaiacol | 0.16 | 0.09 | 0.06 | 0.07 | 0.16 | 0.31 | 0.09 | 0.33 | 0.13 | 0.01 |
| 20.772 | Catechol | 0.18 | 0.35 | 0.08 | 0.19 | 0.13 | 1.51 | 0.01 | 0.89 | 0.31 | 0.16 |
| 20.91 | Syringol | 9.12 | 21.95 | 17.94 | 19.93 | 8.64 | 0.94 | 1.96 | 0.00 | 1.47 | 0.33 |
| 21.857 | cis-Isoeugenol | 0.51 | 0.24 | 0.23 | 0.32 | 0.46 | 0.72 | 1.33 | 0.73 | 0.23 | 0.03 |
| 21.892 | 3-Methylcatechol | 0.10 | 0.06 | 0.01 | 0.12 | 0.13 | 0.30 | 0.00 | 0.18 | 0.00 | 0.03 |
| 22.186 | x-Dimethoxyphenol | 1.01 | 0.78 | 0.39 | 0.35 | 1.15 | 0.00 | 0.00 | 0.00 | 0.30 | 0.03 |
| 23.226 | 4-Methylcatechol | 0.08 | 0.01 | 0.00 | 0.04 | 0.05 | 0.40 | 0.00 | 0.24 | 0.14 | 0.06 |
| 23.523 | trans-Isoeugenol | 2.72 | 1.18 | 1.16 | 1.71 | 2.42 | 3.80 | 6.10 | 3.58 | 1.35 | 0.08 |
| 23.7 | 4-Methylsyringol | 10.83 | 6.85 | 5.13 | 3.92 | 11.74 | 0.06 | 0.23 | 0.00 | 1.32 | 0.09 |
| 24.183 | Vanillin | 2.46 | 1.46 | 3.87 | 1.36 | 2.37 | 4.62 | 1.02 | 9.64 | 2.44 | 0.13 |
| 24.696 | Unidentified guaiacyl structure C10.H10.O2 | 0.58 | 0.38 | 0.34 | 0.53 | 0.37 | 0.30 | 0.29 | 0.19 | 0.21 | 0.02 |
| 25.028 | Unidentified guaiacyl structure C10.H10.O2 | 0.19 | 0.05 | 0.07 | 0.12 | 0.10 | 0.16 | 0.31 | 0.14 | 0.14 | 0.02 |
| 25.888 | 4-Ethylsyringol | 1.85 | 1.91 | 1.95 | 1.82 | 1.85 | 0.00 | 0.09 | 0.00 | 0.25 | 0.08 |
| 25.929 | Homovanillin | 1.25 | 1.27 | 2.87 | 1.24 | 0.82 | 4.44 | 1.91 | 8.96 | 1.75 | 0.09 |
| 26.578 | Acetoguaiacone | 1.08 | 1.20 | 1.01 | 1.12 | 0.84 | 2.27 | 0.65 | 3.98 | 0.89 | 0.06 |
| 27.633 | 4-Vinylsyringol | 6.78 | 9.61 | 8.28 | 9.05 | 8.35 | 0.16 | 0.91 | 0.00 | 0.60 | 0.10 |
| 28.03 | Guaiacylacetone | 0.50 | 0.61 | 1.61 | 1.60 | 0.72 | 3.05 | 8.84 | 5.61 | 0.93 | 0.14 |
| 28.112 | 4-Allylsyringol | 3.34 | 1.27 | 1.37 | 2.03 | 3.61 | 0.00 | 0.00 | 0.00 | 0.17 | 0.07 |
| 28.999 | Propioguaiacone | 0.17 | 0.15 | 0.09 | 0.12 | 0.14 | 0.32 | 0.21 | 0.47 | 0.18 | 0.01 |
| 29.376 | Guaiacyl vinyl ketone | 0.63 | 0.31 | 0.26 | 0.27 | 0.47 | 0.68 | 0.29 | 0.66 | 0.35 | 0.02 |
| 29.409 | 4-(Hydroxyprop-2-enyl)guaiacol | 0.46 | 0.29 | 0.27 | 0.18 | 0.33 | 1.09 | 0.58 | 1.21 | 0.50 | 0.02 |
| 29.589 | cis-Propenylsyringol | 1.20 | 0.47 | 0.47 | 0.77 | 1.18 | 0.00 | 0.22 | 0.00 | 0.00 | 0.05 |
| 30.818 | Unidentified syringyl structure C11H12O3 | 1.24 | 0.27 | 0.24 | 0.55 | 0.81 | 0.00 | 0.00 | 0.00 | 0.00 | 0.04 |
| 31.052 | Unidentified syringyl structure C11H12O3 | 0.33 | 0.06 | 0.03 | 0.16 | 0.25 | 0.00 | 0.00 | 0.00 | 0.00 | 0.01 |
| 31.332 | trans-Propenylsyringol | 7.47 | 2.33 | 2.40 | 4.36 | 7.71 | 0.00 | 0.78 | 0.00 | 0.30 | 0.16 |
| 31.536 | Dihydroconiferyl alcohol | 0.21 | 0.05 | 0.03 | 0.38 | 0.19 | 3.79 | 1.95 | 1.74 | 0.46 | 0.13 |
| 32.124 | Syringaldehyde | 7.84 | 3.78 | 9.28 | 2.59 | 8.06 | 0.00 | 0.17 | 0.00 | 0.48 | 0.30 |
| 32.325 | cis-Coniferylalcohol | 0.12 | 0.07 | 0.06 | 0.21 | 0.09 | 0.42 | 0.09 | 0.10 | 0.00 | 0.03 |
| 33.28 | Homosyringaldehyde | 3.19 | 2.11 | 5.72 | 2.14 | 2.86 | 0.00 | 0.81 | 0.00 | 0.22 | 0.08 |
| 33.914 | Acetosyringone | 2.82 | 4.31 | 3.48 | 2.29 | 2.69 | 0.00 | 0.20 | 0.00 | 0.64 | 0.12 |
| 34.535 | trans-Coniferylalcohol | 0.38 | 0.31 | 0.16 | 1.03 | 0.41 | 1.16 | 0.12 | 0.23 | 0.11 | 0.15 |
| 34.995 | Syringacetone | 0.80 | 0.58 | 2.23 | 2.16 | 1.91 | 0.00 | 1.05 | 0.00 | 0.00 | 0.04 |
| 35.167 | Coniferaldehyde | 0.40 | 0.46 | 0.00 | 0.19 | 0.44 | 1.11 | 1.30 | 0.00 | 0.38 | 0.06 |
| 35.878 | Propiosyringone | 0.56 | 0.43 | 0.24 | 0.28 | 0.64 | 0.00 | 0.00 | 0.00 | 0.00 | 0.02 |
| 36.249 | Syringyl vinyl ketone | 1.31 | 0.33 | 0.38 | 0.30 | 0.97 | 0.00 | 0.00 | 0.00 | 0.00 | 0.03 |

TABLE 8-continued

Identified compounds in the pyrolysis GC/MS of inventive and comparative lignins.
Values are the percent (%) contributed by each identified peak in the GC chromatogram to the total
area in the GC chromatogram from a retention time of about 1 min to about 48 min.

|  |  | Inventive | Comparative | | | | | | | | |
|---|---|---|---|---|---|---|---|---|---|---|---|
| RT | Identified Compound | Run 2 | AKL | ASL | SE | Alcell | Curan | LS | PSL | RAHL | StDev |
| 36.335 | 4-(Hydroxy-prop-2-enyl)syringol | 0.71 | 0.34 | 0.29 | 0.20 | 0.50 | 0.00 | 0.00 | 0.00 | 0.00 | 0.01 |
| 38.199 | Dihydrosinapyl alcohol | 0.54 | 0.11 | 0.09 | 0.33 | 0.47 | 0.00 | 0.00 | 0.00 | 0.00 | 0.05 |
| 38.795 | cis-Sinapyl alcohol | 0.29 | 0.00 | 0.00 | 0.24 | 0.33 | 0.00 | 0.00 | 0.00 | 0.00 | 0.07 |
| 41.068 | trans-Sinapyl alcohol | 0.55 | 0.08 | 0.07 | 0.68 | 0.57 | 0.00 | 0.00 | 0.00 | 0.00 | 0.09 |
| 41.424 | Sinapaldehyde | 1.43 | 0.21 | 0.22 | 0.47 | 1.21 | 0.00 | 0.00 | 0.00 | 0.00 | 0.08 |

TABLE 9

Unidentified peaks in the mass spectrum in the pyrolysis GC/MS of inventive and comparative lignins.
Values are the percent (%) contributed by each unidentified peak in the GC chromatogram to the total
area in the GC chromatogram from a retention time of about 1 min to about 48 min.

|  |  | Inventive | Comparative | | | | | | | | |
|---|---|---|---|---|---|---|---|---|---|---|---|
| RT | Unidentified Peak(s) | Run 2 | AKL | ASL | SE | Alcell | Curan | LS | PSL | RAHL | StDev |
| 1.558 | 47 + 48 | 0.00 | 1.03 | 0.00 | 0.00 | 0.00 | 0.96 | 13.62 | 0.00 | 0.00 | 0.14 |
| 1.756 | 47 + 62 | 0.00 | 0.00 | 0.00 | 0.00 | 0.00 | 0.30 | 13.64 | 0.00 | 0.00 | 0.17 |
| 2.496 | 55 + 96, 57 | 0.00 | 0.00 | 0.00 | 0.00 | 0.15 | 0.00 | 0.00 | 0.00 | 0.00 | 0.00 |
| 2.68 | 94 + 65 | 0.00 | 0.00 | 0.00 | 0.00 | 0.14 | 0.00 | 0.00 | 0.00 | 0.00 | 0.00 |
| 3.061 | 94 + 79 | 0.00 | 0.12 | 0.00 | 0.00 | 0.00 | 0.00 | 1.22 | 0.00 | 0.00 | 0.05 |
| 4.376 | 55 + 84 | 0.00 | 0.00 | 0.00 | 0.00 | 0.00 | 0.00 | 0.14 | 0.00 | 0.54 | 0.00 |
| 7.124 | 126 + 79 | 0.00 | 0.21 | 0.00 | 0.00 | 0.00 | 0.17 | 1.19 | 0.00 | 0.00 | 0.19 |
| 10.067 | 112 + 84 | 0.00 | 0.08 | 0.08 | 0.06 | 0.03 | 0.10 | 0.21 | 0.16 | 0.10 | 0.01 |
| 10.257 | 112 + 74 | 0.00 | 0.14 | 0.20 | 0.00 | 0.00 | 0.00 | 0.00 | 0.00 | 0.00 | 0.02 |
| 10.325 | 136 + 121 | 0.00 | 0.00 | 0.00 | 0.00 | 0.00 | 0.00 | 0.00 | 0.10 | 0.04 | 0.00 |
| 10.394 | 94 + 66, 98 + 69 | 0.00 | 0.03 | 0.00 | 0.00 | 0.00 | 0.00 | 0.25 | 0.00 | 0.00 | 0.02 |
| 10.515 | 126 + 111 | 0.00 | 0.07 | 0.11 | 0.00 | 0.00 | 0.15 | 0.11 | 0.23 | 0.00 | 0.02 |
| 12.261 | 61 | 0.00 | 0.00 | 0.00 | 0.00 | 0.00 | 0.00 | 0.12 | 0.00 | 0.20 | 0.06 |
| 12.556 | 138 + 95 | 0.00 | 0.00 | 0.00 | 0.00 | 0.00 | 0.28 | 0.39 | 0.17 | 0.00 | 0.03 |
| 12.563 | 119 + 134 | 0.11 | 0.00 | 0.00 | 0.00 | 0.00 | 0.00 | 0.00 | 0.00 | 0.00 | 0.01 |
| 14.839 | 98 + 68 | 0.00 | 0.00 | 0.00 | 0.00 | 0.00 | 0.00 | 0.00 | 0.00 | 2.33 | 0.18 |
| 15.358 | 152 + 137 | 0.02 | 0.20 | 0.10 | 0.24 | 0.03 | 0.79 | 0.14 | 0.67 | 0.00 | 0.03 |
| 15.373 | 152 + 121 | 0.03 | 0.00 | 0.00 | 0.00 | 0.03 | 0.00 | 0.00 | 0.00 | 0.00 | 0.00 |
| 16.408 | 139 + 152 | 0.15 | 0.13 | 0.13 | 0.11 | 0.15 | 0.00 | 0.00 | 0.34 | 0.12 | 0.01 |
| 16.296 | 107 + 77 + 152 | 0.08 | 0.15 | 0.13 | 0.15 | 0.08 | 0.00 | 0.00 | 0.00 | 0.00 | 0.00 |
| 16.437 | 107 + 122 | 0.00 | 0.00 | 0.00 | 0.00 | 0.00 | 0.22 | 0.04 | 0.23 | 0.08 | 0.01 |
| 18.389 | 166 + 135 | 0.08 | 0.03 | 0.00 | 0.00 | 0.10 | 0.00 | 0.00 | 0.00 | 0.00 | 0.00 |
| 19.566 | 94 + 124 | 0.11 | 0.27 | 0.06 | 0.08 | 0.08 | 0.10 | 0.00 | 0.05 | 0.05 | 0.04 |
| 19.908 | 164 + 149 | 0.00 | 0.18 | 0.08 | 0.11 | 0.00 | 0.27 | 0.14 | 0.24 | 0.00 | 0.03 |
| 19.964 | 162 + 119 | 0.05 | 0.00 | 0.00 | 0.00 | 0.00 | 0.00 | 0.00 | 0.00 | 0.00 | 0.00 |
| 21.451 | 149 + 164 | 0.11 | 0.12 | 0.13 | 0.07 | 0.07 | 0.24 | 0.03 | 0.26 | 0.00 | 0.02 |
| 22.002 | 70 + 57 | 0.00 | 0.00 | 0.00 | 0.00 | 0.00 | 0.00 | 0.00 | 0.00 | 0.33 | 0.03 |
| 22.649 | 73 + 355 | 0.00 | 0.00 | 0.00 | 0.00 | 0.00 | 0.00 | 0.00 | 0.05 | 0.00 | 0.01 |
| 24.313 | 151 + 178 | 0.00 | 0.00 | 0.00 | 0.03 | 0.00 | 0.00 | 0.00 | 0.00 | 0.00 | 0.02 |
| 24.891 | 191 + 162 | 0.00 | 0.00 | 0.00 | 0.00 | 0.00 | 0.00 | 0.00 | 0.00 | 0.00 | 0.00 |
| 26.216 | 140 + 125 | 0.00 | 0.00 | 0.00 | 0.30 | 0.06 | 0.81 | 0.00 | 0.40 | 0.18 | 0.03 |
| 26.295 | 131 + 178 | 0.19 | 0.00 | 0.00 | 0.00 | 0.12 | 0.00 | 0.00 | 0.20 | 0.00 | 0.02 |
| 26.488 | 165 + 166 | 0.07 | 0.00 | 0.00 | 0.00 | 0.00 | 0.00 | 0.00 | 0.00 | 0.00 | 0.00 |
| 26.91 | 151 + 180 | 0.09 | 0.17 | 0.15 | 0.14 | 0.00 | 0.42 | 0.31 | 0.47 | 0.05 | 0.03 |
| 27.079 | 151 + 123 | 0.00 | 0.00 | 0.15 | 0.00 | 0.00 | 0.00 | 0.00 | 0.55 | 0.00 | 0.02 |
| 28.326 | 137 + 179 | 0.03 | 0.11 | 0.00 | 0.00 | 0.02 | 0.32 | 0.00 | 0.00 | 0.00 | 0.01 |
| 28.34 | 137 + 168 | 0.00 | 0.00 | 0.00 | 0.00 | 0.00 | 0.00 | 2.01 | 0.50 | 0.10 | 0.04 |
| 28.544 | 121 + 152 | 0.00 | 0.47 | 0.21 | 0.33 | 0.00 | 0.00 | 0.00 | 0.00 | 0.00 | 0.09 |
| 28.581 | 178 + 149 | 0.19 | 0.00 | 0.00 | 0.00 | 0.10 | 0.50 | 0.29 | 0.67 | 0.30 | 0.03 |
| 30.471 | 190 + 175 | 0.07 | 0.00 | 0.00 | 0.00 | 0.04 | 0.12 | 0.00 | 0.10 | 0.11 | 0.02 |
| 31.282 | 174 + 159 + 131 | 0.00 | 0.00 | 0.00 | 0.00 | 0.00 | 0.13 | 0.00 | 0.00 | 0.00 | 0.01 |
| 32.078 | 138 + 137 | 0.00 | 0.00 | 0.00 | 0.00 | 0.00 | 0.00 | 0.00 | 0.00 | 0.00 | 0.00 |
| 33.682 | 208 + 206 + 161 | 0.38 | 0.00 | 0.00 | 0.20 | 0.27 | 0.00 | 0.00 | 0.00 | 0.00 | 0.03 |
| 33.825 | 151 | 0.00 | 0.00 | 0.00 | 0.00 | 0.00 | 0.00 | 0.00 | 0.09 | 0.00 | 0.01 |
| 34.424 | 206 + 188 | 0.00 | 0.00 | 0.00 | 0.00 | 0.00 | 0.00 | 0.00 | 0.00 | 0.00 | 0.00 |
| 34.49 | 207 + 208 + 197 | 0.06 | 0.00 | 0.00 | 0.00 | 0.00 | 0.00 | 0.00 | 0.00 | 0.00 | 0.01 |
| 34.874 | 200 + 185 | 0.05 | 0.00 | 0.00 | 0.00 | 0.00 | 0.00 | 0.00 | 0.00 | 0.00 | 0.01 |
| 35.013 | 73 + 85 | 0.00 | 0.00 | 0.00 | 0.00 | 0.00 | 0.00 | 0.00 | 0.00 | 2.53 | 0.30 |
| 35.291 | 206 + 175 | 0.10 | 0.00 | 0.04 | 0.08 | 0.10 | 0.00 | 0.00 | 0.00 | 0.00 | 0.01 |
| 35.386 | 239 | 0.00 | 0.00 | 0.00 | 0.00 | 0.00 | 0.00 | 0.00 | 0.00 | 0.00 | 0.00 |
| 36.93 | 224 + 163 | 0.00 | 0.00 | 0.00 | 0.00 | 0.17 | 0.00 | 0.00 | 0.00 | 0.00 | 0.00 |
| 37.001 | 211 + 149 | 0.00 | 0.00 | 0.00 | 0.00 | 0.09 | 0.00 | 0.00 | 0.00 | 0.00 | 0.00 |

TABLE 9-continued

Unidentified peaks in the mass spectrum in the pyrolysis GC/MS of inventive and comparative lignins. Values are the percent (%) contributed by each unidentified peak in the GC chromatogram to the total area in the GC chromatogram from a retention time of about 1 min to about 48 min.

| | | Inventive | Comparative | | | | | | | | |
|---|---|---|---|---|---|---|---|---|---|---|---|
| RT | Unidentified Peak(s) | Run 2 | AKL | ASL | SE | Alcell | Curan | LS | PSL | RAHL | StDev |
| 37.753 | 237 + 195 | 0.00 | 0.00 | 0.00 | 0.00 | 0.00 | 0.00 | 0.00 | 0.00 | 0.00 | 0.00 |
| 38.421 | 248 + 220 | 0.00 | 0.00 | 0.00 | 0.00 | 0.17 | 0.00 | 0.00 | 0.00 | 0.00 | 0.03 |
| 39.311 | 67 + 81 + 262 | 0.00 | 0.00 | 0.00 | 0.00 | 0.17 | 0.00 | 0.00 | 0.00 | 0.00 | 0.02 |
| 39.558 | 238 + 312 | 0.00 | 0.00 | 0.00 | 0.00 | 0.23 | 0.00 | 0.00 | 0.00 | 0.00 | 0.02 |
| 40.241 | 222 + 207 | 0.07 | 0.00 | 0.00 | 0.00 | 0.07 | 0.00 | 0.00 | 0.00 | 0.00 | 0.01 |
| 41.279 | 230 + 208 | 0.00 | 0.00 | 0.00 | 0.00 | 0.16 | 0.00 | 0.00 | 0.00 | 0.00 | 0.00 |
| 41.383 | 167 + 226 | 0.00 | 0.27 | 0.83 | 0.00 | 0.00 | 0.00 | 0.00 | 0.00 | 0.00 | 0.13 |
| 44.947 | 239 | 0.00 | 0.00 | 0.00 | 0.00 | 0.00 | 0.25 | 0.00 | 0.00 | 0.00 | 0.04 |
| 47.4 | 260 | 0.00 | 0.00 | 0.00 | 0.00 | 0.00 | 0.17 | 0.00 | 0.00 | 0.00 | 0.01 |
| 47.533 | 274 + 259 | 0.00 | 0.00 | 0.00 | 0.00 | 0.00 | 0.22 | 0.00 | 0.00 | 0.00 | 0.00 |
| 47.655 | 260 | 0.00 | 0.00 | 0.00 | 0.00 | 0.00 | 0.26 | 0.00 | 0.00 | 0.00 | 0.01 |

Example 7

This example demonstrates the differences between the 2D $^1$H—$^{13}$C HSQC NMR spectra for an inventive lignin and two comparative lignins.

AKL is aspen kraft lignin, and Alcell is an organosolv-type lignin (mixed hardwoods). Run 2 is the NaOH extracted lignin from Run 2 in Example 1. The NMR measurements were performed according to the experimental procedures described herein. The 2D NMR spectra are shown in FIGS. 7-18. FIGS. 7, 10, 13, and 16 illustrate the (a) the aromatic and olephinic region, (b) oxygenated aliphatic region, (c) saturated aliphatic region, and (d) aldehyde region, respectively, of the 2D NMR spectrum for the inventive Run 2 lignin. FIGS. 8, 11, 14, and 17 illustrate these same regions, respectively, for the Alcell comparative lignin. FIGS. 9, 12, 15, and 18 illustrate these same regions, respectively, for the AKL comparative lignin. The presence (+) or absence (−) of signals (e.g., cross peaks) at certain chemical shift regions (i.e., coordinates) in the 2D NMR spectra for inventive and comparative lignins is shown in Table 10.

TABLE 10

Presence (+) or absence (−) of cross peaks at the indicated chemical shift coordinates for inventive and comparative lignins in a 2D NMR spectrum

| $^{13}$C Chemical Shift Range (ppm) | $^1$H Chemical Shift Range (ppm) | Inventive Run 2 | Comparative Alcell | Comparative AKL |
|---|---|---|---|---|
| 13.05 to 13.6 | 2.33 to 2.43 | − | + | − |
| 13.55 to 14.1 | 1.12 to 1.22 | − | + | − |
| 13.60 to 14.15 | 1.81 to 1.91 | − | − | + |
| 14.8 to 15.35 | 1.06 to 1.16 | − | + | − |
| 15.95 to 17.5 | 2.16 to 2.37 | − | − | + |
| 19.5 to 20 | 2.6 to 2.7 | − | + | − |
| 22.05 to 22.6 | 2.52 to 2.62 | − | − | + |
| 22.55 to 23.1 | 2.6 to 2.7 | − | − | + |
| 24.75 to 25.25 | 2.7 to 2.8 | + | + | − |
| 25.6 to 29.15 | 2.34 to 2.66 | − | + | + |
| 28.7 to 29.2 | 2.86 to 2.9 | − | + | − |
| 36 to 44.45 | 3.21 to 4.49 | − | − | + |
| 45.05 to 45.55 | 2.25 to 2.35 | − | − | + |
| 45.9 to 46.45 | 2.54 to 2.64 | − | − | + |
| 46.5 to 47 | 2.86 to 2.96 | − | − | + |
| 47.1 to 47.65 | 3.87 to 3.97 | − | − | + |
| 48.2 to 48.7 | 4.18 to 4.28 | + | + | − |
| 50.8 to 51.3 | 3.52 to 3.62 | − | + | − |
| 62.1 to 67.75 | 4 to 4.86 | − | − | + |
| 66.35 to 67.0 | 4.14 to 4.30 | − | − | + |
| 75.4 to 78.0 | 4.05 to 4.40 | − | + | − |
| 79.15 to 81.15 | 4.44 to 4.65 | − | + | − |
| 81.9 to 82.45 | 4.39 to 4.49 | − | + | − |
| 105.25 to 106.0 | 5.25 to 5.4 | + | − | + |
| 106.9 to 107.45 | 5.74 to 5.84 | + | − | − |
| 112.95 to 115.7 | 4.84 to 5.23 | + | + | − |
| 113.45 to 116.7 | 7.11 to 7.51 | − | + | − |
| 123.23 to 124.4 | 7.15-7.22 | − | + | − |
| 123.78 to 128.45 | 7.79 to 8.14 | − | − | + |
| 124.75 to 129.55 | 6.87 to 7.33 | + | + | + |
| 127.2 to 127.7 | 5.27 to 5.37 | + | + | − |
| 128.5 to 130 | 5.5 to 5.7 | − | − | + |
| 129.1 to 129.6 | 5.28 to 5.38 | + | + | − |
| 129.6 to 130.1 | 6.31 to 6.41 | + | − | + |
| 129.9 to 131.8 | 8.1 to 8.29 | − | − | + |
| 130.24 to 134.41 | 6.18 to 6.43 | − | + | − |
| 133.5 to 134.9 | 5.47 to 5.67 | − | − | + |
| 141.4 to 141.9 | 7.49 to 7.59 | − | + | − |
| 141.6 to 142.15 | 5.97 to 6.07 | + | − | − |
| 142.8 to 143.3 | 5.79 to 5.89 | + | − | − |
| 143.8 to 144.35 | 7.48 to 7.58 | + | − | − |
| 144.3 to 144.85 | 7.51 to 7.61 | + | − | − |
| 144.55 to 145.1 | 6.19 to 6.29 | + | − | − |
| 144.7 to 145.25 | 6.23 to 6.33 | + | − | − |
| 146.2 to 146.75 | 6.33 to 6.43 | + | − | − |
| 146.28 to 147.2 | 7.93 to 7.87 | − | + | + |
| 147.7 to 148.25 | 7.25 to 7.35 | + | − | − |
| 176.2 to 178.7 | 9.4 to 9.74 | − | + | − |
| 179.95 to 180.5 | 9.76 to 9.86 | − | + | − |

This table clearly shows many differences between the 2D NMR spectrum of the inventive "Run 2" lignin, and the comparative Alcell and AKL lignins. For example, the inventive lignin has cross peak signals in the 2D NMR spectrum in the chemical shift defined by the coordinates 106.9 to 107.45 ppm in the $^{13}$C dimension and 5.74 to 5.84 ppm in the $^1$H dimension (+), whereas the two comparative lignins do not have any signals (−) in this chemical shift region. Moreover, the inventive lignin has cross peak signals in the 2D NMR spectrum in both of the chemical shift regions defined by the coordinates 105.25 to 106 ppm in the $^{13}$C dimension and 5.25 to 5.4 ppm in the $^1$H dimension, and 127.2-127.7 ppm in the $^{13}$C dimension and 5.27-5.37 ppm in the $^1$H dimension, whereas neither of the comparative lignins have cross peaks in both of these two chemical shift regions.

When ranges are used herein for physical properties, such as molecular weight, or chemical properties, such as chemical formulae, all combinations, and sub-combinations of ranges specific embodiments therein are intended to be, and are, included.

The disclosures of each patent, patent application, and publication cited or described in this document are hereby incorporated herein by reference, in their entireties.

Those skilled in the art will appreciate that numerous changes and modifications can be made to the preferred embodiments of the invention and that such changes and modifications can be made without departing from the spirit of the invention.

LIST OF REFERENCES (1) Ralph, J. et al. (2004) Phytochem. Rev. 3:29-60, "Lignins: natural polymers from oxidative coupling of 4-hydroxyphenylpropanoids" hereby incorporated by reference in its entirety.

(2) Adler, E. (1977) Wood Sci. Technol. 11:169-218, "Lignin chemistry: past, present and future" hereby incorporated by reference in its entirety.

(3) Sakakibara, A. (1991) Chemistry of lignin. In: Hon, D. N.-S., Shiraishi, N. (eds.) "Wood and Cellulose Chemistry". Marcel Dekker Inc., New York, pp. 113-175, hereby incorporated by reference in its entirety.

(4) Balakshin et al. (2008) "Recent advances in isolation and analysis of lignins and lignin-carbohydrate complexes." In: Characterization of Lignocellulosics, Ed. T. Hu. Blackwell. Oxford, UK. p. 148-170, hereby incorporated by reference in its entirety.

(5) Lawoko, M. et al. (2005) Biomacromolecules 6:3467-3473, "Structural differences between the lignin carbohydrate complexes in wood and in chemical pulps" hereby incorporated by reference in its entirety.

(6) Koshijima, T., Watanabe, T. (2003) "Association between lignin and carbohydrates in wood and other plant tissues." Springer-Verlag, Berlin, Heidelberg, hereby incorporated by reference in its entirety.

(7) Helm, R. F. (2000) "Lignin-Polysaccharide Interaction in Woody Plants." In: Glasser, W. G.; Northey, R. A.; Schultz, T. P. (eds.) Lignin: Historical, Biological, and Material Perspectives. ACS Symp. Series 742, Washington, D.C., p. 161-171, hereby incorporated by reference in its entirety.

(8) Balakshin, M. Y. et al. (2007) Holzforschung 61:1-7 "A fraction of MWL with high concentration of lignin-carbohydrate linkages: Isolation and analysis with 2D NMR spectroscopic techniques" hereby incorporated by reference in its entirety.

(9) Balakshin, M. Y. et al. (2003) J. Agric. Food Chem. 51:6116-6127, "Elucidation of the structures of residual and dissolved pine kraft lignin using an HMQC technique" hereby incorporated by reference in its entirety.

(10) Liitia, T. M. et al. (2003) J. Agric Food Chem. 51:2136-2143, "Analysis of technical lignins by two- and three-dimensional NMR spectroscopy" hereby incorporated by reference in its entirety.

(11) Gellerstedt, G. (1996) "Chemical structure of pulp components." In: Pulp Bleaching: Principles and Practice, Dence, C. W., Reeve, D. W. Eds.; Tappi. pp. 91-111, hereby incorporated by reference in its entirety.

(12) Marton, J. (1971) "Reaction in alkaline pulping. In: Lignins. Occurrence, formation, structure and reactions"; Sarkanen, K. V., Ludvig C. H., Eds.; Wiley—Interscience: New York. pp 639-694, hereby incorporated by reference in its entirety.

(13) Gierer, J. (1980) Wood Sci. Technol. 14:241-266, "Chemical aspects of kraft pulping" hereby incorporated by reference in its entirety.

(14) Glasser, W. G., et al. (1983) J. Agric. Food Chem. 31:921-930, "The chemistry of several novel bioconversion lignins" hereby incorporated by reference in its entirety.

(15) Wallis, A. F. A., (1971) "Solvolysis by acids and bases". In: "Lignins. Occurrence, formation, structure and reactions"; Sarkanen, K. V., Ludvig C. H., Eds.; Wiley—Interscience: New York. P. 345-372, hereby incorporated by reference in its entirety.

(16) Berlin, A., et al. (2006) Journal of Biotechnology 125:198-209, "Inhibition of 75ellulose, xylanase and β-glucosidase activities by softwood lignin preparations" hereby incorporated by reference in its entirety.

(17) Chudakov M. I. (1983) "Industrial Utilization of Lignin". Lesnaya Promishlennost, Moscow, hereby incorporated by reference in its entirety.

(18) Lora, J. H. and Glasser, W. G. (2002) Journal of Polymer and the Environment, 10:39-48, hereby incorporated by reference in its entirety.

(19) Robert, D. et al. (1988) Cellulose Chem. Techn. 22:221-230, "Structural changes in aspen lignin during steam explosion treatment" hereby incorporated by reference in its entirety.

(20) Li et al. (2009) Bioresour. Technol. Doi:10.1016/j.biortech.2008.12.004 "Steam explosion lignins; their extraction, structure and potential as feedstock for biodiesel and chemicals" hereby incorporated by reference in its entirety.

(21) Capanema, E. A.; Jameel, H. et al. (2005) Proc. 13$^{th}$ ISWFPC, Auckland, New Zealand, v.III, 57-64. "Isolation and characterization of residual lignins from hardwood pulps: Method improvements" hereby incorporated by reference in its entirety.

(22) Ehara et al. (2002) J. Wood Sci, 48:320-325, "Characterization of the lignin-derived products from wood as treat in supercritical water" hereby incorporated by reference in its entirety.

(23) Capanema, E. C., et al. (2001) Holzforschung 55: 3, 302-308, "Structural Analysis of Residual and Technical Lignins by $^1$H—$^{13}$C Correlation 2D NMR-Spectroscopy" hereby incorporated by reference in its entirety.

(24) Berlin, A.; Balakshin M. (2014), pp. 315-336, "Industrial lignins: Analysis, properties and applications" in Bioenergy Research: Advances and Applications. Ed. Gupta V. K.; Kubicek, C. P.; Saddler, J.; Xu, F.; Tuohy, M. Elsevier, hereby incorporated by reference in its entirety.

(25) Capanema, E. A. et al. (2004) J. Agric. Food Chem., 52, 1850-1860. "A comprehensive approach for quantitative lignin characterization by NMR spectroscopy" hereby incorporated by reference in its entirety.

(26) Capanema, E. A.; Kadla, J. F. et al. (2005) J. Agric. Food Chem. 53, 9639-9649 "Quantitative Characterization of a Hardwood Milled Wood Lignin by NMR Spectroscopy" hereby incorporated by reference in its entirety.

(27) Ohra-aho, T. et al. (2013). Journal of Analytical and Applied Pyrolysis, 101, 166-171, "S/G ratio and lignin structure among Eucalyptus hybrids determined by Py-GC/MS and nitrobenzene oxidation" hereby incorporated by reference in its entirety.

(28) Adler, E. et al. (1987), Holzforschung, 41, 199-207, "Investigation of the acid catalyzed alkylation of lignin by means of NMR spectroscopic methods" hereby incorporated by reference in its entirety.
(29) Baumberger, S. et al. (2007), Holzforschung, 61, 459-468, "Molar mass determination of lignins by size-exclusion chromatography: towards standardisation of the method" herein incorporated by reference in its entirety.

What is claimed is:

1. A technical lignin comprising:
a methoxyl content of 102 units to 120 units, per 100 aromatic units; and
an oxygenated aliphatic content of 100 units to about 150 units, per 100 aromatic units.

2. The technical lignin of claim 1, wherein:
the methoxyl content is 104 units to 120 units, per 100 aromatic units; or
the oxygenated aliphatic content is 100 units to 148 units, per 100 aromatic units.

3. The technical lignin of claim 1, further comprising:
a degree of condensation of about 30 to about 50.

4. The technical lignin of claim 1, further comprising:
a ratio of syringyl to guaiacyl of about 1 to about 1.5.

5. The technical lignin of claim 1, further comprising:
a phenolic hydroxyl content of about 30 units to about 100 units, per 100 aromatic units.

6. The technical lignin of claim 1, further comprising:
an aliphatic hydroxyl content of about 35 units to about 70 units, per 100 aromatic units.

7. The technical lignin of claim 1, further comprising:
a total COOR content of about 5 units to about 25 units, per 100 aromatic units.

8. The technical lignin of claim 1, further comprising:
a total carbonyl content of about 10 units to about 25 units, per 100 aromatic units.

9. The technical lignin of claim 1,
wherein the technical lignin is derived from hardwood biomass.

10. The technical lignin of claim 1,
wherein the technical lignin is derived from biomass selected from the group consisting of softwood, annual fiber, municipal solid waste, agricultural residue, manufacturing waste, and any combination thereof.

11. A technical lignin comprising:
a methoxyl content of 102 units to 138 units, per 100 aromatic units; and
an oxygenated aliphatic content of 100 units to 120 units, per 100 aromatic units.

12. The technical lignin of claim 11, wherein:
the methoxyl content is 104 units to 138 units, per 100 aromatic units; or
the oxygenated aliphatic content is 100 units to 118 units, per 100 aromatic units.

13. The technical lignin of claim 11, further comprising:
a degree of condensation of about 30 to about 50.

14. The technical lignin of claim 11, further comprising:
a ratio of syringyl to guaiacyl of about 1 to about 1.5.

15. The technical lignin of claim 11, further comprising:
a phenolic hydroxyl content of about 30 units to about 100 units, per 100 aromatic units.

16. The technical lignin of claim 11, further comprising:
aliphatic hydroxyl content of about 35 units to about 70 units, per 100 aromatic units.

17. The technical lignin of claim 11, further comprising:
a total COOR content of about 5 units to about 25 units, per 100 aromatic units.

18. The technical lignin of claim 11, further comprising:
a total carbonyl content of about 10 units to about 25 units, per 100 aromatic units.

19. The technical lignin of claim 11,
wherein the technical lignin is derived from hardwood biomass.

20. The technical lignin of claim 11,
wherein the technical lignin is derived from biomass selected from the group consisting of softwood, annual fiber, municipal solid waste, agricultural residue, manufacturing waste, and any combination thereof.

21. A technical lignin comprising:
a methoxyl content of 102 units to 114 units, per 100 aromatic units; and
an oxygenated aliphatic content of about 80 units to about 150 units, per 100 aromatic units.

22. The technical lignin of claim 21, wherein:
the methoxyl content is 104 units to 114 units, per 100 aromatic units; or
the oxygenated aliphatic content is 85 units to 145 units, per 100 aromatic units.

23. The technical lignin of claim 21, further comprising:
a degree of condensation of about 30 to about 50.

24. The technical lignin of claim 21, further comprising:
a ratio of syringyl to guaiacyl of about 1 to about 1.5.

25. The technical lignin of claim 21, further comprising:
a phenolic hydroxyl content of about 30 units to about 100 units, per 100 aromatic units.

26. The technical lignin of claim 21, further comprising:
an aliphatic hydroxyl content of about 35 units to about 70 units, per 100 aromatic units.

27. The technical lignin of claim 21, further comprising:
a total COOR content of about 5 units to about 25 units, per 100 aromatic units.

28. The technical lignin of claim 21, further comprising:
a total carbonyl content of about 10 units to about 25 units, per 100 aromatic units.

29. The technical lignin of claim 21,
wherein the technical lignin is derived from hardwood biomass.

30. The technical lignin of claim 21,
wherein the technical lignin is derived from biomass selected from the group consisting of softwood, annual fiber, municipal solid waste, agricultural residue, manufacturing waste, and any combination thereof.

31. A technical lignin having a $^1H$—$^{13}C$ HSQC NMR spectrum comprising the cross peaks shown in FIG. 4.

32. A technical lignin having a $^{13}C$ NMR spectrum comprising the spectrum shown in FIG. 5.

* * * * *